United States Patent
Hwang et al.

(10) Patent No.: US 11,270,418 B1
(45) Date of Patent: *Mar. 8, 2022

(54) METHOD AND SYSTEM FOR CORRECTING PHASE OF IMAGE RECONSTRUCTION SIGNAL

(71) Applicant: VPIX Medical Incorporation, Daejeon (KR)

(72) Inventors: Kyungmin Hwang, Daejeon (KR); Ji Won Kim, Seoul (KR); Yeong Ryeol Kim, Daejeon (KR)

(73) Assignee: VPIX Medical Incorporation, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,238

(22) Filed: Apr. 29, 2021

(30) Foreign Application Priority Data

Nov. 19, 2020 (KR) .................. 10-2020-0156041
Nov. 19, 2020 (KR) .................. 10-2020-0156042

(51) Int. Cl.
  *G06T 5/10* (2006.01)
  *G06T 5/50* (2006.01)
  *G01S 17/89* (2020.01)
  *G06T 3/40* (2006.01)

(52) U.S. Cl.
  CPC ............ *G06T 5/10* (2013.01); *G01S 17/89* (2013.01); *G06T 3/4053* (2013.01); *G06T 5/50* (2013.01); *G06T 2207/10028* (2013.01)

(58) Field of Classification Search
  CPC ........... G06T 5/10; G06T 3/4053; G06T 5/50; G06T 2207/10028; G01S 17/89
  See application file for complete search history.

(56) References Cited

U.S. PATENT DOCUMENTS

| | | | | |
|---|---|---|---|---|
| 7,751,063 B2 * | 7/2010 | Dillon | ............... | G01B 11/2527 356/511 |
| 7,859,680 B2 * | 12/2010 | Abe | .................. | G01B 9/02085 356/479 |
| 9,872,606 B2 * | 1/2018 | Yeoh | ...................... | A61B 1/042 |
| 9,977,236 B2 * | 5/2018 | Nishimura | ........... | G02B 26/103 |

(Continued)

FOREIGN PATENT DOCUMENTS

| | | |
|---|---|---|
| JP | 2012-256037 A | 12/2012 |
| KR | 101767116 B1 | 8/2017 |

(Continued)

OTHER PUBLICATIONS

Office Action for Korean Patent Application No. 10-2020-0156041, dated Aug. 20, 2021.

(Continued)

*Primary Examiner* — Gregory M Desire
(74) *Attorney, Agent, or Firm* — K&L Gates LLP

(57) ABSTRACT

An image generating device for obtaining an image of an object, comprising: a control module configured to generate a first signal having a first frequency component and a first phase component for a first axis direction, and a second signal having a second frequency component and a second phase component for a second axis direction, an emitting unit configured to emit light to the object using the first signal and the second signal; and a light receiving unit configured to obtain light receiving signal based on returned light from the object.

16 Claims, 38 Drawing Sheets

(56) References Cited

U.S. PATENT DOCUMENTS

| | | | |
|---|---|---|---|
| 10,488,647 B2* | 11/2019 | Namiki | G06T 5/001 |
| 10,845,588 B2* | 11/2020 | Matsuda | H02N 2/028 |
| 10,921,407 B2* | 2/2021 | Paulson | G01R 33/5676 |
| 10,939,802 B2* | 3/2021 | Hwang | A61B 1/043 |
| 2014/0109164 A1* | 4/2014 | Yamagishi | H04N 21/4436 |
| | | | 725/131 |

FOREIGN PATENT DOCUMENTS

| | | |
|---|---|---|
| KR | 10-2019-0103270 A | 9/2019 |
| KR | 10-2019-0104367 A | 9/2019 |
| KR | 10-2020-0038663 A | 4/2020 |

OTHER PUBLICATIONS

Office Action for Korean Patent Application No. 10-2020-0156042, dated Aug. 23, 2021.
Grant of Patent for Korean Patent Application No. 10-2020-0156042, dated Dec. 9, 2021.

* cited by examiner

FIG. 5

| TIME INFORMATION | t1 | t3 | t3 | ... |
|---|---|---|---|---|
| LIGHT INFORMATION | i1 | i2 | i3 | ... |

FIG. 6

| FIRST-AXIS COORDINATE INFORMATION | x1 | x2 | x3 | ... |
|---|---|---|---|---|
| SECOND-AXIS COORDINATE INFORMATION | y1 | y2 | y3 | ... |
| LIGHT INFORMATION | i1 | i2 | i3 | ... |

FIG. 11
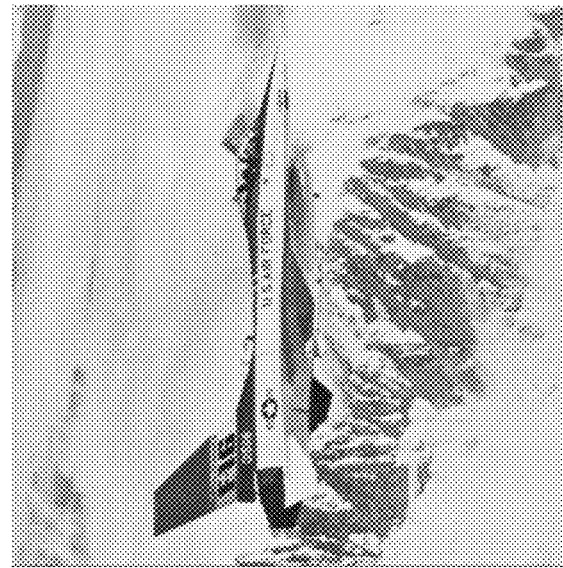
(b)
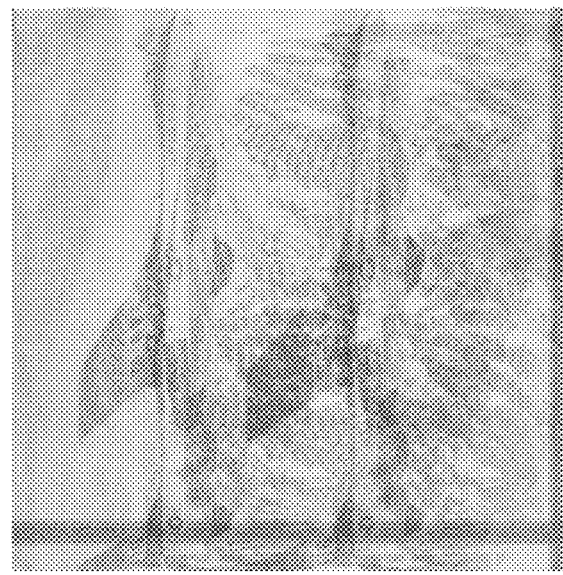
(a)

FIG. 12

| | | | | |
|---|---|---|---|---|
| FIRST-AXIS COORDINATE INFORMATION | x1 | x2 | x3 | ... |
| SECOND-AXIS COORDINATE INFORMATION | y1 | y2 | y3 | ... |
| LIGHT INFORMATION | i2 | i3 | i1 | ... |

FIG. 15
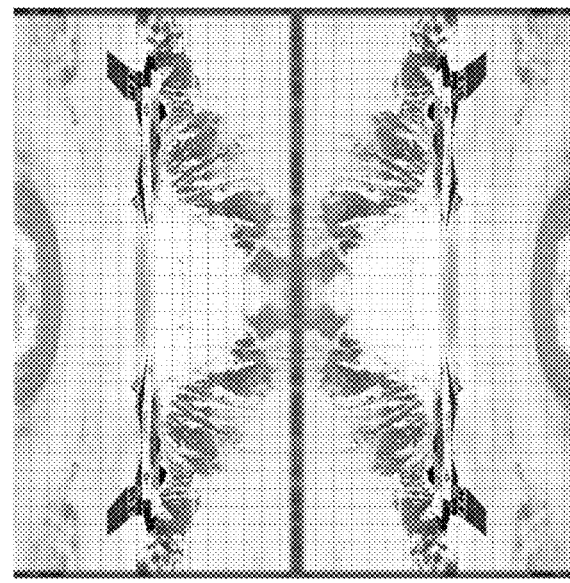
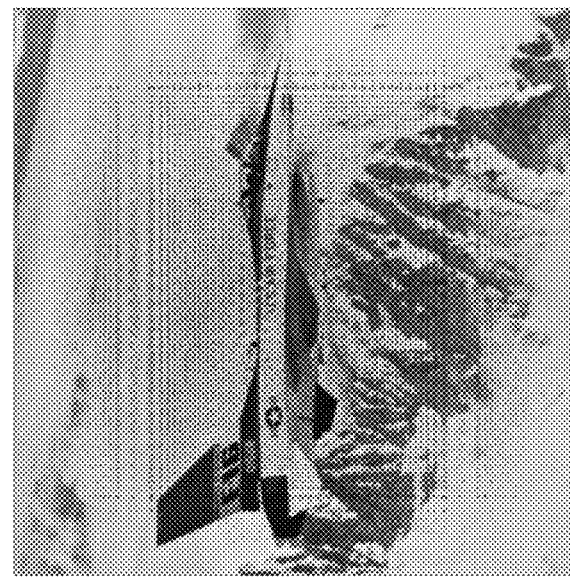
(a)
(b)

FIG. 18

| FIRST-AXIS PHASE DOMAIN COORDINATE INFORMATION | x'1 | x'2 | x'3 | ... |
|---|---|---|---|---|
| SECOND-AXIS PHASE DOMAIN COORDINATE INFORMATION | y'1 | y'2 | y'3 | ... |
| LIGHT INFORMATION | i1 | i2 | i3 | ... |

FIG. 21
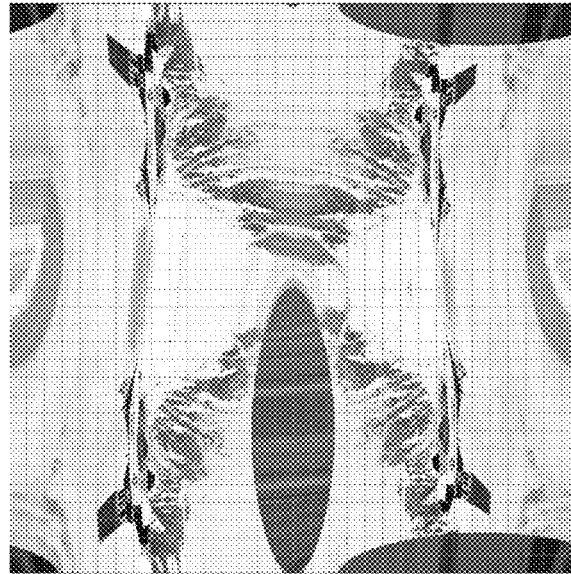
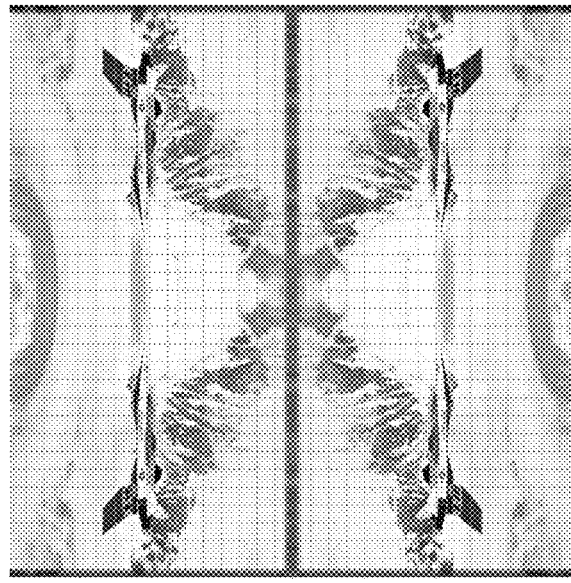

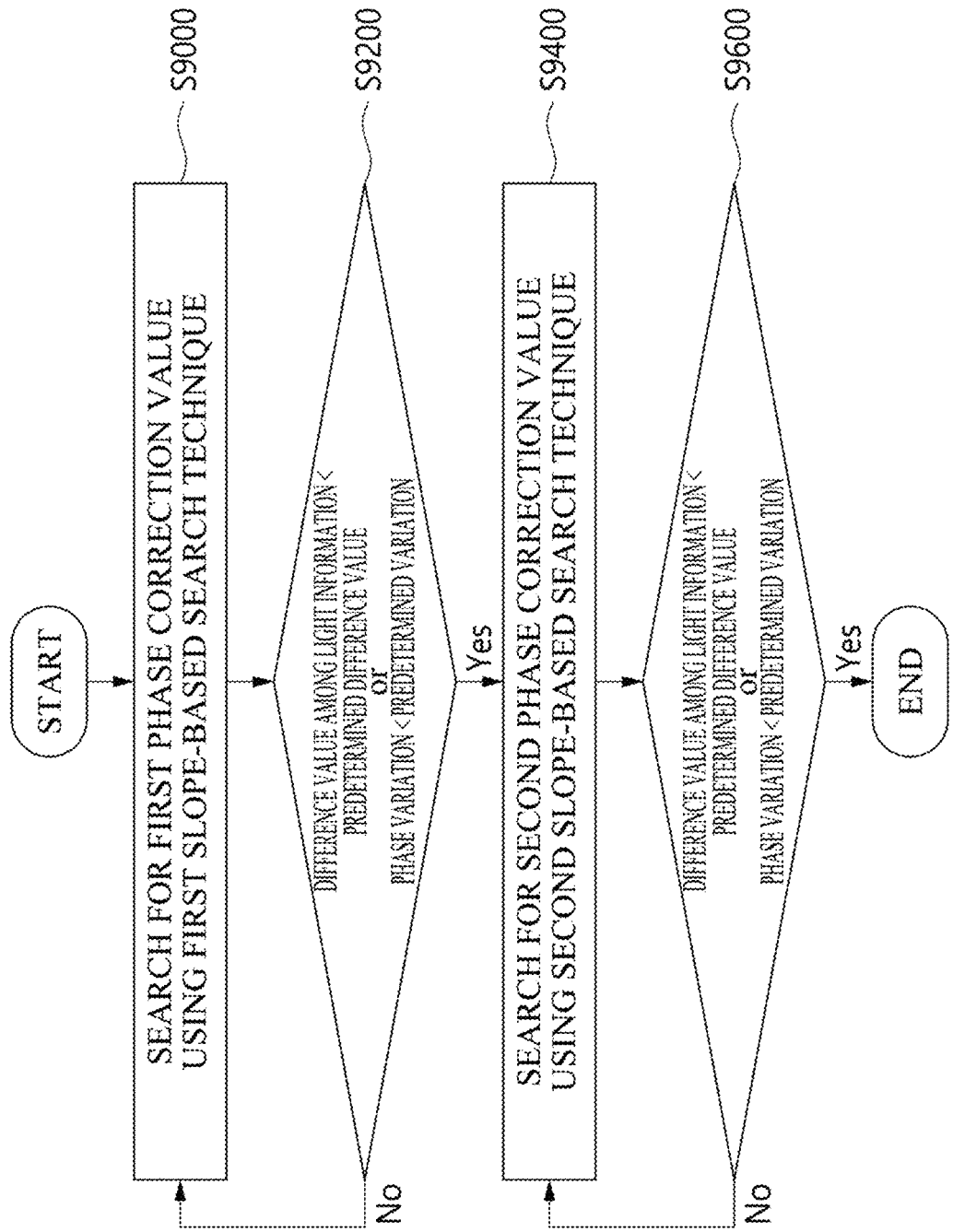

METHOD AND SYSTEM FOR CORRECTING PHASE OF IMAGE RECONSTRUCTION SIGNAL

CROSS-REFERENCE TO RELATED APPLICATION

This application claims priority to and the benefit of Korean Patent Application No. 10-2020-0156041, filed on Nov. 19, 2020 and Korean Patent Application No. 10-2020-0156042, filed on Nov. 19, 2020, the disclosure of which is incorporated herein by reference in its entirety.

BACKGROUND

1. Field of the Invention

The present invention relates to a method and system for correcting the phase of an image reconstruction signal, and more particularly, to an image correction method and system that are used to correct the phase of a reconstruction signal when an image generation device generates an image.

2. Discussion of Related Art

An image generation device is for acquiring an image of an object by emitting light to the object and is widely used in various fields such as Light Detection and Ranging (LiDAR), optical microscope, endoscope, and endo-microscope.

In particular, since an image generation device may acquire an image of an object in real time, the image generation device can continuously acquire images of the object and thus can also acquire a video of an object changing in real time as well as still images. However, when an image generation device emits light to an object using a pattern, distortion may occur in an image generated in real time because the pattern of the light is different from the actual position of information on the light acquired by the image generation device.

Accordingly, in order to acquire the accurate position of the information on the light that is acquired by the image generation device in real time, computation for correcting the phase of a signal for enabling the image generation device to reconstruct information on light returned from an object may have to be performed.

SUMMARY OF THE INVENTION

The present invention is directed to providing a method of reconstructing an image using a tendency and a method and system for constructing the phase of a reconstruction signal for reconstructing an image.

The present invention is also directed to providing a method and system for selecting the frequency of an image reconstruction signal in order to capture a high-resolution image.

The present invention is also directed to providing a method and system for transforming the domain of an image reconstruction signal to correct an image.

According to an embodiment of the present invention, there may be provided a method of correcting the phase of a reconstruction signal in order to increase the resolution of an image acquired by an image generation device, the method including acquiring an initial phase correction value of an initial reconstruction signal, acquiring a first phase correction value from the initial phase correction value on the basis of a first slope-based minimum search technique, and acquiring a second phase correction value on the basis of the first phase correction value when a difference value between pieces of light information acquired for at least one pixel of an image acquired based on a corrected reconstruction signal is less than or equal to a predetermined difference value. The image may be acquired based on the reconstruction signal and the light information, and the second phase correction value may be acquired from the first phase correction value on the basis of a second slope-based minimum search technique, and the first slope-based minimum search technique may have a different phase search unit from the second slope-based minimum search technique.

According to an embodiment of the present invention, an image generating device for obtaining an image of an object, comprising: a control module configured to generate a first signal having a first frequency component and a first phase component for a first axis direction, and a second signal having a second frequency component and a second phase component for a second axis direction, an emitting unit configured to emit light to the object using the first signal and the second signal; and a light receiving unit configured to obtain light receiving signal based on returned light from the object, wherein the control module configured to obtain a first data set based on the first signal, the second signal and the light receiving signal, wherein the first signal and the second signal correspond to a first domain, wherein the control module configured to obtain a third signal and a fourth signal, wherein the third signal and the fourth signal correspond to a second domain, wherein the control module configured to obtain a second data set based on the third signal and the fourth signal, wherein the first data set and the second data set are different, wherein the control module configured to obtain an adjusting value of the first data set based on the second data set, wherein the control module configured to obtain a third data set based on adjusting the first data set using the adjusting value, and wherein the control module configured to obtain the image of the object base on the third data set.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is a table schematically showing light information acquired according to time information according to an embodiment;

FIG. 6 is a table schematically showing light information corresponding to coordinate information according to an embodiment;

FIG. 11 is a diagram showing an original image of an object and an image of the object reconstructed based on a reconstruction signal with a phase delay according to an embodiment;

FIG. 12 is a table schematically showing coordinate information and light information corresponding to the coordinate information on the basis of a reconstruction signal with a phase delay according to an embodiment;

FIG. 15 is a diagram showing an image acquired according to a domain of a reconstruction signal according to an embodiment;

FIG. 18 is a table schematically showing light information acquired for coordinate information acquired in the phase domain of a reconstruction signal according to time information according to an embodiment;

FIG. 21 is a diagram showing an image acquired when an MC phenomenon has occurred and an image acquired when an MC phenomenon has not occurred by using coordinate information acquired in the phase domain according to an embodiment;

FIG. 38 is a flowchart illustrating a method of the controller 110 acquiring a final phase correction value of a reconstruction signal using a slope-based minimum search technique according to an embodiment.

DETAILED DESCRIPTION OF EXEMPLARY EMBODIMENTS

Figure 1:
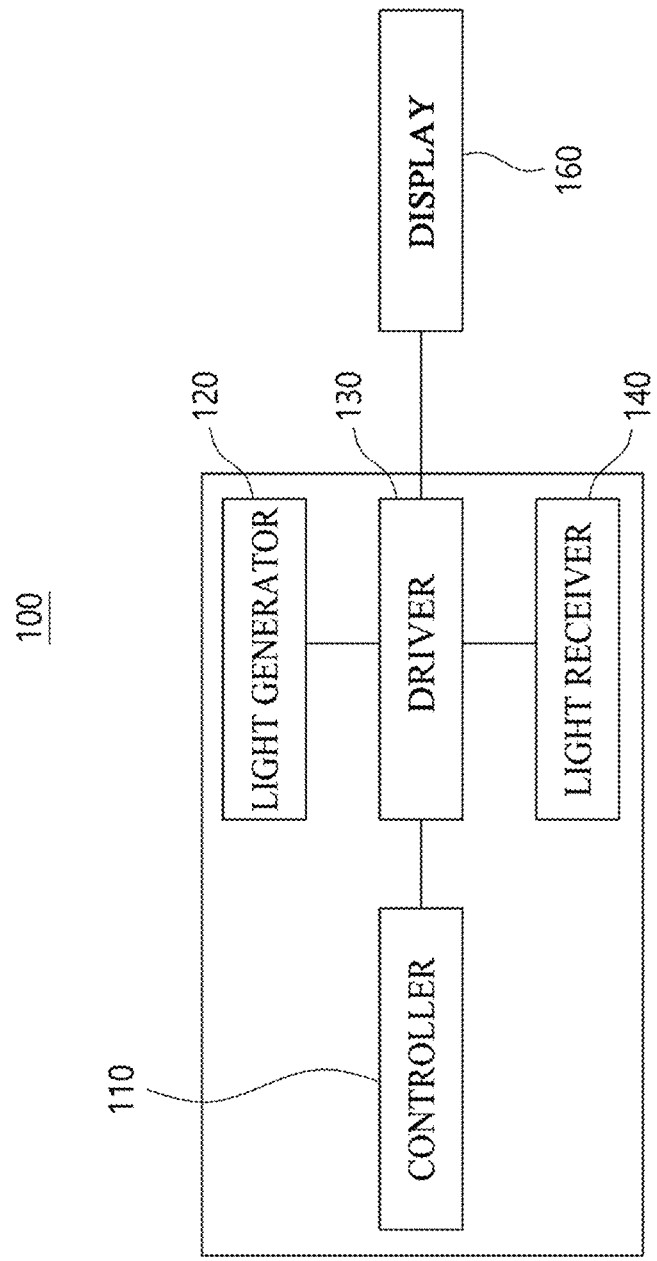
FIG. 1 is a schematic diagram showing a configuration of an image generation device according to an embodiment.

The above objects, features, and advantages of the present invention will become more apparent from the following detailed description taken in conjunction with the accompanying drawings. Since the present invention may be variously modified and have several exemplary embodiments, specific embodiments will be shown in the accompanying drawings and described in detail.

In the figures, the thickness of layers and regions is exaggerated for clarity. Also, when it is mentioned that an element or layer is "on" another element or layer, the element or layer may be formed directly on the other element or layer, or a third element or layer may be interposed therebetween. Like reference numerals refer to like elements throughout the specification. Further, like reference numerals will be used to designate like elements within the same scope shown in the drawings of the embodiments.

Detailed descriptions about well-known functions or configurations associated with the present invention will be ruled out in order not to unnecessarily obscure subject matters of the present invention. It should also be noted that, although ordinal numbers (such as first and second) are used in the following description, they are used only to distinguish similar elements.

The suffixes "module" and "unit" for elements used in the following description are given or used interchangeably only for facilitation of preparing this specification, and thus they are not assigned a specific meaning or function.

The method according to an embodiment may be implemented in the form of program instructions executable by a variety of computer means and may be recorded on a computer-readable medium. The computer-readable medium may include program instructions, data files, data structures, and the like alone or in combination. The program instructions recorded on the medium may be designed and configured specifically for an embodiment or may be publicly known and available to those skilled in the field of computer software. Examples of the computer-readable recording medium include a magnetic medium, such as a hard disk, a floppy disk, and a magnetic tape, a optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform the operations of an embodiment, and vice versa.

According to an embodiment, there may be provided a method of correcting the phase of a reconstruction signal in order to increase the resolution of an image acquired by an image generation device, the method including acquiring an initial phase correction value of an initial reconstruction signal, acquiring a first phase correction value from the initial phase correction value on the basis of a first slope-based minimum search technique, and acquiring a second phase correction value on the basis of the first phase correction value when a difference value between pieces of light information acquired for at least one pixel of an image acquired based on a corrected reconstruction signal is less than or equal to a predetermined difference value. The image may be acquired based on the reconstruction signal and the light information, and the second phase correction value may be acquired from the first phase correction value on the basis of a second slope-based minimum search technique, and the first slope-based minimum search technique may have a different phase search unit from the second slope-based minimum search technique.

Also, when the first phase correction value is within a predetermined range from a first intermediate phase correction value found based on the first slope-based minimum search technique and the reconstruction signal is corrected with the first phase correction value, the reconstruction signal may have a higher fill factor when the reconstruction signal is corrected with the first phase correction value than when the reconstruction signal is corrected with the first intermediate phase correction value.

Also, the fill factor may be a ratio of pixels, from which light information is acquired based on an image reconstruction signal, to all pixels of the image acquired by the image generation device.

Also, the first phase correction value may differ from the initial phase correction value by an integer multiple of a predetermined phase difference.

Also, the predetermined phase difference may be acquired based on a frequency component of the reconstruction signal.

Also, the first slope-based minimum search technique and the second slope-based minimum search technique may include at least one of the Nelder-Mead method, momentum method, AdaGrad method, Adam method, steepest gradient method, or gradient descent method.

Also, the first slope-based minimum search method and the second slope-based minimum search method may enable the difference value between the pieces of light information acquired for at least one pixel of the image to be minimized on the basis of the reconstruction signal and the phase of the reconstruction signal.

Also, the difference value between the pieces of the light information may be the variance of the pieces of light information acquired for at least one pixel of the image.

Also, the difference value between the pieces of the light information may be the standard deviation of the pieces of light information acquired for at least one pixel of the image.

Also, the phase search unit of the first slope-based minimum search technique may be larger than the phase search unit of the second slope-based minimum search technique.

Also, the first phase correction value and the initial phase correction value of the reconstruction signal may be a tendency phase range in the entire phase range of the reconstruction signal.

Also, the tendency phase range may be a range in which the difference value between the pieces of light information decreases as the difference value between the pieces of light information acquired for at least one pixel of the image in close proximity to the second phase correction value of the reconstruction signal approaches the second phase correction value.

Also, there may be provided a computer-readable recording medium on which a program for executing the phase correction method of the reconstruction signal is recorded.

According to another embodiment, there may be provided an image generation device configured to correct the phase of a reconstruction signal to increase the resolution of an acquired image, the image generation device including a controller configured to correct the phase of the reconstruction signal, a light emitter configured to emit light to an object, and a light receiver configured to receive information regarding light returning from the object, wherein the controller may acquire an initial phase correction value of an initial reconstruction signal, the controller may acquire a first phase correction value from the initial phase correction value on the basis of a first slope-based minimum search technique, and the controller may acquire a second phase correction value on the basis of the first phase correction value when a difference value between pieces of light information acquired for at least one pixel of an image acquired based on a corrected reconstruction signal is less than or equal to a predetermined difference value. The image may be acquired based on the reconstruction signal and the light information, and the second phase correction value may be acquired from the first phase correction value on the basis of a second slope-based minimum search technique, and the first slope-based minimum search technique may have a different phase search unit from the second slope-based minimum search technique.

According to an embodiment of the present invention, an image generating device for obtaining an image of an object, comprising: a control module configured to generate a first signal having a first frequency component and a first phase component for a first axis direction, and a second signal having a second frequency component and a second phase component for a second axis direction, an emitting unit configured to emit light to the object using the first signal and the second signal; and a light receiving unit configured to obtain light receiving signal based on returned light from the object, wherein the control module configured to obtain a first data set based on the first signal, the second signal and the light receiving signal, wherein the first signal and the second signal correspond to a first domain, wherein the control module configured to obtain a third signal and a fourth signal, wherein the third signal and the fourth signal correspond to a second domain, wherein the control module configured to obtain a second data set based on the third signal and the fourth signal, wherein the first data set and the second data set are different, wherein the control module configured to obtain an adjusting value of the first data set based on the second data set, wherein the control module configured to obtain a third data set based on adjusting the first data set using the adjusting value, and wherein the control module configured to obtain the image of the object base on the third data set.

Also, the adjusting value is obtained based on a symmetricity of the second data set.

Also, the symmetricity is obtained based on a difference value of the light receiving signal obtained on at least one of a second domain pixel position, which the second domain pixel position is determined based on the third signal and the fourth signal.

Also, the difference value is obtained based on a summation of at least one of the light receiving signal.

Also, the difference value is obtained based on a integration of at least one of the light receiving signal which is obtained at a second domain image corresponding to a phase delayed component of the third signal and the fourth signal at the second domain.

Also, the difference value is obtained based on a fixed phase delayed component which corresponds to a phase delayed component of at least one of the third signal or the fourth signal.

Also, the fixed phase delayed component is plural, and the adjusting value corresponds to a minimum difference value which is obtained among the difference value obtained based on the fixed phase delayed component.

Also, a first phase adjusting value corresponds to the fixed phase delayed component of the third signal, a second phase adjusting value corresponds to the fixed phase delayed component of the fourth signal, and the adjusting value includes the first phase adjusting value and the second adjusting value.

Also, the third data set is obtained based on adjusting the first signal by the first phase adjusting value and adjusting the second signal by the second phase adjusting value.

Also, a third phase adjusting value is obtained based on the first phase adjusting value on the second domain, and wherein a fourth phase adjusting value is obtained based on the second phase adjusting value on the second domain.

Also, the first domain corresponds to a sinusoidal function domain, and the second domain corresponds to a domain which is homeomorphic transformation of the first domain.

Also, the second domain corresponds to a domain which is homeomorphic transformation of the first domain by a phase domain.

Also, the image which is obtained by the image generating device is obtained on the first domain.

Also, a position on the second domain which is based on the third signal and the fourth signal is repeated by a predetermined period.

According to an embodiment of the present invention, an image generating method for obtaining an image of an object, comprising: generating a first signal having a first frequency component and a first phase component for a first axis direction, and a second signal having a second frequency component and a second phase component for a second axis direction through a control module; obtaining light receiving signal based on returned light from the object through a light receiving unit; obtaining a first data set based on the first signal, the second signal and the light receiving signal; wherein the first signal and the second signal correspond to a first domain, obtaining a third signal and a fourth signal, such that the third signal and the fourth signal correspond to a second domain; obtaining a second data set based on the third signal and the fourth signal; wherein the first data set and the second data set are different, wherein the control module configured to obtain an adjusting value of the first data set based on the second data set, wherein the control module configured to obtain a third data set based on adjusting the first data set using the adjusting value, and wherein the control module configured to obtain the image of the object base on the third data set.

1. General Information about Image Generation Device 1.1. Image Generation Device An image generation device that may be used to acquire an image of an object will be described below. Here, the image generation device may be an optical device for which at least one of a reflection image, a fluorescence image, or a transmission image of an object is acquired or provided.

FIG. 1 is a schematic diagram showing a configuration of an image generation device according to an embodiment.

Referring to FIG. 1, an image generation device according to an embodiment may include a controller 110, a light generator 120, a driver 130, a light receiver 140, and a display 160.

According to an embodiment, the image generation device may include a device for generating an image using light, such as Light Detection and Ranging (LiDAR), a laser scanner, or a confocal microscope.

The controller 110 may drive software, programs, or algorithms necessary to generate and correct an image. In other words, the controller 110 may receive electrical signals and output electrical signals.

For example, the controller 110 may drive software or a program for generating an image or drive an algorithm for generating an image on the basis of a data acquisition manner to be described below.

However, the use of the controller 110 is not limited to the above example, and the controller 110 may drive software, programs, or algorithms that can be executed by a typical computing device.

The light generator 120 may generate light in various wavelength bands including infrared, ultraviolet, and visible rays. The light generated by the light generator 120 may be emitted to an object.

For example, the light generated by the light generator 120 may be light having a wavelength of 405 nm, 488 nm, or 785 nm to cause a fluorescent dye to emit light. However, the present invention is not limited thereto, and the generated light may be light in a wavelength band for causing a fluorescent material, which includes an autofluorescent biomaterial present in an object, to emit light, for example, light having a wavelength band for generating autofluorescence of cells.

Also, the light generated by the light generator 120 may be unamplified light or light amplified by stimulated emission of radiation (hereinafter referred to as a laser beam).

The driver 130 may drive elements in a light traveling path to change the path when the light generated by the light generator 120 is emitted to an object. In other words, the driver 130 may receive electric energy or an electric signal from the controller 110 and drive the elements in the light traveling path. Here, the elements in the light traveling path may include a fiber 310 which serves as a light traveling passage and a microelectromechanical systems (MEMS) mirror by which the light generated by the light generator 120 is reflected.

For example, the driver 130 may be a driving element including an electric motor, a magnetic motor, a piezoelectric element, or a thermoelectric element. However, the present invention is not limited to the above example, and the driver 130 may include an element capable of generating kinetic energy when electric force or magnetic force is applied, According to an embodiment, the driver 130 may drive an element in the light traveling path in at least one direction. That is, the driver 130 may receive an electric signal and apply force to an element in the light traveling path in at least one axis direction.

For example, when one axis is determined in a space where light is emitted to an object, the driver 130 may apply force in the direction of the axis and the direction of an axis perpendicular to the axis. In other words, the driver 130 may drive an element in the light traveling path in the direction of an axis and the direction of an axis perpendicular to the axis.

According to an embodiment, at least one of the light generator 120 or the driver 130 may be represented as an emitting unit that emits light.

The light receiver 140 may transform optical energy of light returned from an object into electrical energy and transfer the electrical energy to the controller 110. In other words, the light receiver 140 may acquire information on light returned from an object in the form of an electric signal. For convenience of the following description, the light receiver 140 acquiring information on light returned from an object in the form of an electric signal and transferring the electric signal to the controller 110 will be described as the controller 110 acquiring light information, but this does not mean that the controller 110 directly acquires light information but that the light information acquired by the light receiver 140 is transferred to the controller 110 as described above. Likewise, the light receiver 140 acquiring light information may also mean that the light receiver 140 transforms optical energy into electrical energy.

Also, the light information which will be described below may include light intensity, light location information, and time information related to a light acquisition time of a unit expressing the color of light such as black and white, RGB, and CMYK. However, for convenience of description, the term "light information" used herein may refer to light intensity.

Here, the light receiver 140 may include an imaging element, a light-receiving element, a photographing device, a light receiver, a light detector, or a light-receiving device for acquiring light information. For example, the light receiver 140 may include a charge-coupled device (CCD), a complementary metal-oxide semiconductor (CMOS), a photomultiplier tube (PMT), or a photodiode. However, the light receiver 140 is not limited to the above example, and any element may be included in the light receiver 140 as long as the element can transfer optical energy into electrical energy.

The display 160 may display an image generated by the controller 110 in an identifiable form. In other words, the display 160 may receive an image generated by the controller 110 and display the image so that the image can be identified by a user.

For example, the display 160 may include an image display element including a cathode ray tube (CRT), a liquid crystal display (LCD), a light-emitting diode (LED), or a liquid crystal on silicon (LCoS). However, the display 160 is not limited to the above example, and any device may be included in the display 160 as long as the device can receive an electrical signal and display an image.

According to another embodiment, the image generation device may be provided such that the display 160 is not included. That is, referring to FIG. 1, it is shown that the display 160 is included in the image generation device. However, the present invention is not limited thereto, and the image generation device may include only the controller 110, the light generator 120, the driver 130, and the light receiver 140.

Figure 2:
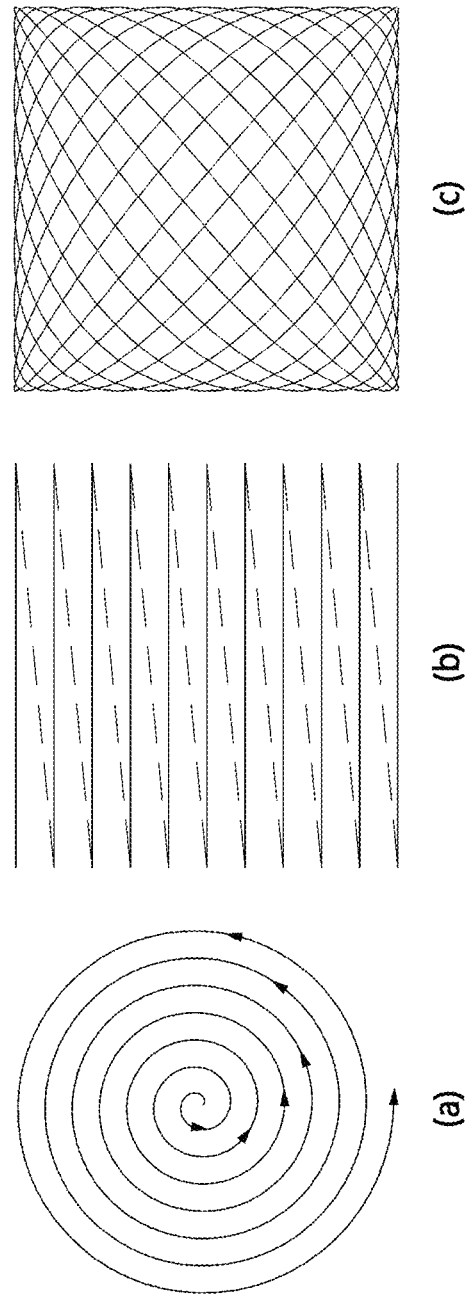
FIG. 2 is a diagram showing a pattern in which light is emitted and a pattern which is for image reconstruction according to an embodiment.

FIG. 2 is a diagram showing a pattern in which light is emitted and a pattern which is for image reconstruction according to an embodiment. In other words, an electric signal that is input to the driver 130 by the controller 110 or a reconstruction signal used that is used for the controller 110 to reconstruct an image may exhibit a specific pattern.

FIG. 2A shows a spiral pattern, FIG. 2B shows a raster pattern, and FIG. 2C shows a Lissajous pattern.

According to an embodiment, when light is emitted to an object, the image generation device may emit the light to the object such that the path of the emitted light follows a specific pattern. In other words, when the paths of the light emitted to the object overlap during a specific time, the light traveling path may exhibit a specific pattern. Here, the specific time for the overlapping may refer to a time taken to complete the pattern.

Referring to FIG. 2, the light may be emitted to the object in different patterns depending on the electric signal input to the driver 130. For convenience of the following description, light being emitted to an object may be expressed as the scanning of an object or the scanning of an object with light.

For example, referring to FIG. 2A, when the amplitude of the electric signal input to the driver 130 is changed, the path of the light emitted to the object may exhibit a spiral pattern.

Also, for example, referring to FIG. 2B, it is assumed that the electric signal input to the driver 130 includes a first driving signal for driving the driver 130 or an element in the light traveling path in one axis direction and a second driving signal for driving the driver 130 or an element in the light traveling path in a direction perpendicular to the axis direction. When the frequency of the first driving signal and the frequency of the second driving signal differ by an integer multiple, the path of the light emitted to the object may exhibit a raster pattern.

Also, for example, referring to FIG. 2C, it is assumed that the electric signal input to the driver 130 includes a first driving signal for driving the driver 130 or an element in the light traveling path in one axis direction and a second driving signal for driving the driver 130 or an element in the light traveling path in a direction perpendicular to the axis direction. When the frequency of the first driving signal and the frequency of the second driving signal are different from each other, the path of the light emitted to the object may exhibit a Lissajous pattern.

According to another embodiment, when the controller 110 of the image generation device acquires light information through the light receiver 140, a reconstruction signal for reconstructing an image using the acquired light information may exhibit a specific pattern. Here, the reconstruction signal exhibiting a specific pattern may mean that the corresponding pattern is shown in the image actually reconstructed based on the reconstruction signal, or that a signal for forming the aforementioned specific pattern is the reconstruction signal although there is actually nothing shown in the image.

According to another embodiment, the pattern of the driving signal for driving the driver 130 and the pattern of the reconstruction signal for reconstructing the image may be the same. In other words, the signal that is input to the driver 130 by the controller 110 and the signal that is used for the controller 110 to reconstruct the image may be the same.

According to another embodiment, when there is a phase delay, the pattern of the driving signal for driving the driver 130 and the pattern of the reconstruction signal for reconstructing the image may be different.

For example, the path of light that is actually emitted to an object may be different from the pattern of the driving signal, and thus the reconstruction signal may be a signal exhibiting a pattern for reflecting the path of the light that is actually emitted to the object. In other words, the reconstruction signal may be a signal that is corrected to generate a pattern identical or similar to the pattern in which the light is actually emitted to the object. The correction of the reconstruction signal will be described in detail in the following related section.

In the following description, a Lissajous pattern is to be used by the image generation device. However, as described in the above embodiments, various patterns may be used by the image generation device.

1.1.1. General Information about Image Generation Device Using Fiber 310.

According to an embodiment, an image generation device in which a path traveled by light generated by a light generator of the image generation device is an optical fiber 310 (hereinafter referred to as a fiber 310). In other words, an image generation device in which the above-described element in the light traveling path is the fiber 310 may be provided.

Figure 3:
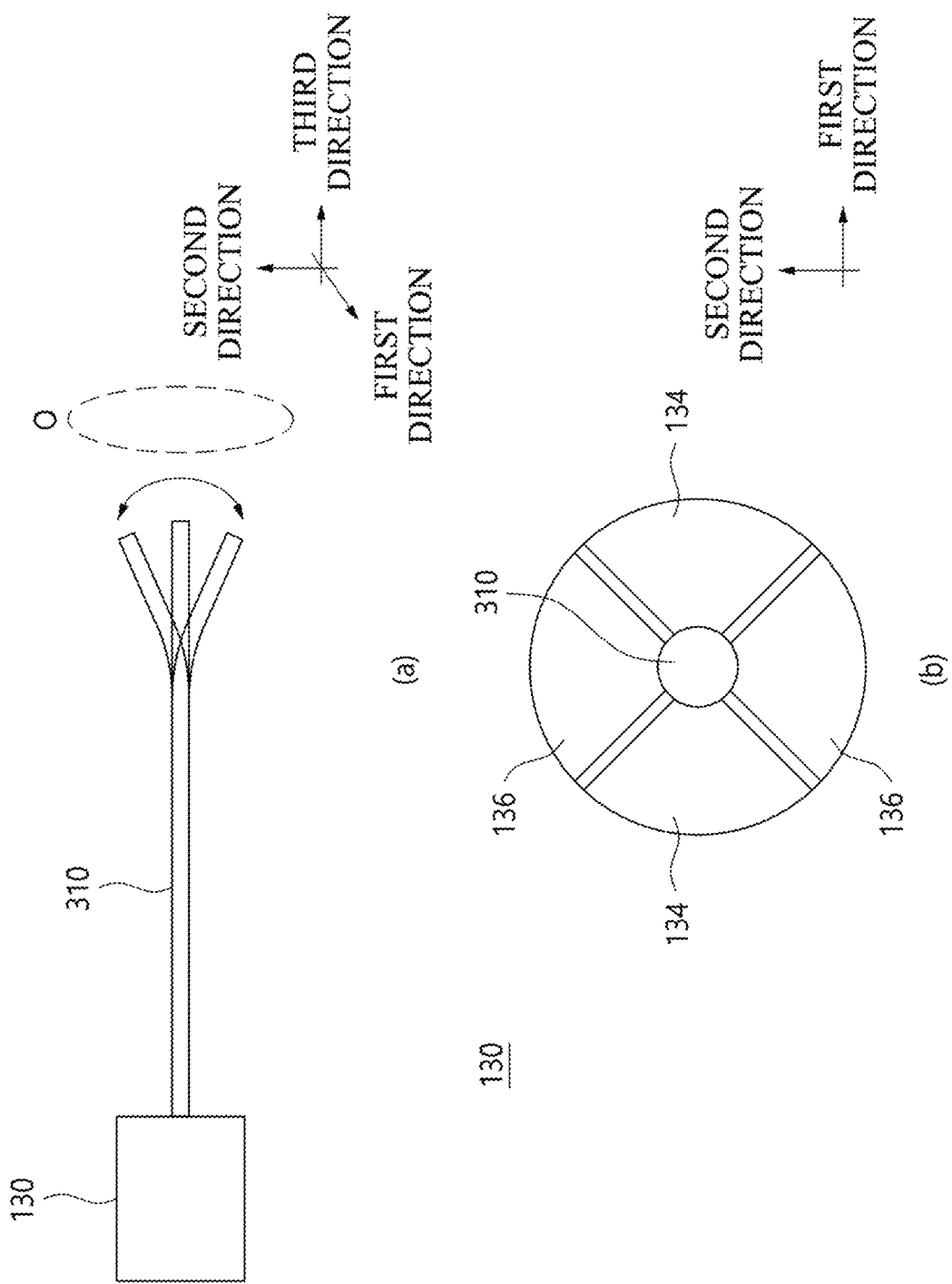
FIG. 3A is a schematic diagram showing a portion of an image generation device including a driver 130 and a fiber 310 according to an embodiment.
FIG. 3B is a cross-sectional view of the driver 130 and the fiber 310 when viewed from the front according to an embodiment.

FIG. 3A is a schematic diagram showing a portion of an image generation device including a driver 130 and a fiber 310 according to an embodiment, and FIG. 3B is a cross-sectional view of the driver 130 and the fiber 310 when viewed from the front.

Referring to FIG. 3A, at least a portion of the fiber 310 may be housed in at least a portion of the driver 130. In other words, at least a portion of the fiber 310 may be coupled to the driver 130.

Thus, when the driver 130 receives an electric signal from the controller 110 and then is driven, the fiber 310 may be driven such that a light traveling path exhibits a specific pattern in a certain area of an object.

As a specific example, when light generated by the light generator 120 is emitted to an object, the driver 130 receives an electric signal capable of generating a Lissajous pattern and then is driven such that a path of the fiber 310 pointing to the object is the Lissajous pattern.

Although not shown in FIG. 3A, an additional attachment may be attached to the fiber 310. For example, the additional attachment may be a mass for increasing an amplitude in which the fiber 310 is driven or a structure attached onto the fiber 310 and configured to separate the resonance frequency of the fiber 310 in at least one direction.

Referring to FIG. 3B, the fiber 310 and elements of the driver 130 according to an embodiment may be provided.

For example, referring to FIG. 3B, the driver 130 may include a first-axis driving element, a second-axis driving element, and an insulating element. Here, the first-axis driving element and the second-axis driving element may be separated by an insulating strip 132, and each of the driving elements may be composed of a set of one or more driving elements. In other words, the first-axis driving element may include at least one driving element to drive the driver 130 or the fiber 310 in a first-axis direction, and the second-axis driving element may include at least one driving element to drive the driver 130 or the fiber 310 in a second-axis direction. Here, the first axis and the second axis may be one axis determined in a plane where an object is scanned and an axis perpendicular to the axis. That is, in the plane where the object is scanned, the first axis may refer to an x-axis, and the second axis may be a y-axis. Conversely, the first axis may be a y-axis, and the second axis may be an x-axis.

1.1.2. General Information about Image Generation Device not Using Fiber 310

According to an embodiment, an image generation device in which an element in a path traveled by light generated by the light generator 120 of the image generation device is not a fiber 310 may be provided. In other words, when light is emitted to an object, an image generation device that emits the light to the object in a specific pattern may be provided.

For example, an image generation device in which an element in a path traveled by light generated by the light generator 120 is a mirror may be provided. In detail, when the light generated by the light generator 120 is incident on the mirror through a light transmission medium including air, vacuum, or the like, the mirror reflects the light and directs the light to the object. Here, the mirror capable of reflecting light may include an element formed of a material capable of directing light, such as a MEMS mirror.

According to another embodiment, an image generation device in which an element in a path traveled by light generated by a light generator 120 is a light receiver 140 may be provided.

For example, when light is emitted to an object and returned from the object, the light receiver 140 may be driven by the driver 130. Specifically, the light receiver 140 may be driven such that a path of a pixel from which light information is acquired is a specific pattern.

1.2. Data Acquisition Method of Image Generation Device

A method of acquiring data including light information acquired through the light receiver 140 of the image generation device will be described below.

Figure 4:
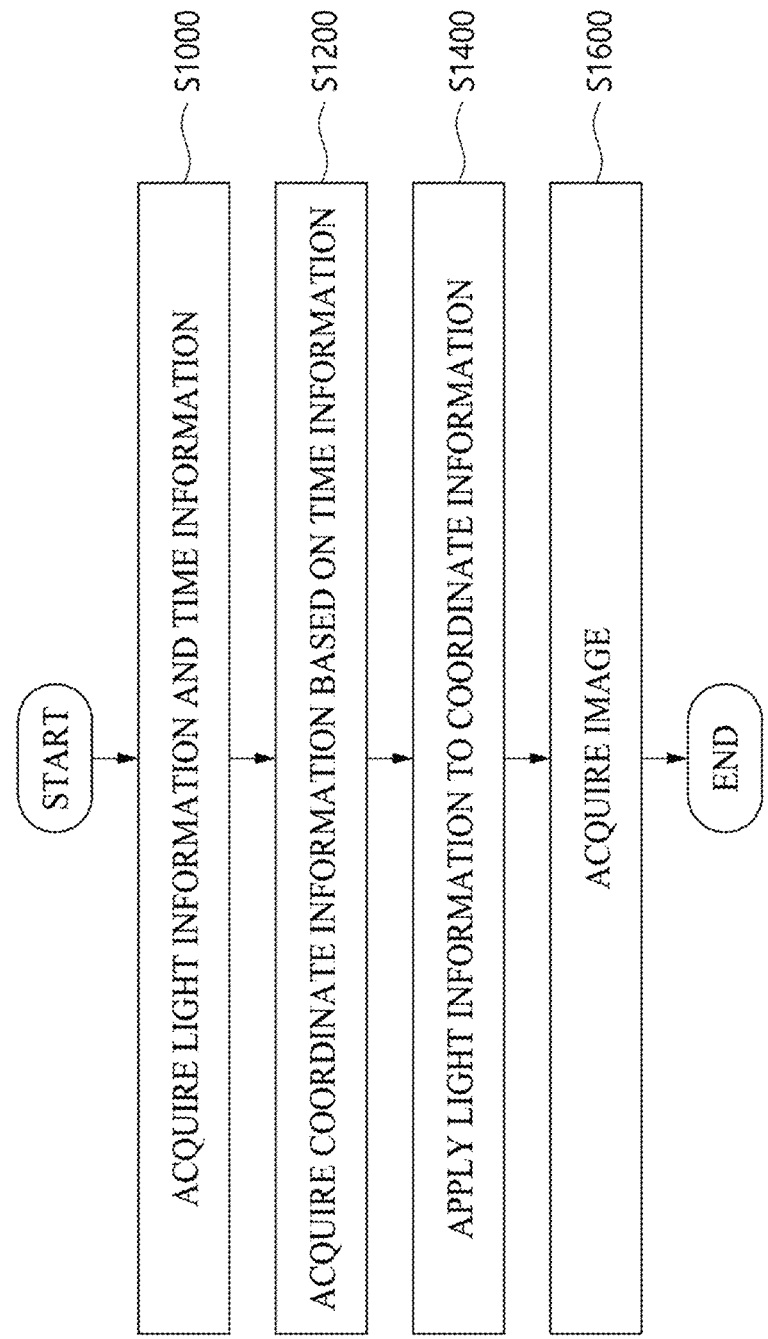
FIG. 4 is a flowchart illustrating a method of an image generation device acquiring data for reconstructing an image according to an embodiment.

FIG. 4 is a flowchart illustrating a method of an image generation device acquiring data for reconstructing an image according to an embodiment.

Referring to FIG. 4, the method of the image generation device acquiring data for reconstructing an image may include acquiring light information and time information (S1000), acquiring coordinate information based on the time information (S1200), applying light information to the coordinate information (S1400), and acquiring an image (S1600).

FIG. 5 is a table schematically showing light information acquired according to time information.

However, the following tables of the data acquisition method and data storage method shown in FIGS. 5, 6, 17, and 23 are schematically written for convenience of description, and actually, data may be acquired as described in the tables. However, this does not mean that actually stored or acquired data conforms to the table format.

Referring to FIGS. 4 and 5, the operation of acquiring the light information and acquiring the time information (S1000) may include acquiring the time information at the same time a controller 110 acquires the light information through a light receiver 140.

Alternatively, referring to FIGS. 4 and 5, the operation of acquiring the light information and acquiring the time information (S1000) may include a controller 110 acquiring the time information based on a predetermined time interval, acquiring the light information based on a predetermined time interval, and correlating the acquired time information with the acquired light information regardless of whether the light receiver 140 acquires the light information.

Here, the acquired time information may be acquired in proportion to the number of pieces of light information. That is, when n pieces of light information are acquired from the light receiver 140, the controller 110 may acquire n pieces of time information. Here, n may be an integer greater than or equal to one.

For example, referring to FIG. 5, when the pieces of light information acquired by the controller 110 are sequentially i1, i2, and i3 and the pieces of light information are acquired at t1, t2, and t3, the controller 110 may acquire or store data indicating that i1 is acquired at time t1, i2 is acquired at time t2, and i3 is acquired at time t3.

FIG. 6 is a table schematically showing light information corresponding to coordinate information according to an embodiment.

Referring to FIGS. 4 and 6, the operation of acquiring the coordinate information on the basis of the time information (S1200) may include deriving the coordinate information using the acquired time information. In other words, the coordinate information may be acquired by a predetermined relationship between the time information and the coordinate information. The predetermined relationship may be the coordinate information or a reconstruction signal for reconstructing an image.

$$x = A_x \sin(f_x t + \varphi_x); y = A_y \sin(f_y t + \varphi_y) \quad \text{[Equation 1]}$$

Equation 1 is an equation representing a reconstruction signal that can be used to convert time information into coordinate information and a driving signal that is for determining a pattern in which light is emitted to an object according to an embodiment.

Referring to Equation 1, x represents first-axis coordinate information, $A_x$ is first-axis amplitude and represents the amplitude of the driving signal or the reconstruction signal in the first axis, $f_x$ is a first-axis frequency and represents the frequency of the driving signal or the reconstruction signal in the first axis, t represents time information, and $\varphi_x$ is a first-axis phase and represents the phase of the driving signal or the reconstruction signal in the first axis. Also, in Equation 1, y represents second-axis coordinate information, $A_y$ is second-axis amplitude and represents the amplitude of the driving signal or the reconstruction signal in the second axis, $f_y$ is a second-axis frequency and represents the frequency of the driving signal or the reconstruction signal in the second axis, t represents time information, and $\varphi_y$ is a second-axis phase and represents the phase of the driving signal or the reconstruction signal in the second axis.

Hereinafter, for convenience of description, a signal indicating the first-axis coordinate information and the first-axis signal may be interchangeably used, and a signal indicating the second-axis coordinate information and the second-axis signal may be interchangeably used.

Also, here, the unit of the phase may be a time, a frequency domain, or a radian. However, the present invention is not limited thereto, and all units capable of expressing phases may be the unit of the phase.

Referring to FIG. 6 and Equation 1, the coordinate information acquired by the controller 110 may refer to coordinate information in a Cartesian coordinate system. However, the present invention is not limited thereto, and the coordinate information that may be acquired by the controller 110 may include coordinate information in a polar coordinate system, 3-dimensional coordinate information, 4-dimensional coordinate information, coordinate information in a spherical coordinate system, coordinate information in a cylindrical coordinate system, coordinate information in a torus coordinate system, etc. However, the coordinate system used for the coordinate information does not refer to a coordinate system in one domain. When variables included in the coordinate system are present in different domains, the same coordinate may be used. For example, a Cartesian coordinate system may be used when time and intensity are used as variables or when frequency and intensity are used as variables.

For example, referring to FIG. 5, FIG. 6, and Equation 1, coordinate information including the first-axis coordinate information and the second-axis coordinate information may be acquired from time information acquired by the controller 110.

As a specific example, it is assumed that the time information is t1 and the acquired light information is t1. When t1 is substituted for a reconstruction signal capable of converting the time information into the coordinate information, the controller 110 may acquire x1, which is the first-axis coordinate information, and y1, which is the second-axis coordinate information. In other words, when the time information acquired by the controller 110 is t1, the controller 110 may acquire x1 and y1, which are pieces of coordinate information that can represent one point in a two-dimensional plane, from the time information t1. Likewise, when the time information acquired by the controller 110 is t2 and t3, the controller 110 may acquire x2 and y2, which correspond to the time information t2, and x3 and y3, which correspond to the time information t3. Here, when the number of pieces of time information acquired by the controller 110 is n, the controller 110 may acquire n pieces of first-axis coordinate information (x) and n pieces of second-axis coordinate information (y) according to the time information.

Referring to FIGS. 4 and 6, the operation of applying the light information to the coordinate information (S1400) may include the above operation of the controller 110 applying the acquired light information to the coordinate information acquired through the time information on the basis of the reconstruction signal.

However, referring to FIG. 4, the operation of acquiring the coordinate information on the basis of the time information (S1200) and the operation of applying the light information to the coordinate information (S1400) may be shown as separate operations. However, the present invention is not limited thereto, and the light information may be substituted while acquiring the coordinate information. In other words, among the data regarding the acquired time information and light information, the controller 110 may change only the time information into the coordinate information. Accordingly, the light information is not actually substituted for the acquired coordinate information, and the time information is changed to the coordinate information. Thus, the light information may correspond to the coordinate information. Hereinafter, the light information corresponding to the coordinate information or the time information is expressed as the substitution of the light information for the time information or the coordinate information.

Figure 7:
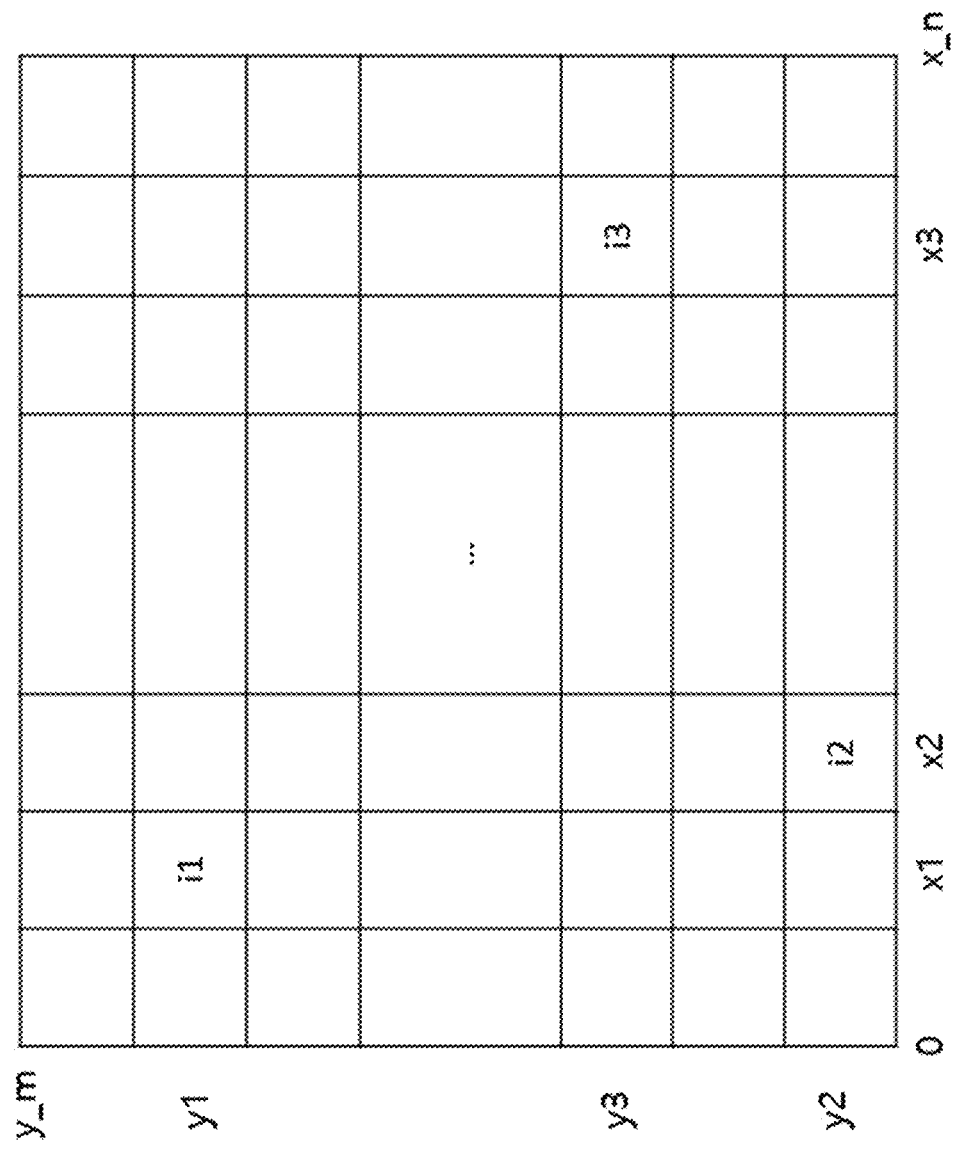
FIG. 7 is a schematic diagram showing light information acquired for each pixel of an image to reconstruct an image according to an embodiment.

FIG. 7 is a schematic diagram showing light information acquired for each pixel of an image to reconstruct an image according to an embodiment.

However, the reconstructed image and the schematic diagram of the pixel upon the image reconstruction in addition to FIG. 7 are just used for convenience of the following description and may refer not to the provision of an actual image but to a state of only the light information and the coordinate information being acquired.

Referring to FIGS. 4 and 7, the operation of acquiring the image (S1600) includes reconstructing the image on the basis of the acquired coordinate information and light information.

Here, the acquired coordinate information may correspond to pixel information of the reconstructed image. In other words, the coordinate information may be the same as pixel information, or the pixel information may be derived from the coordinate information. In this case, the pixel information may refer to location information including coordinate information of a pixel in an image.

Also, a pixel which will be described below may be a unit for expressing light information in an image. In other words, an image acquired by the controller 110 may include a plurality of pixels for representing the light information. Here, the size of the unit pixel may be determined based on the predetermined number of pixels and the size of the acquired image. Likewise, the number of unit pixels may be determined based on the size of the pixels and the size of the acquired image.

Also, the acquired image may have various resolutions. For example, the acquired image may have various resolutions including 256×256, 512×512, 1024×1024, 800×600 (SVGA), 1024×768 (XGA), 1280×800 (WXGA), 1920×1080 (FHD), 1920×1200 (WUXGA), 2560×1440 (QHD), 3840×2160 (UHD (4K)), or 7680×4320 (UHD (8K)). However, the present invention is not limited thereto, and when a plurality of pixels for displaying an image are included, the resolutions of the image acquired by the controller 110 may include a resolution corresponding to the pixels. The above-described resolution may refer to the actual number of pixels. However, the present invention is not limited thereto, and the resolution may refer to the number of pixels on the basis of parts per inch (PPI).

For example, referring to FIG. 7, the acquired image may include n pixels in the first axis and include m pixels in the second axis. In this case, the light information may be substituted for the pixel information corresponding to the acquired coordinate information. Accordingly, when the light information is substituted for the plurality of pixels, the controller 110 may acquire an image of an object.

In this case, when the phase or the like of a reconstruction signal for reconstructing the coordinate information is different from that of a signal forming a pattern in which light is actually omitted to the object, the acquired image may be distorted and provided.

Accordingly, the phase correction of the reconstruction signal may be required and will be described in detail below in the following related section.

2. Generation of Image Using Scanning Pattern

A method of generating an image using a scanning pattern will be described below. Here, an acquired image may be an image for a single moment, or the acquisition of one frame in a continuous video of an object may be expressed as the acquisition of the image.

In other words, when images are continuously acquired from an object, the controller 110 may acquire a video of the object.

Figure 8:
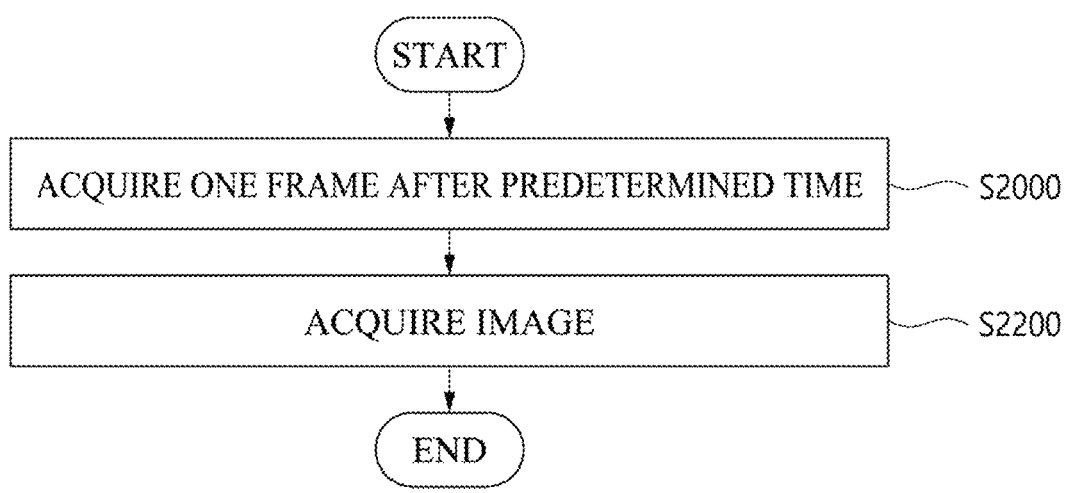
FIG. 8 is a flowchart illustrating a method of acquiring one frame so that an image is acquired according to an embodiment.

FIG. 8 is a flowchart illustrating a method of acquiring one frame so that an image is acquired according to an embodiment.

Referring to FIG. 8, the method of acquiring one frame may include acquiring one frame after a predetermined time (S2000) and acquiring an image (S2200).

According to an embodiment, the operation of acquiring one frame after the predetermined time (S2000) may include the controller 110 acquiring one frame every predetermined time.

According to another embodiment, the operation of acquiring one frame after the predetermined time (S2000) may include the controller 110 acquiring one frame every unit time in which a scanning pattern is repeated on the basis of the scanning pattern being repeated after the predetermined time.

According to another embodiment, the operation of acquiring one frame after the predetermined time (S2000) may include the controller 110 acquiring one frame before the scanning pattern is repeated.

Here, the scanning pattern may be the pattern in which the light is emitted to the object or may refer to the pattern of the reconstruction signal for reconstructing the image.

Also, the controller 110 acquiring one frame may mean that the controller 110 acquires time information, coordinate information, and the light information every predetermined time. Alternatively, the controller 110 acquiring one frame may mean that the controller 110 acquires the image on the basis of the acquired time information, coordinate information, and light information. Alternatively, the controller 110 acquiring one frame may mean that the controller 110 designates data for generating an image on the basis of time information, coordinate information, and light information for acquiring the image as data for one frame.

According to another embodiment, additionally, the controller 110 may acquire an image using coordinate information acquired for pixel information or light information corresponding to the coordinate information.

In other words, the controller 110 does not substitute new coordinate information or light information corresponding to the coordinate information for all pixel information every frame after one frame is acquired once. Instead, whenever coordinate information or light information corresponding to the coordinate information is acquired for corresponding pixel information, the controller 110 may substitute the light information for the corresponding pixel information. That is, for each piece of pixel information, the light information may be updated for each pixel regardless of whether one frame is acquired.

Here, the light information being updated may mean that a value of the light information substituted for the corresponding pixel information is changed to newly acquired light information.

Conditions for the controller 110 to acquire one frame will be described in detail in the following related section.

The operation of acquiring the image (S2200) may be identical to the operation of acquiring the image (S1600) shown in FIG. 4. In other words, the operation of acquiring the image (S2200) may be an operation of the controller 110 acquiring and providing an image of an object.

2.1. Frequency Selection for Image Generation

A method of the controller 110 selecting a frequency of a reconstruction signal or a driving signal so as to minimize coordinate information or pixel information for which light information is not substituted will be described below.

Figure 9:
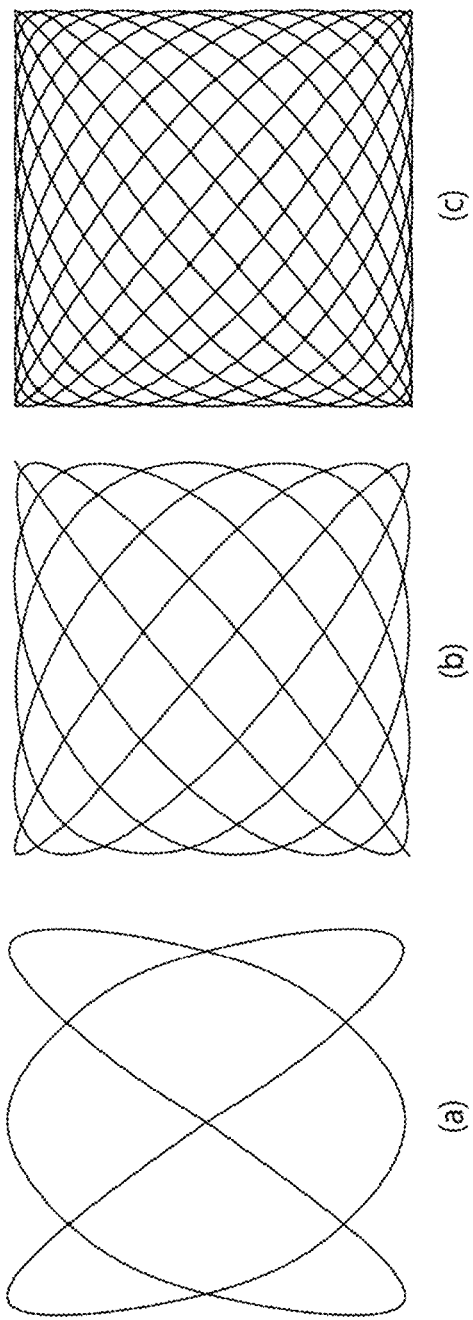
FIG. 9 is a diagram showing that the form of a pattern changes along with the change in frequency of a signal that generates the pattern according to an embodiment.

FIG. 9 is a diagram showing that the form of a pattern changes along with the change in frequency of a signal that generates the pattern according to an embodiment.

According to an embodiment, the controller 110 may acquire different pattern shapes depending on the selection of a first-axis frequency and a second-axis frequency and the difference between a first-axis phase and a second-axis phase. In other words, a fill factor (hereinafter referred to as FF) which indicates the occupancy portion of a specific area may vary depending on the selection of a first-axis frequency and a second-axis frequency and the difference between a first-axis phase and a second-axis phase. Here, FF may be expressed as a percentage or may be expressed as having a value between 0 and 1.

Referring to Equation 1 again, the first-axis frequency and the second-axis frequency may refer to $f_x$ and $f_x$ of the reconstruction signal or the driving signal, respectively.

Here, FF may refer to a ratio of the area to which light is actually emitted to the area of a scanned object.

Alternatively, FF may refer to a ratio of the number of pixels from which coordinate information or pixel information is acquired by the reconstruction signal to the total number of pixels of the acquired image. In other words, FF may refer to a ratio of the number of pixels from which light information is actually acquired to the total number of pixels of the acquired image.

Accordingly, when the acquired image is reconstructed, the controller 110 may acquire an image with a substantially high resolution when the FF is high. Here, this may mean that light information is acquired for more pixels in the image with the substantially high resolution than in an image with a low resolution. In other words, the image with the substantially high resolution may refer to an image with better quality.

As a specific example, referring to FIG. 9, FIG. 9A is a diagram showing a case in which the first-axis frequency is 4 Hz and the second-axis frequency is 6 Hz, FIG. 9B is a diagram showing a case in which the first-axis frequency is 7 Hz and the second-axis frequency is 8 Hz, and FIG. 9C is a diagram showing a case in which the first-axis frequency is 16 Hz and the second-axis frequency is 19 Hz.

Here, referring to FIG. 9, when the first-axis frequency and the second-axis frequency are in similar bands, FF may increase as the greatest common divisor (GCD) of the first-axis frequency and the second-axis frequency decreases.

As a specific example, referring to FIGS. 9A and 9B, the GCD of the first-axis frequency and the second-axis frequency of FIG. 9A is two and the GCD of the first-axis frequency and the second-axis frequency of FIG. 9B is one. Thus, the pattern of FIG. 9B has a greater FF than the pattern of FIG. 9A.

Also, referring to FIG. 9, FF may increase as the first-axis frequency or the second-axis frequency is set to be high.

As a specific example, referring to FIGS. 9B and 9C, both of the GCD of the first-axis frequency and the second-axis frequency of FIG. 9B and the GCD of the first-axis frequency and the second-axis frequency of FIG. 9C are one, but the band of the first-axis frequency and the second-axis frequency of FIG. 9C is set to be higher than the band of the first-axis frequency and the second-axis frequency of FIG. 9B. Thus, the pattern of FIG. 9C may have a greater FF than the pattern of FIG. 9B.

Here, the first-axis frequency and the second-axis frequency set for the driving signal or the reconstruction signal may be set based on the resonant frequency of the fiber 310 of the image generation device so that the fiber 310 can be resonantly driven.

3. Image Correction

A method of the controller 110 correcting the phase of a reconstruction signal for reconstructing coordinate information or pixel information when an image is distorted because the phase of the reconstruction signal is different from the phase of a signal forming a pattern in which light is actually emitted to an object will be described below.

Here, the correction of the phase of the reconstruction signal may include the controller 110 reflecting a phase correction value in the reconstruction signal and acquiring coordinate information on the basis of the reconstruction signal in which the phase correction value is reflected.

In the present application, for convenience of description, the term "correction" used herein may refer to calibration.

3.1. General Information about Image Correction

Figure 10:
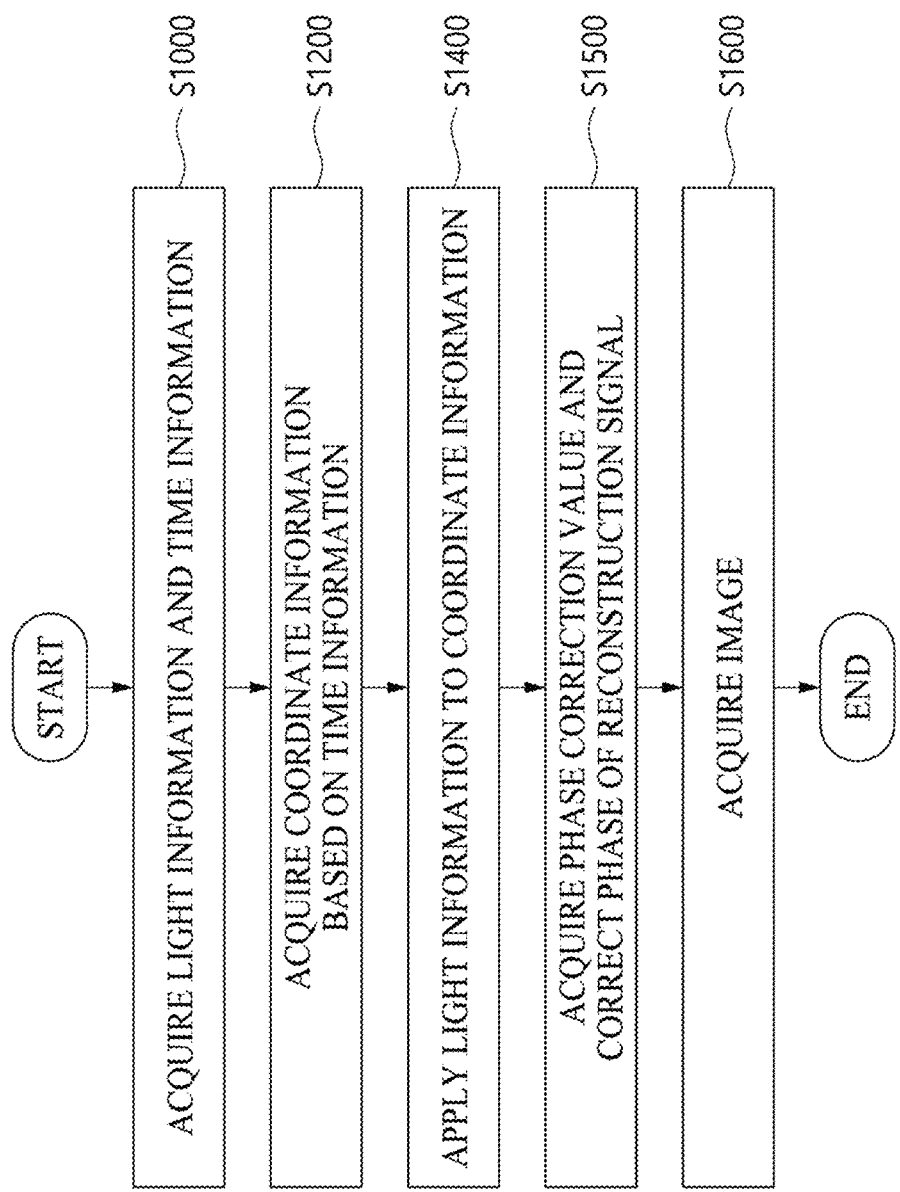
FIG. 10 is a flowchart illustrating a method of an image generation device acquiring data in which the phase of a reconstruction signal is corrected according to an embodiment.

FIG. 10 is a flowchart illustrating a method of an image generation device acquiring data in which the phase of a reconstruction signal is corrected according to an embodiment.

Referring to FIG. 10, the method of the controller 110 acquiring an image in which the phase of a reconstruction signal is corrected may include acquiring light information and time information (S1000), acquiring coordinate information based on the time information (S1200), applying the light information to the coordinate information (1400), acquiring a phase correction value and correcting the phase of a reconstruction signal (S1500), and acquiring an image (S1600).

Referring to FIGS. 4 and 10 above, the method of acquiring data in which a phase is corrected may include the operation of acquiring a phase correction value and correcting the phase of a reconstruction signal (S1500) in addition to the method of the image generation device acquiring image reconstruction data which is shown in FIG. 4.

In order to reduce distortion of the image acquired by the controller 110, the operation of acquiring the phase correction value and correcting the phase of the reconstruction signal (S1500) may include correcting the phase of the reconstruction signal using artificial intelligence based on deep learning or neural network learning or using a phase correction algorithm or the like such that coordinate information or pixel information acquired based on the reconstruction signal is corrected.

FIG. 11 is a diagram showing an original image of an object and an image of the object reconstructed based on a reconstruction signal with a phase delay according to an embodiment. Specifically, FIG. 11A is a diagram showing that an image of an object is acquired based on a reconstruction signal with a phase delay, and FIG. 11B is a diagram showing that an image of an object is acquired based on a reconstruction signal with no phase delay.

Here, the phase of the reconstruction signal being delayed may mean that the phases of the first-axis signal and the second-axis signal forming a pattern generated when light is emitted to an object on the basis of a driving signal are different from the phases of the first-axis signal and the second-axis signal of the reconstruction signal. That is, the phase of the reconstruction signal not being delayed may mean that the pattern in which the light is emitted to the object is identical or similar to the pattern which is based on the reconstruction signal.

In other words, the phase of the reconstruction signal being delayed may mean that when coordinate information or pixel information is acquired based on the reconstruction signal, light information is acquired in coordinate information or pixel information other than coordinate information or pixel information acquired based on the reconstruction signal with no phase delay.

FIG. 12 is a table schematically showing coordinate information and light information corresponding to the coordinate information on the basis of a reconstruction signal with a phase delay according to an embodiment.

For example, referring to FIGS. 6 and 12, FIG. 6 shows coordinate information acquired based on a reconstruction signal with no phase delay and light information corresponding to the coordinate information, and FIG. 12 shows coordinate information acquired based on a reconstruction signal with a phase delay and light information corresponding to the coordinate information. Here, when light information acquired in a coordinate x1, which is one piece of first-axis coordinate information, and a coordinate y1, which is one piece of second-axis coordinate information, is based on a reconstruction signal with no phase delay, i1, which is one piece of the light information, may be acquired. On the other hand, when the light information is based on a reconstruction signal with a phase delay, i2 may be acquired. That is, when the phase of the reconstruction signal is delayed, different light information may be acquired in coordinate information indicating the same coordinate as that when the phase of the reconstruction signal is not delayed.

As described above, since the phase of the reconstruction signal is delayed for a predetermined reason, light information for reconstructing an image cannot be acquired at original coordinates where the light information should have been acquired but may be acquired at different coordinates.

Here, the phase of the reconstruction signal may be delayed because the actual driving signal and a signal by which the fiber 310 is driven are different from each other. Alternatively, the phase of the reconstruction signal may be delayed due to movement caused by a user actually operating the image generation device. Alternatively, the phase of the reconstruction signal may be delayed due to the difference in time until light returned from an object is acquired by the light receiver 140. Alternatively, when the driver 130 is to be driven by a driving signal, the phase of the reconstruction signal may be delayed because the driver 130 is not actually driven by the driving signal. In addition to the above example, the phase of the reconstruction signal may be delayed due to physical characteristics resulting from the driver 130, the fiber 310, and the light receiver 140.

Also, image distortion may occur in addition to the delay of the reconstruction signal.

Figure 13:
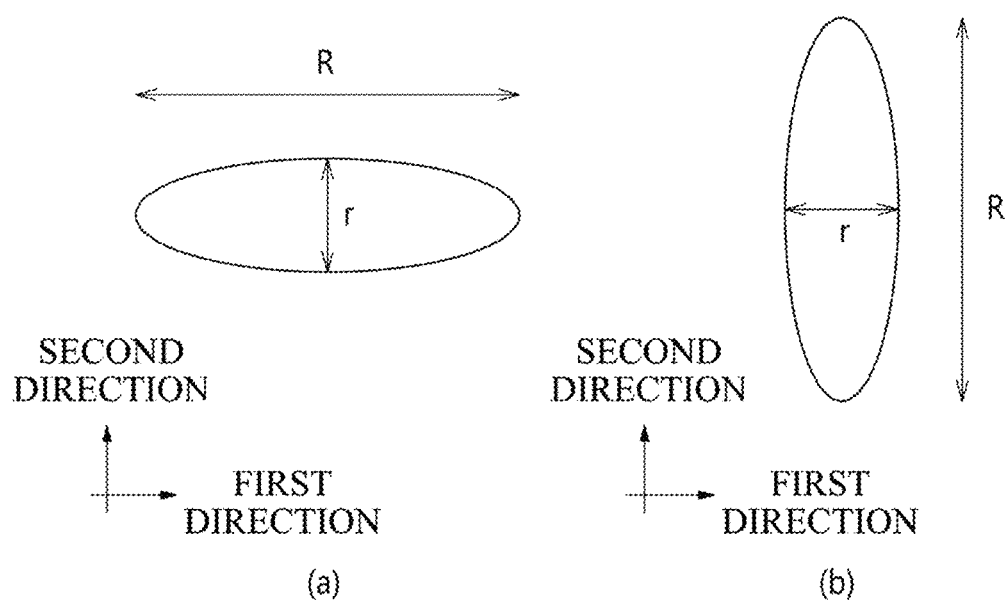
FIG. 13 is a schematic diagram showing that a mechanical coupling (MC) phenomenon occurs when the fiber 310 is driven according to an embodiment.

FIG. 13 is a schematic diagram showing that a mechanical coupling (MC) phenomenon occurs when the fiber 310 is driven according to an embodiment.

Here, the MC phenomenon may mean that the bands of the first-axis frequency and the second-axis frequency of the driving signal are not sufficiently separated and that when the fiber 310 is driven in the first axis, the fiber 310 is also driven in the second axis.

Here, an ellipse shown in FIG. 13 may indicate the movement of an end of the fiber 310 or may indicate a trace of light emitted to an object.

Specifically, FIG. 13A may show a trace of light at an object or an end of the fiber 310 when the driver 130 drives the fiber 310 only in the first axis according to an embodiment. Also, FIG. 13B may show a trace of light at an object or an end of the fiber 310 when the driver 130 drives the fiber 310 only in the second axis according to an embodiment.

According to an embodiment, even when the driver 130 drives the fiber 310 only in one axis, the fiber 310 may be driven in another axis. Here, when the driver 130 drives the fiber 310 in one axis but the fiber 310 is driven in another axis, this may mean that an MC phenomenon has occurred.

For example, referring to FIGS. 13A and 13B, an axis in which the driver 130 intends to drive the fiber 310 may be an axis that is driven in a range as much as R, but in practice, the fiber 310 may be driven by the driver 130 in an axis direction with an unintended range as much as r. In other words, the driver 130 may apply a signal or force to drive the fiber 310 in the first axis or the second axis by the range R, but the fiber 310 may be additionally driven in the second axis or the first axis by the range r.

This may mean that an MC phenomenon has occurred because the axis in which the driver 130 drives the fiber 310 is different from the axis in which the fiber 310 is resonantly driven. Alternatively, when frequency separation in the first axis and the second axis of the fiber 310 is not sufficiently performed, this may mean that an MC phenomenon has occurred.

When the MC phenomenon has occurred, a first-axis MC signal and a second-axis MC signal are additionally acquired as the reconstruction signal in addition to the first-axis signal and the second-axis signal to acquire coordinate information. In other words, in order for the reconstruction signal to be reconstructed into the signal forming the pattern in which the light is actually emitted to the object, the first-axis MC signal and the second-axis MC signal may need to be additionally acquired in addition to the acquisition of the phase delay values of the first-axis signal and the second-axis signal.

Here, the first-axis MC signal may have the same frequency as the second-axis signal. Likewise, the second-axis MC signal may have the same frequency as the first-axis signal. This is because, for example, when the MC phenomenon has occurred, the fiber 310 is driven in the first axis and the second axis even though a driving signal input by the driver 130 is the first-axis signal.

Also, in addition to correcting the phase delays of the first-axis signal and the second-axis signal from an initial signal of the reconstruction signal, the controller 110 may set initial signals of the first-axis MC signal and the second-axis MC signal and correct the phase delays of the first-axis MC signal and the second-axis MC signal. This is because the controller 110 can acquire an image by correcting the difference with the pattern in which the light is actually emitted to the object on the basis of the first-axis MC signal and the second-axis MC signal that are initially set.

Accordingly, apart from the phase delay, image distortion may occur when an MC phenomenon occurs. The controller 110 may correct the delayed phase of the reconstruction signal or may correct the occurrence of an MC phenomenon on the basis of the reconstruction signal.

Figure 14:
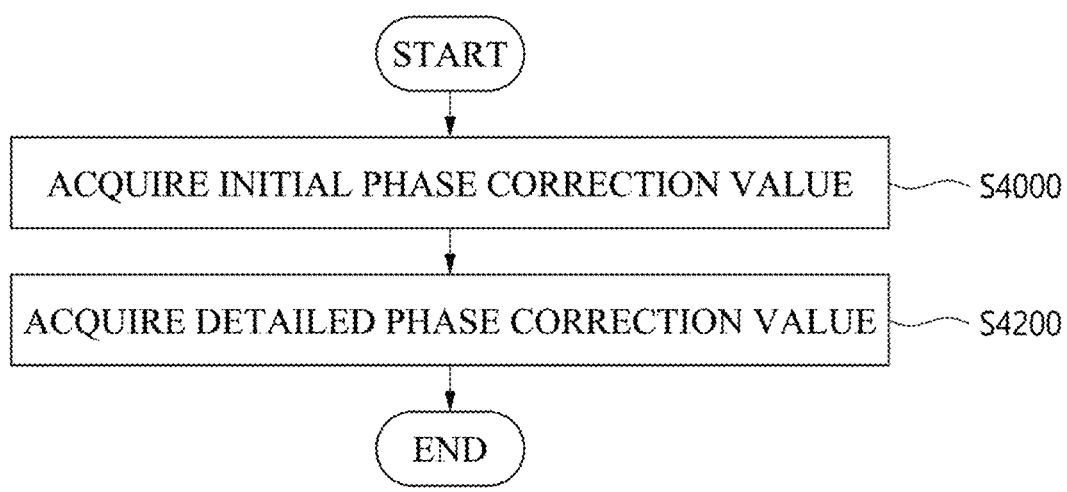
FIG. 14 is a flowchart illustrating a method of a controller 110 performing phase correction according to an embodiment.

FIG. 14 is a flowchart illustrating a method of the controller 110 performing phase correction according to an embodiment.

Referring to FIG. 14, the method of the controller 110 performing phase correction may include acquiring an initial phase correction value (S4000) and acquiring a detailed phase correction value (S4200).

Here, the phase correction value may refer to a value for correcting the delayed phase of the reconstruction signal. In other words, the phase correction value may be a value that is added to or subtracted from the phase of the reconstruction signal to correct the phase of the reconstruction signal.

Here, the method of the controller 110 performing phase correction may be an operation that is included in or identical to the above operation of acquiring the phase correction value and correcting the phase of the reconstruction signal of FIG. 10 (1500).

The operation of acquiring the initial phase correction value (S4000) may include acquiring a phase approximately adjacent to the delayed phase of the reconstruction signal in the entire phase range of the reconstruction signal in order for the controller 110 to correct the delayed phase of the reconstruction signal. Here, the phase adjacent to the delayed phase of the reconstruction signal where the initial phase correction value is positioned may have different adjacent ranges depending on the initial phase correction method.

The method of the controller 110 acquiring the initial phase correction value will be described in detail in the following related section.

The operation of acquiring the detailed phase correction value (S4200) may include generating coordinate information by changing the phase of the reconstruction signal in order to actually acquire the delayed phase value of the reconstruction signal in the initial phase correction value so that the controller 110 can correct the delayed phase of the reconstruction signal. Here, the detailed phase correction value may be the same as or substantially the same as the actual phase delay value of the reconstruction signal.

In this case, the detailed phase correction value and the actual phase delay value of the reconstruction signal being substantially the same may mean that the detailed phase correction value is within an error range from the actual phase delay value of the reconstruction signal. Here, the error range may be determined by the quality of the image acquired by the image generation device.

According to an embodiment, when the quality of the image provided by the image generation device is high, the error range may be set to be small. In other words, a search phase unit in which the controller 110 searches in order to acquire the detailed phase correction value may be set to be small.

According to another embodiment, when the quality of the image provided by the image generation device is low, the error range may be set to be large. In other words, a search phase unit in which the controller 110 searches in order to acquire the detailed phase correction value may be set to be large.

In addition to the aforementioned embodiments, the controller 110 may search for the detailed phase correction value on the basis of a search phase unit fixed to acquire the detailed phase correction value.

The controller 110 searching for the phase correction value may mean an operation of acquiring a phase correction value which will be described below.

3.2. Acquisition of Initial Phase Correction Value

The method of the controller 110 acquiring the initial phase correction value will be described below.

However, the initial phase correction does not mean that the controller 110 corrects the phase of the reconstruction signal only at the initial stage, and the controller 110 may acquire even the detailed phase correction value using the method of acquiring the initial phase correction value.

3.2.1. Type of Initial Phase Correction Method

According to an embodiment, a user of the image generation device may directly change the phase of the reconstruction signal to search for the initial phase correction value.

For example, when a phase adjustment unit configured to adjust the phase of the first-axis signal and the second-axis signal of the reconstruction signal is included in the image generation device, the user may adjust the phase of the reconstruction signal using the phase adjustment unit. Here, the controller 110 may generate coordinate information or pixel information on the basis of the phase of the reconstruction signal adjusted by the user using the phase adjustment unit, and the display 160 may display an image on the basis of light information and the coordinate information or pixel information. Accordingly, the user may acquire an image of an object while adjusting the phase of the reconstruction signal using the phase adjustment unit.

According to another embodiment, a random search method may be used for the controller 110 to perform the initial phase correction.

For example, the random search method may include a method of setting the phase of the reconstruction signal to a plurality of arbitrary phase values and selecting a phase similar to each delayed phase of the reconstruction signal as an initial phase correction value. Accordingly, the controller 110 may acquire a detailed phase correction value on the basis of the selected initial phase correction value.

According to another embodiment, an exhaustive search (brute-force search) method may be used for the controller 110 to perform the initial phase correction.

For example, the exhaustive search method may include a method of the controller 110 setting each phase of the reconstruction signal in the entire phase range of the reconstruction signal and selecting a phase similar to each delayed phase of the reconstruction signal as an initial phase correction value.

Also, according to another embodiment, the controller 110 may perform initial phase correction by acquiring coordinate information from a phase domain rather than acquiring coordinate information or the like from a sine function domain, which is a restoration signal format, in order to perform the initial phase correction.

The method of the controller 110 acquiring the phase correction value of the reconstruction signal from the phase domain will be described in detail in the following related section.

In addition to the aforementioned embodiments, the controller 110 may acquire the initial phase correction value on the basis of a convexity method using a tendency corresponding to a change in the phase value of the reconstruction signal, a minimum search method using artificial intelligence including machine learning or neural network learning, or a conventional algorithm for searching for the lowest value.

3.2.2. Orbifold Method

The method of the controller 110 performing initial phase correction by acquiring coordinate information from a phase domain according to an embodiment rather than acquiring coordinate information or the like from a sine function domain, which is a restoration signal format, in order to perform the initial phase correction will be described below.

Here, the domain may refer to a dimension of a reconstruction signal used by the controller 110 to acquire coordinate information. In other words, the domain may refer to a space in which the controller 110 arranges a reconstruction signal to acquire coordinate information.

According to an embodiment, the controller 110 may acquire the coordinate information from the phase domain on the basis of the orbifold method and perform phase correction on the reconstruction signal. Here, the orbifold method may mean that the phase correction is performed in a domain other than the sine function domain of the reconstruction signal.

For example, when the reconstruction signal converts time information into coordinate information on the basis of a sine function including trigonometric functions, this may mean that the coordinate information is acquired in the sine function domain, and the domain of the reconstruction signal may refer to the sine function domain.

The domain in which the correction phase value of the reconstruction signal is acquired will be described below.

3.2.2.1. Domain in which Correction Phase Value is Acquired

According to an embodiment, the domain of the reconstruction signal may be a sine function domain.

For example, referring to Equation 1 again, when the reconstruction signal converts time information into coordinate information on the basis of a sine function including trigonometric functions, this may mean that the coordinate information is acquired in the sine function domain, and the domain of the reconstruction signal may refer to the sine function domain.

According to another embodiment, the domain of the reconstruction signal may be a phase domain.

$$x' = A_x(f_x t + \varphi_x), (\mathrm{mod}\ T)\ \ y' = A_y(f_y t + \varphi_y)(\mathrm{mod}\ T) \quad \text{[Equation 2]}$$

Equation 2 is an equation representing a reconstruction signal that is in the phase domain and that can be used to convert time information into coordinate information.

Referring to Equation 2, x' represents first-axis phase domain coordinate information obtained through conversion in the phase domain, $A_x$ is first-axis amplitude and represents the amplitude of the driving signal or the reconstruction signal in the first axis, $f_x$ is a first-axis frequency and represents the frequency of the driving signal or the reconstruction signal in the first axis, t represents time information, and $\varphi_x$ is a first-axis phase, represents the phase of the driving signal or the reconstruction signal in the first axis, and refers to a phase delay component in the first axis. Also, y' represents second-axis phase domain coordinate information obtained through conversion in the phase domain, $A_y$ is second-axis amplitude and represents the amplitude of the driving signal or the reconstruction signal in the second axis, $f_y$ is a second-axis frequency and represents the frequency of the driving signal or the reconstruction signal in the second axis, t represents time information, and $\varphi_y$ is a second-axis phase, represents the phase of the driving signal or the reconstruction signal in the second axis, and refers to a phase delay component in the second axis. Also, mod may refer to the modulus operator, that is, the modulo operation, and T may refer to a predetermined period. That is, (mod T) may mean that phase domain coordinate information is repeated every predetermined period. Referring to Equation 2 and referring to Equation 1 again, the reconstruction signal of the phase domain may be acquired based on a frequency, time information, and a phase which are used as variables of a sine function in the reconstruction signal of the sine function domain. In other words, the reconstruction signal of the phase domain may have a linear function format, rather than a sine function format, with respect to time information.

Also, according to an embodiment, the first-axis phase domain coordinate information or the second-axis phase domain coordinate information of Equation 2 may be repeated every certain period when the acquired time information is increased. In other words, referring to Equation 2, the time information is repeated to the initial value according to a predetermined period T when the level of the increased time information exceeds the predetermined period. For example, when the predetermined period T is 2π, the first-axis phase domain coordinate information or the second-axis phase domain coordinate information may be repeated to an initial value every 2π, which is one period of the basic sine function. However, the present invention is not limited thereto, and the predetermined period T may be designated as various periods 2π or 4π. In addition to the aforementioned embodiments, for example, the domain of the reconstruction signal may include various domains such as Fourier domain, Laplace domain, and z-transform domain. Here, the Fourier domain, the Laplace domain, and the z-transform domain of the reconstruction signal may be domains where the Fourier transform, the Laplace transform, and the z-transform are performed in a reconstruction function of the sine function domain, respectively.

FIG. 15 is a diagram showing an image acquired according to a domain of a reconstruction signal according to an embodiment.

Specifically, FIG. 15A is a diagram showing that an image of an object is acquired based on a reconstruction signal in the sine function domain, and FIG. 15B is a diagram showing that an image of an object is acquired based on a reconstruction signal in the phase domain.

According to an embodiment, referring to FIG. 15, the controller 110 may acquire an image that uses coordinate information acquired in the sine function domain and an image that uses coordinate information acquired in the phase domain. Here, the image acquisition may refer to an operation of acquiring coordinate information using the reconstruction signal and applying light information to each of coordinate information.

Here, the number of pieces of coordinate information acquired in the phase domain may be greater than the number of pieces of coordinate information acquired in the sine function domain.

For example, referring to Equation 1 and Equation 2 again, Equation 1 represents the sine function domain of the reconstruction signal, and Equation 2 represents the phase domain of the reconstruction function. In this case, referring to Equation 2, the first-axis phase domain coordinate information is a linear function with respect to time information, and one piece of coordinate information may be acquired for one piece of time information. However, referring to Equation 1, the first-axis coordinate information is a sine function with respect to time information, and one piece of coordinate information may be acquired for two or more pieces of time information.

Accordingly, an image acquired by the controller 110 using the coordinate information acquired in the phase domain may be provided in a form in which an image acquired by the controller 110 using the coordinate information acquired in the sine function domain is symmetric vertically and horizontally.

Also, the coordinate information acquired in the phase domain is more than the coordinate information acquired in the sine function domain. As a specific example, the number of pieces of coordinate information acquired in the phase domain may be four or more times the number of pieces of coordinate information acquired in the sine function domain.

Also, since the coordinate information acquired in the phase domain is vertically and horizontally symmetric compared to the coordinate information acquired in the sine function domain, the number of pieces of pixel information acquired based on the coordinate information acquired in the phase domain may be greater than the number of pieces of pixel information acquired based on the coordinate information acquired in the sine function domain.

As a specific example, when the number of pieces of pixel information acquired in the sine function domain in each of the first axis and the second axis may be 512×512, the number of pieces of pixel information acquired in the phase domain in each of the first axis and the second axis may be 1024×1024.

However, the present invention is not limited to the aforementioned example, and the pixel information acquired in the phase domain may have various numbers of pixels. Specifically, the number of pixels may be 512×512, 2048×2048, or 4096×4096. Alternatively, a user may arbitrarily set the number of pieces of pixel information.

3.2.2.2. Phase Correction Method Using Orbifold Method

The method of the controller 110 correcting the phase of the reconstruction signal using the orbifold method according to an embodiment will be described below.

Figure 16:
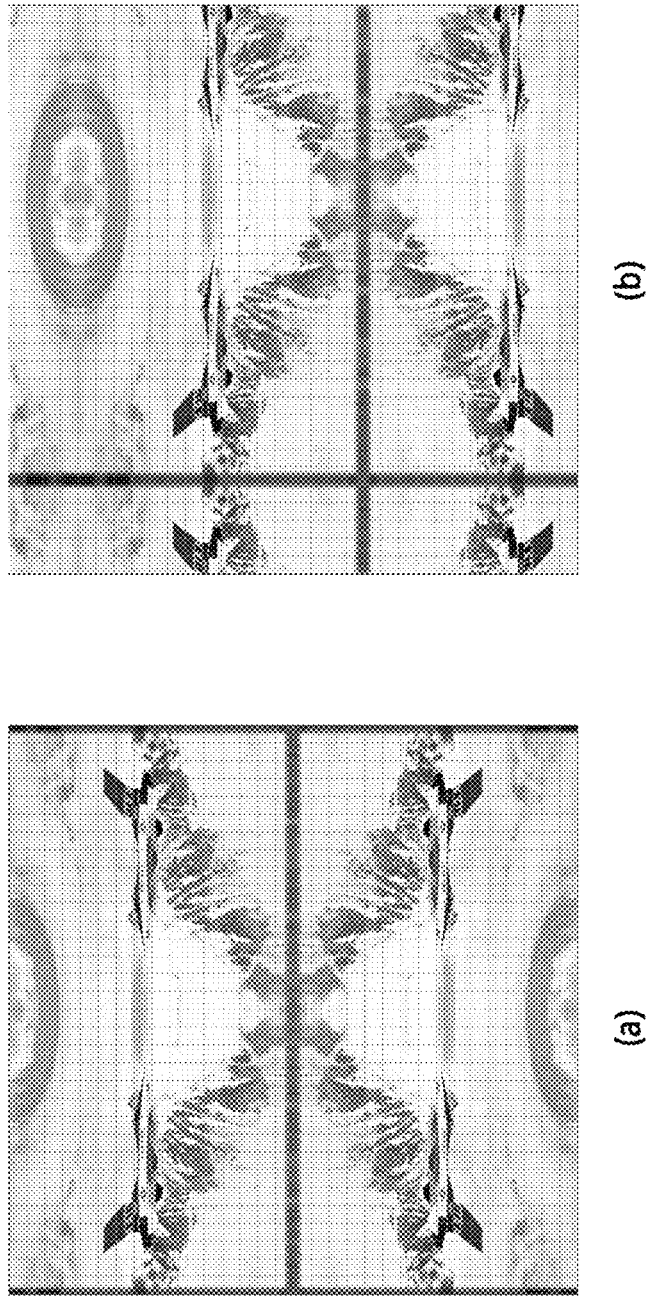
FIG. 16 is a diagram showing an image of a phase domain in which the phase of a reconstruction signal is not delayed and an image in which the phase of a reconstruction signal is delayed by using coordinate information acquired in the phase domain according to an embodiment.

FIG. 16 is a diagram showing an image of the phase domain in which the phase of a reconstruction signal is not delayed and an image in which the phase of a reconstruction signal is delayed by using coordinate information acquired in the phase domain.

According to an embodiment, referring to FIG. 16, when the reconstruction signal has no phase delay, an image of the phase domain acquired using coordinate information acquired in the phase domain may be symmetric with respect to the center of the image acquired in the phase domain.

In other words, when the reconstruction signal has a phase delay, the image acquired in the phase domain may not be symmetric with respect to the center of the image.

Accordingly, when a phase in which the image acquired in the phase domain is symmetric is found using the coordinate information acquired in the phase domain, the controller 110 may acquire the phase delay value of the reconstruction signal. In other words, the image acquired based on the coordinate information acquired in the phase domain is symmetric with respect to the centers of the first axis and the second axis of the phase domain coordinate information. However, in the case of a reconstruction signal with a phase delay, the image acquired based on the coordinate information acquired in the phase domain is symmetric with respect to points other than the centers of the first axis and the second axis of the phase domain coordinate information. Accordingly, when a phase in which the image is symmetric with respect to positions other than the centers is found, the controller 110 may acquire the phase delay value of the reconstruction signal.

Figure 17:
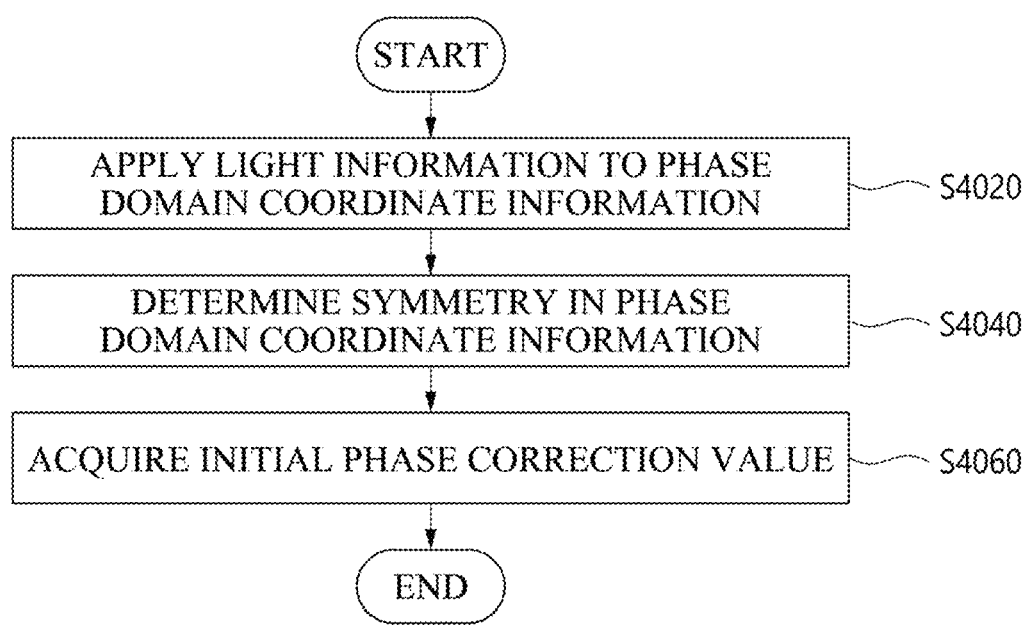
FIG. 17 is a flowchart illustrating a method of the controller 110 acquiring an initial phase correction value of a reconstruction signal on the basis of symmetry of phase domain coordinate information according to an embodiment.

FIG. 17 is a flowchart illustrating a method of the controller 110 acquiring an initial phase correction value of a reconstruction signal on the basis of symmetry of phase domain coordinate information according to an embodiment.

Referring to FIG. 17, the method of the controller 110 acquiring the initial phase correction value of the reconstruction signal may include an operation of the controller 110 applying light information to phase domain coordinate information (S4020), an operation of the controller 110 determining the symmetry of the phase domain coordinate information (S4040), and an operation of the controller 110 acquiring the initial phase correction value (S4060).

Here, the method of the controller 110 acquiring the initial phase correction value of the reconstruction signal may be included in or identical to the operation of the controller 110 acquiring the initial phase correction value (S4000).

FIG. 18 is a table schematically showing light information acquired for coordinate information acquired in the phase domain of a reconstruction signal according to time information according to an embodiment.

According to an embodiment, referring to FIGS. 17 and 18, the operation of the controller 110 applying the light information to the phase domain coordinate information (S4020) may include the controller 110 acquiring coordinate information in the phase domain of the reconstruction signal according to time information and acquiring light information corresponding to the acquired coordinate information.

Here, the controller 110 acquiring the coordinate information in the phase domain may mean that the controller 110 acquires time information on the basis of a predetermined time interval and acquires coordinate information on the basis of the acquired time information regardless of whether the light receiver 140 acquires the light information.

For example, referring to Equation 2 again, the controller 110 may acquire first-axis phase domain coordinate information and second-axis phase domain coordinate information obtained through conversion in the phase domain on the basis of the time information. Accordingly, the controller 110 may correlate the light information corresponding to the time information with the coordinate information acquired in the phase domain. In other words, the controller 110 may acquire data such that the light information is correlated with the coordinate information acquired in the phase domain.

Figure 19:
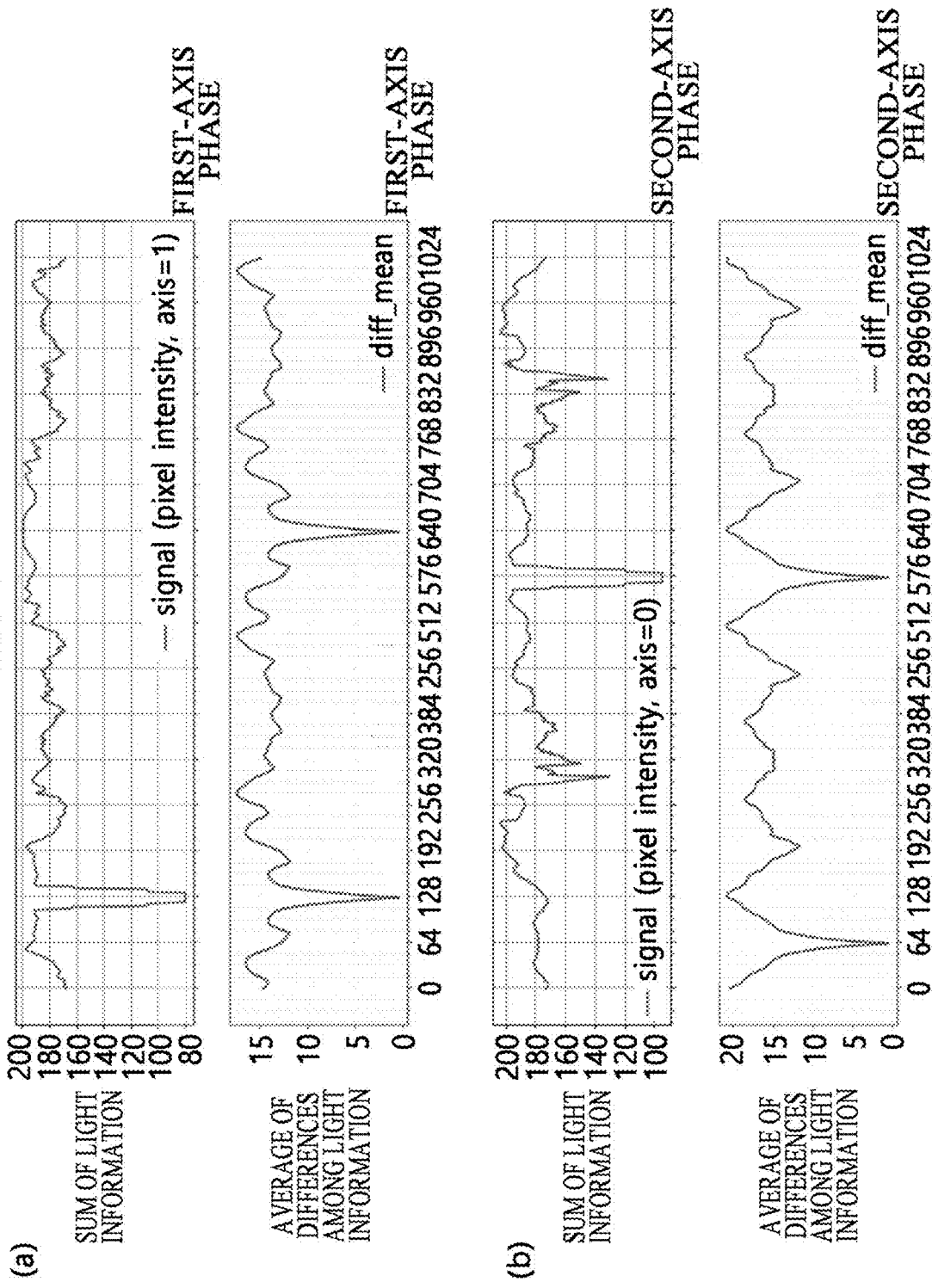
FIG. 19 includes graphs showing that light information for each piece of coordinate information is added up based on the coordinate information acquired in the phase domain according to an embodiment.

FIG. 19 includes graphs showing that light information for each piece of coordinate information is added up based on the coordinate information acquired in the phase domain according to an embodiment.

Specifically, in FIG. 19A, the horizontal axis represents the first-axis phase domain coordinate information, and the vertical axis represents the sum of the light information. Also, in FIG. 19B, the horizontal axis represents the second-axis phase domain coordinate information, and the vertical axis represents the sum of the light information. However, the present invention is not limited thereto, and the vertical axis may be the product of pieces of the light information or the integral value of the light information corresponding to the phase domain coordinate information. For convenience of description, the following description assumes that the vertical axis represents the sum of the light information.

Here, according to an embodiment, the sum of the light information may refer to the sum of at least one piece of light information acquired for phase domain coordinate information.

For example, when one piece of first-axis phase domain coordinate information is fixed, a plurality of pieces of light information may correspond to coordinate positions indicated by a fixed piece of first-axis coordinate information and a plurality of unfixed pieces of second-axis phase domain coordinate information, and at least one of the light information may be added up. In other words, in a two-dimensional Cartesian coordinate system, the light information may be added up by fixing the x-axis and using at least one y-axis coordinate value in the entire range of the y-axis. Likewise, when the second-axis phase domain coordinate information is fixed, the light information can be added up in the same way as previously mentioned.

According to another embodiment, the sum of the light information may refer to the average after at least one piece of light information acquired for phase domain coordinate information is added up.

Referring to FIGS. 17 and 19, the operation of the controller 110 determining the symmetry of the phase domain coordinate information (S4040) may include a method of the controller 110 determining the symmetry of specific phase domain coordinate information in the first-axis phase domain coordinate information or the second-axis phase domain coordinate information.

Here, the symmetry may mean that light information, or the sum of light information, acquired from coordinate information that is spaced the same distance (the same coordinate information distance) from specific first-axis phase domain coordinate information or specific second-axis phase domain coordinate information or the sum of the light information is the same or similar.

Also, the determination of the symmetry may mean that the symmetry is determined in a situation where the first and last values of the first-axis phase domain coordinate information or the second-axis phase domain coordinate information are continuous. For example, x'1, which is the first value of the first-axis phase domain coordinate information, and x'n, which is the last value of the first-axis phase domain coordinate information, are continuous, and values at the same distance from x'1 may be x'2 and x'n, which are the next values of x'1.

According to an embodiment, in order to determine the symmetry of the phase domain coordinate information, the controller 110 may determine specific first-axis phase domain coordinate information and specific second-axis phase domain coordinate information as a basis and perform the determination on the basis of the difference in the sum of the light information in the coordinate information spaced the same distance from the specific first-axis phase domain coordinate information or the second-axis phase domain coordinate information.

Here, the controller 110 finding a difference value between the sums of pieces of light information may mean that difference values between the sums of pieces of light information in a plurality of pieces of phase domain coordinate information acquired by the controller 110 are added up.

For example, referring to FIG. 18, when x'1, x'2, x'3, x'4, and x'5, which are the first-axis phase domain coordinate information, are sequential in the coordinate information in the phase domain, the controller 110 may find the difference between the sum of light information acquired for x'1 coordination information and the sum of light information acquired for x'5 coordinate information with respect to x'3 and the difference between the sum of light information acquired for x'2 coordinate information and the sum of light information acquired for x'4 coordinate information. Accordingly, when the symmetry is realized with respect to x'3 coordinate information, a difference value between the sum of the light information of the x'1 coordinate information and the sum of the light information of the x'5 coordinate information and a difference value between the sum of the light information of the x'2 coordinate information and the sum of the light information of the x'4 coordinate information with respect to the x'3 coordinate information may be smaller than those based on other phase domain coordinate information.

Likewise, the aforementioned method of determining the symmetry of the first-axis phase domain coordinate information may be used to determine the symmetry of the second-axis phase domain coordinate information.

According to another embodiment, in order for the controller 110 to determine the symmetry of the phase domain coordinate information, the controller 110 may determine specific first-axis phase domain coordinate information or specific second-axis phase domain coordinate information as a basis and integrate the sum of light information of coordinate information spaced the same distance from the specific first-axis phase domain coordinate information or second-axis phase domain coordinate information.

Also, according to another embodiment, in order for the controller 110 to determine the symmetry of the phase domain coordinate information, the controller 110 may determine specific first-axis phase domain coordinate information or specific second-axis phase domain coordinate information as a basis and multiply the sum of light information of coordinate information spaced the same distance from the specific first-axis phase domain coordinate information or the specific second-axis phase domain coordinate information.

In the aforementioned embodiments, the specific first-axis phase domain coordinate information or the specific second-axis phase domain coordinate information may be predetermined coordinate information to determine symmetry. In other words, coordinate information may be predetermined as a basis for determining symmetry, and thus the controller 110 may determine the symmetry of each piece of coordinate information in the first-axis phase domain coordinate information and the second-axis phase domain coordinate information. That is, the first-axis phase domain coordinate information or the second-axis phase domain coordinate information for determining symmetry may be at least one piece of coordinate information.

Referring to FIG. 17, the operation of the controller 110 acquiring the initial phase correction value (S4060) may include the controller 110 acquiring the initial phase correction value on the basis of the symmetry determined using the specific first-axis phase domain coordinate information or the specific second phase domain coordinate information which is predetermined by the controller 110.

According to an embodiment, the controller 110 may determine the symmetry of each piece of coordinate information, acquire specific first-axis phase domain coordinate information or specific second-axis phase domain coordinate information which is most symmetric, and acquire a phase corresponding to the acquired coordinate information as the initial phase correction value of the reconstruction signal.

For example, when the sum of difference values between the sums of pieces of light information acquired for coordinate information at the same distance from the specific first-axis phase domain coordinate information is smallest, the controller 110 may acquire a phase corresponding to the specific first-axis phase domain coordinate information as the initial phase correction value of the reconstruction signal.

Figure 20:
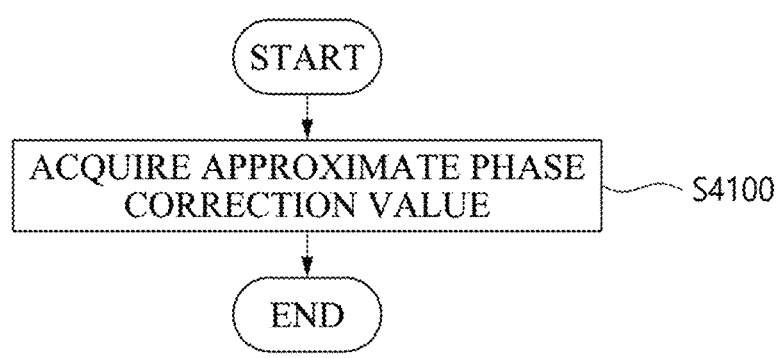
FIG. 20 is a flowchart illustrating the order in which an approximate phase correction value of an initial phase correction value is acquired according to an embodiment.

FIG. 20 is a flowchart illustrating the order in which an approximate phase correction value of an initial phase correction value is acquired according to an embodiment.

Referring to FIG. 17 and FIG. 20, the operation of the controller 110 acquiring the approximate phase correction value of the initial phase correction value (S4100) may be performed by the controller 110 after the operation of the controller 110 acquiring the initial phase correction value (S4060). In other words, the operation of the controller 110 acquiring the approximate phase correction value of the initial phase correction value (S4100) may be performed by the controller 110 before the operation of the controller 110 acquiring the detailed phase connection value (S4200).

According to an embodiment, the operation of the controller 110 acquiring the approximate phase correction value of the initial phase correction value (S4100) may include the controller 110 acquiring approximate phase domain coordinate information close to the detained phase correction value and a phase value corresponding to the approximate phase domain coordinate information on the basis of the initial phase correction value and the symmetry of the phase domain coordinate information corresponding to the initial phase correction value.

For example, referring to FIGS. 18 and 20, when the first-axis phase domain coordinate information corresponding to the initial phase correction value acquired by the controller 110 is x'2, approximate first-axis phase domain coordinate information corresponding to a first-axis approximate phase correction value is approximated to a horizontally symmetric function on the basis of coordinate information of x'1, x'2, and x'3 and the sum of pieces of light information acquired for coordinate information, and the controller 110 may acquire first-axis phase domain coordinate information in which the sum of the light information is equal or close to zero.

Here, for example, the horizontally symmetric function for approximation may refer to a function that is horizontally symmetric at a point where x is b as in y=a|x−b|+c. That is, when x'1, x'2, and x'3 and the sum of the light information corresponding to the coordinate information are substituted for x and y, b, which is approximate first-axis phase domain coordinate information that is horizontally symmetric, may be acquired. Accordingly, an approximate phase correction value corresponding to the approximate first-axis phase domain coordinate information may be acquired by the controller 110.

Also, approximate second-axis phase domain coordinate information and a second-axis approximate phase correction value may be acquired in the same manner as the method of acquiring the approximate first-axis phase domain coordinate information and the first-axis approximate phase correction value.

According to an embodiment, the approximate phase correction value acquired in the operation of the controller 110 acquiring the approximate phase correction value of the initial phase correction value (S4100) may be used in the operation of the controller 110 acquiring the detailed phase correction value (s4200).

3.2.2.3. Method of Correcting Mechanical Coupling Using Orbifold Method

FIG. 21 is a diagram showing an image acquired when an MC phenomenon has occurred and an image acquired when an MC phenomenon has not occurred by using coordinate information acquired in the phase domain according to an embodiment.

Specifically, referring to FIG. 21, FIG. 21A is a diagram showing an image acquired based on phase domain coordinate information acquired when there is no phase delay and no MC phenomenon occurs, and FIG. 21B is a diagram showing an image acquired based on phase domain coordinate information acquired when there is no phase delay but an MC phenomenon occurs.

According to an embodiment, based on the phase domain coordinate information, the controller 110 may acquire information on whether an MC phenomenon has occurred. When an MC phenomenon has occurred, the controller 110 may correct the MC phenomenon on the basis of light information corresponding to the phase domain coordinate information.

In other words, the controller 110 may acquire a first-axis MC signal and a second-axis MC signal on the basis of the light information acquired in the phase domain coordinate information.

For example, when the controller 110 acquires the phase of the first-axis MC signal and the phase of the second-axis MC signal on the basis of the phase domain coordinate information, the controller 110 may reconstruct an image in consideration of the first-axis MC signal and the second-axis MC signal as reconstruction signals in addition to the first-axis signal and the second-axis signal.

Here, in order to acquire the first-axis MC signal and the second-axis MC signal, the controller 110 may perform a computing operation on the basis of a rotation matrix that uses the phases of the first-axis signal, the second-axis signal, the first-axis MC signal, and the second-axis MC signal as variables. Also, the controller 110 may acquire the phases of the first-axis signal, the second-axis signal, the first-axis MC signal, and the second-axis MC signal as a result of the computing operation.

3.3. Acquisition of Detailed Phase Correction Value

The method of the controller 110 acquiring the detailed phase correction value will be described below.

However, in the case of detailed phase correction, the controller 110 does not always acquire the detailed phase correction value for the phase of the reconstruction signal only after acquiring the initial phase correction value, and the controller 110 may perform the method of acquiring the detailed phase correction value without acquiring the initial phase correction value or may acquire the initial phase correction value using the method of acquiring the detailed phase correction value.

3.3.1. General Information about Detailed Phase Correction Method

Figure 22:
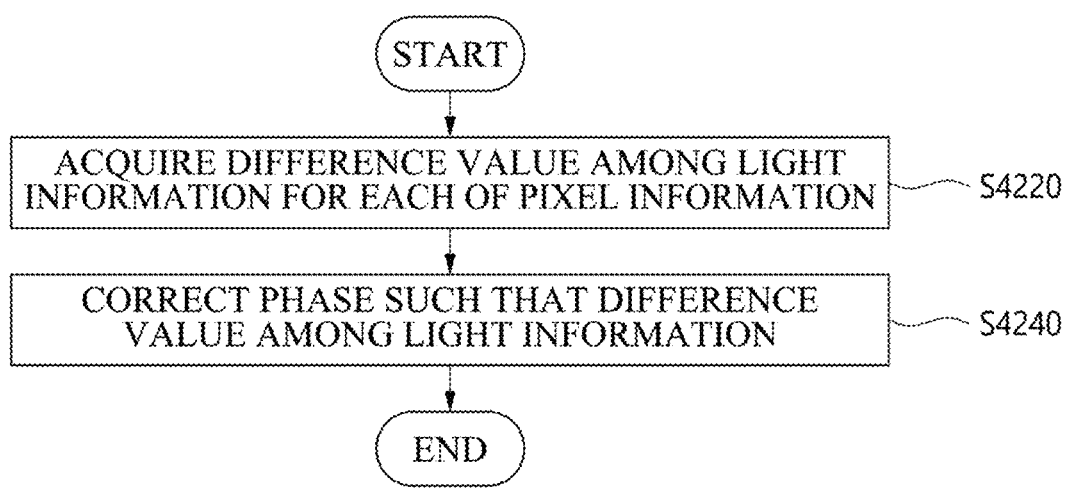
FIG. 22 is a flowchart illustrating a method of the controller 110 acquiring a detailed phase correction value according to an embodiment.

FIG. 22 is a flowchart illustrating a method of the controller 110 acquiring a detailed phase correction value according to an embodiment.

Specifically, referring to FIG. 22, the method of the controller 110 acquiring the detailed phase correction value may include an operation of the controller 110 acquiring a difference value among the light information acquired for each of pixel information (S4220) and an operation of the controller 110 correcting the phase of the reconstruction signal such that the acquired difference value among the light information is minimized (S4240).

Here, referring to FIGS. 14 and 22, the method of the controller 110 acquiring the detailed phase correction value may be included in or identical to the operation of the controller 110 acquiring the detailed phase correction value (S4200).

Figure 23:
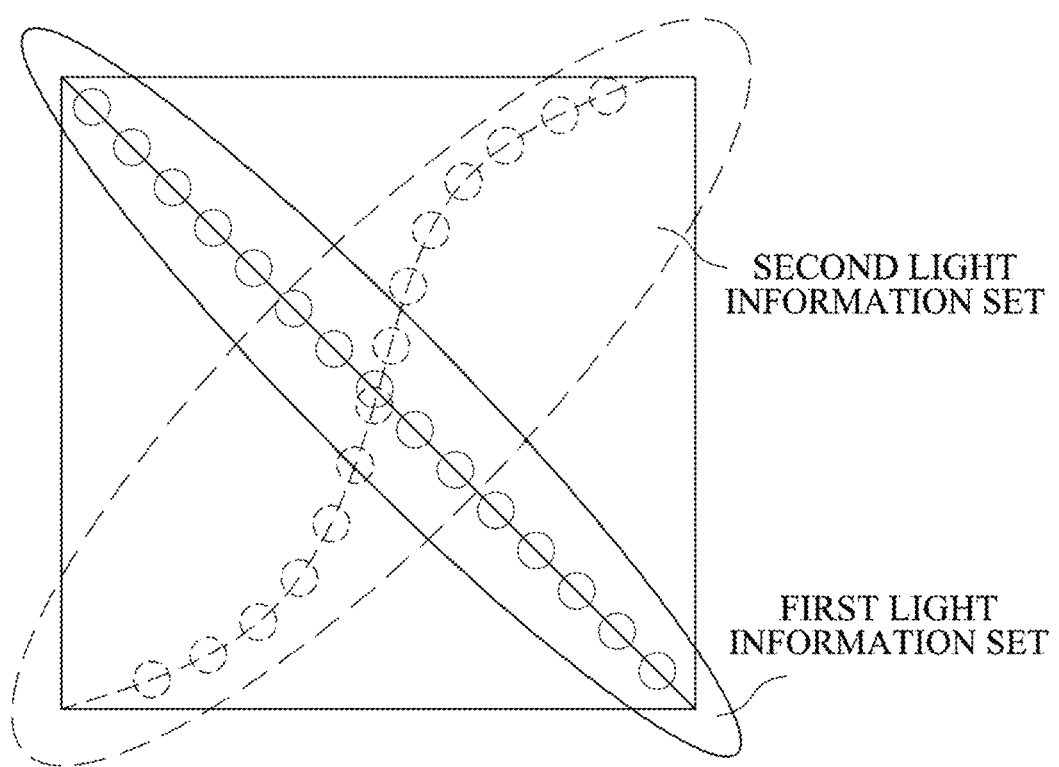
FIG. 23 is a schematic diagram showing a plurality of pieces of light information acquired for one piece of pixel information according to an embodiment.

FIG. 23 is a schematic diagram showing a plurality of pieces of light information acquired for one piece of pixel information according to an embodiment. The plurality of acquired pieces of light information may include a first light information set and a second light information set.

Here, the first light information set and the second light information set may be pieces of light information acquired at different times. Also, each of the first light information set and the second light information set may include at least one piece of light information.

For example, the first light information set may be a set of pieces of light information corresponding to continuous time information, and the second light information set may be a set of pieces of light information corresponding to continuous time information a certain time after the continuous time information from which the first light information set is acquired.

As a specific example, when the first light information set and the second light information set each have three pieces of light information, the light information corresponding to the first light information set may be acquired at 1 microsecond, 1.1 microseconds, and 1.2 microseconds, and the light information corresponding to the second light information may be acquired at 5 microseconds, 5.1 microseconds, and 5.2 microseconds. Here, the time information may be acquired in units of 0.1 microseconds, and accordingly, the light information may also be acquired in units of 0.1 microseconds. However, the time information for which the first light information set and the second light information set are acquired is not limited to the above example, and the time information may vary depending on a unit time at which the time information is acquired, a time required to complete one pattern generated according to a driving signal or a reconstruction signal, etc.

In other words, the time information for which the first light information set is acquired and the time information for which the second light information set is acquired being different from each other may mean that a pattern generated by a driving signal or a reconstruction signal in the pixel information in which the first light information set and the second light information set are acquired has intersections.

Referring to FIGS. 22 and 23, the operation of the controller 110 acquiring the difference value among the light information acquired for each of pixel information (S4220) may include the controller 110 acquiring the difference value between the pieces of light information corresponding to coordinate information acquired for the each of the pixel information.

According to an embodiment, the pixel information may refer to position information regarding a position where a single pixel is placed among a total number of pixels, and a plurality of pieces of coordinate information may be included in the pixel information.

In other words, the plurality of pieces of coordinate information may indicate one piece of pixel information.

For example, the first light information set may include a plurality of pieces of light information corresponding to a plurality of pieces of coordinate information, and a position indicated by a plurality of pieces of coordinate information constituting the first light information set may indicate a position within one piece of pixel information. In other words, even though a plurality of pieces of coordinate information may indicate different positions in detail, one piece of pixel information may include different positions indicated by the plurality of pieces of coordinate information.

This may mean that a plurality of pieces of light information may be acquired in one piece of pixel information.

According to an embodiment, the difference value between the pieces of light information may be meant to include the difference, the mean, the variance, and the standard deviation of the pieces of the light information.

For example, the difference between the sum of pieces of light information constituting the first light information set and the sum of pieces of light information constituting the second light information set may refer to the difference value between the pieces of light information.

As another example, the average of at least some of the pieces of light information constituting the first light information set and the second light information set may refer to the difference value between the pieces of light information.

Also, as another example, the variance of the plurality of pieces of light information from the average of at least some of the pieces of light information constituting the first light information set and the second light information set may refer to the difference value between the pieces of light information.

Also, as another example, the standard deviation of the plurality of pieces of light information from the average of at least some of the pieces of light information constituting the first light information set and the second light information set may refer to the difference value between the pieces of light information.

However, the present invention is not limited to the above example, and the acquisition of the difference value between the pieces of light information may mean that the plurality of pieces of light information acquired for the pixel information are uniform. Here, the plurality of pieces of light information being uniform may refer to whether the plurality of acquired pieces of light information have the same or similar light information.

Here, when there is no phase delay in the reconstruction signal, the plurality of pieces of light information acquired for the pixel information may all have the same value. That is, the difference value between the pieces of light information may be equal or close to zero.

However, when there is a phase delay in the reconstruction signal, the difference value between the pieces of light information acquired for the pixel information may occur. That is, as the phase delay value of the reconstruction signal increases, the difference value between the pieces of light information acquired for the pixel information may increase.

Referring to FIG. 22, the operation of the controller 110 correcting the phase of the reconstruction signal such that the difference value between among the light information is minimized (S4240) may include the controller 110 changing the phase of the reconstruction signal to determine whether the difference value between the pieces of light information acquired for the pixel information is minimized.

According to an embodiment, a user of the image generation device may adjust the difference value between the pieces of light information acquired by the controller 110 to be minimized while manually changing the phase of the reconstruction signal.

According to another embodiment, the controller 110 may change the phase of the reconstruction signal in a minimum unit capable of changing the phase of the reconstruction signal and thus may change the phase of the reconstruction signal such that the difference value between the pieces of light information acquired for the pixel information is minimized.

According to still another embodiment, the controller 110 may arbitrarily change the phase of the reconstruction signal and thus may change the phase of the reconstruction signal such that the difference value between the pieces of light information acquired for the pixel information is minimized.

According to still another embodiment, the controller 110 may change the phase of the reconstruction signal in predetermined phase adjustment units and thus may change the phase of the reconstruction signal such that the difference value between the pieces of light information acquired for the pixel information is minimized.

In the aforementioned embodiments, the controller 110 may acquire the difference value between the pieces of light information acquired for pixel information each time the phase is adjusted. However, the present invention is not limited thereto, and the controller 110 may acquire the difference value between the pieces of light information acquired for the pixel information on the basis of the phase value of the at least one reconstruction signal.

Figure 24:
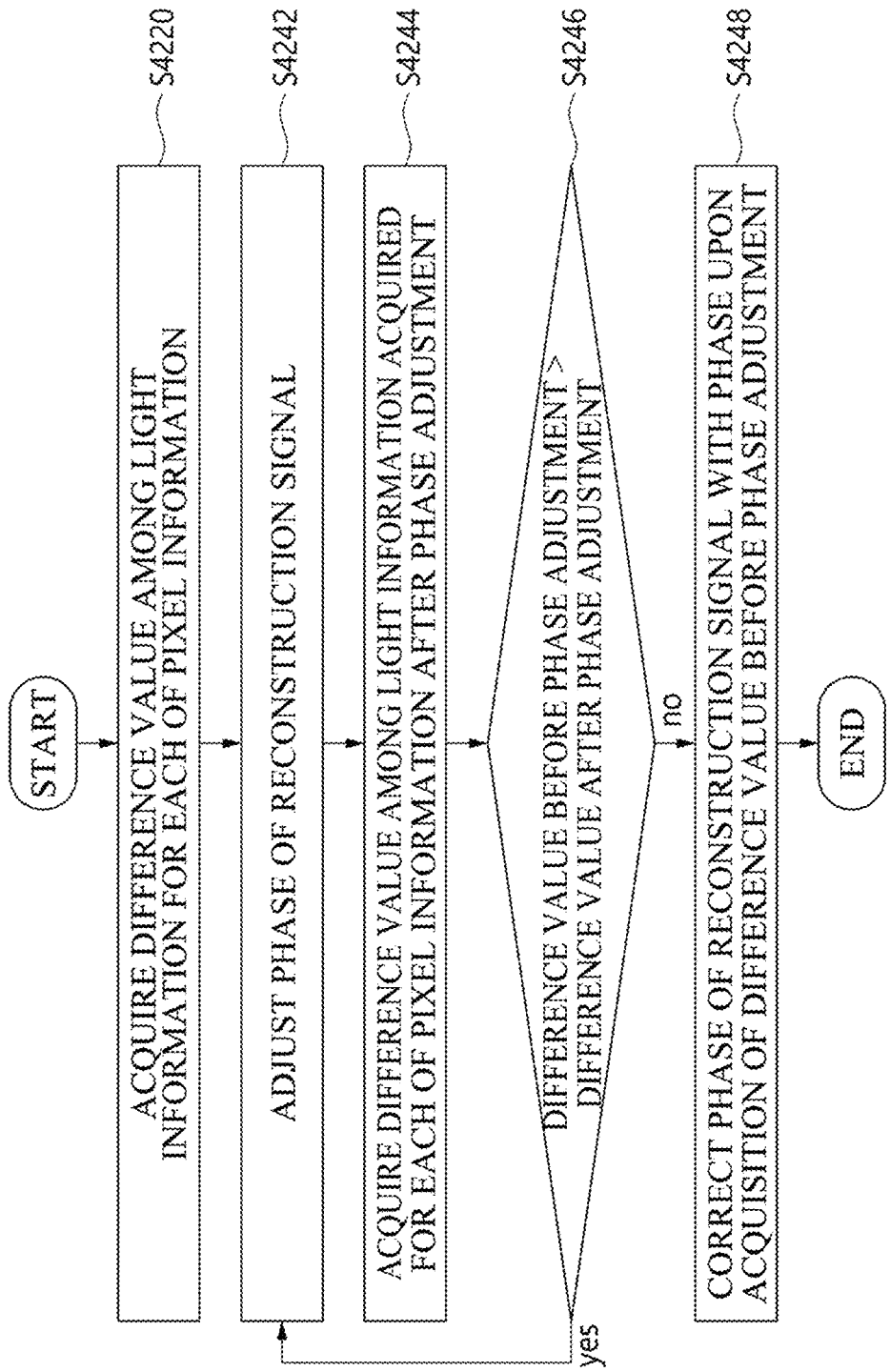
FIG. 24 is a flowchart illustrating a method of the controller 110 adjusting the phase of a reconstruction signal and comparing the minimum values of light information acquired for pixel information to acquire a detailed phase correction value according to an embodiment.

FIG. 24 is a flowchart illustrating a method of the controller 110 adjusting the phase of a reconstruction signal and comparing the minimum values of light information acquired for pixel information to acquire a detailed phase correction value according to an embodiment.

Referring to FIG. 24, the method of the controller 110 adjusting the phase of a reconstruction signal and comparing the minimum values of light information acquired for pixel information to acquire a detailed phase correction value may include an operation of the controller 110 acquiring the difference among the light information acquired for each of pixel information (S4220), an operation of the controller 110 adjusting the phase of the reconstruction signal (S4242), an operation of the controller 110 acquiring the difference value between among the light information acquired for the each of the pixel information after adjusting the phase of the reconstruction signal (S4244), an operation of the controller 110 comparing the difference value among the light information before the adjustment of the phase of the reconstruction signal and the difference value among the light information after the adjustment of the phase of the reconstruction signal (S4246), and an operation of the controller 110 correcting the phase of the reconstruction signal with the phase of the reconstruction signal corresponding to when the difference value is acquired before the phase of the reconstruction signal is adjusted (S4248).

Referring to FIG. 24, the operation of the controller 110 acquiring the difference value among the light information acquired for each of the pixel information (S4220) may be identical to the above operation of the controller 110 acquiring the difference value between the pieces of light information acquired for each of the pixel information, which is shown in FIG. 22.

Referring to FIG. 24, the operation of the controller 110 adjusting the phase of the reconstruction signal (S4242) may include a method of the controller 110 adjusting the phase of the reconstruction signal on the basis of the aforementioned embodiments.

According to an embodiment, when the controller 110 adjusts the phase of the reconstruction signal, the controller 110 may adjust the phase of the reconstruction signal on the basis of the predetermined phase adjustment unit.

The predetermined phase adjustment unit in which the controller 110 adjusts the phase of the reconstruction signal will be described in detail in the following related section.

According to another embodiment, when the controller 110 adjusts the phase of the reconstruction signal, the controller 110 may arbitrarily adjust the phase of the reconstruction signal.

According to another embodiment, when the controller 110 adjusts the phase of the reconstruction signal, the controller 110 may adjust the phase of the reconstruction signal on the basis of the minimum phase unit capable of adjusting the phase of the reconstruction signal.

Referring to FIG. 24, the operation of the controller 110 acquiring the difference value among the light information acquired for each of the pixel information after adjusting the phase of the reconstruction signal (S4244) may include the above method of the controller 110 acquiring the difference value between the pieces of light information for the pixel information during the operation of the controller 110 acquiring the difference value among the light information acquired for each of the pixel information (S4220).

Here, when the controller 110 adjusts the phase of the reconstruction signal, the light information acquired for the pixel information may be different from the light information before the controller 110 adjusts the phase of the reconstruction signal. In other words, when the controller 110 adjusts the phase of the reconstruction signal, coordinate information acquired based on the reconstruction signal may be different from coordinate information before the controller 110 adjusts the phase of the reconstruction signal. Accordingly, light information corresponding to the coordinate information included in the pixel information may vary before and after the controller 110 adjusts the phase of the reconstruction signal.

Referring to FIG. 24, the operation of the controller 110 comparing the difference value between the pieces of light information before the adjustment of the phase of the reconstruction signal and the difference value between the pieces of light information after the adjustment of the phase of the reconstruction signal (S4246) includes the controller 110 acquiring difference values between the pieces of light information for the pixel information before and after adjusting the phase of the reconstruction signal and comparing the difference value between the pieces of light information for the pixel information before the adjustment of the phase of the reconstruction signal and the difference value between the pieces of light information for the pixel information after the adjustment of the phase of the reconstruction signal.

In this case, the controller 110 comparing the difference value between the pieces of light information for the pixel information before the adjustment of the phase of the reconstruction signal and the difference value between the pieces of light information for the pixel information after the adjustment of the phase of the reconstruction signal may mean that the controller 110 compares the difference value between the pieces of light information acquired immediately before the adjustment of the phase of the reconstruction signal and the difference value between the pieces of light information acquired immediately after the adjustment of the phase of the reconstruction signal.

When the operation of the controller 110 adjusting the phase of the reconstruction signal is performed more than one time, the controller 110 comparing the difference values may mean that the controller 110 compares the difference value between the pieces of light information acquired for pixel information after the second to last phase correction is performed and before the last phase correction is performed and the difference value between the pieces of light information acquired for the pixel information after the last phase correction is performed.

For convenience of the following description, the difference value between the pieces of light information acquired for the pixel information before the controller 110 adjusts the phase of the reconstruction signal may be expressed as a difference value between pieces of light information before phase adjustment, and the difference value between the pieces of light information acquired for the pixel information after the controller 110 adjusts the phase of the reconstruction signal may be expressed as a difference value between pieces of light information after phase adjustment.

Here, when the difference value between the pieces of light information before phase adjustment is larger than the difference value between the pieces of light information after phase adjustment, the controller 110 may re-adjust the phase of the reconstruction signal. In other words, when the difference value between the pieces of light information before phase adjustment is greater than the difference value between the pieces of light information after phase adjustment, the operation of the controller 110 adjusting the phase of the reconstruction signal (S4242) may be performed again.

Here, when the difference value between the pieces of light information before phase adjustment is smaller than the difference value between the pieces of light information after phase adjustment, the controller 110 may reconstruct the phase of the reconstruction signal on the basis of a phase adjusted before the controller 110 performs the last phase adjustment on the reconstruction signal. In other words, when the difference value between the pieces of light information before phase adjustment is smaller than the difference value between the pieces of light information after phase adjustment, the operation of the controller 110 correcting the phase of the reconstruction signal with a phase value of the reconstruction signal upon the acquirement of the difference value before the adjustment of the phase of the reconstruction signal may be performed (S4248).

Referring to FIG. 24, the operation of the controller 110 correcting the phase of the reconstruction signal with the phase value of the reconstruction signal upon the acquirement of the difference value before the adjustment of the phase of the reconstruction signal (S4248) may include the controller 110 correcting the phase of the reconstruction signal on the basis of the phase of the reconstruction signal adjusted immediately before the phase of the reconstruction signal is finally adjusted.

Here, the phase of the reconstruction signal adjusted immediately before the phase of the reconstruction signal is finally adjusted may refer to a phase value of the reconstruction signal which is a basis for the acquirement of the difference value between the pieces of light information before the phase adjustment. In other words, when the operation of the controller 110 adjusting the phase of the reconstruction signal is included before the operation of the controller 110 correcting the phase of the reconstruction signal with the phase value of the reconstruction signal upon the acquirement of the difference value before the adjustment of the phase of the reconstruction signal (S4248), the phase of the reconstruction signal adjusted immediately before the controller 110 finally adjusts the phase of the reconstruction signal may be acquired based on the phase of the reconstruction signal corresponding to before the phase of the reconstruction signal is finally adjusted.

Here, the correction of the phase of the reconstruction signal may include the controller 110 acquiring coordinate information on the basis of the phase correction value of the reconstruction signal as described above.

In this case, the phase value used by the controller 110 to correct the phase of the reconstruction signal may be the detailed phase correction value.

Figure 25:
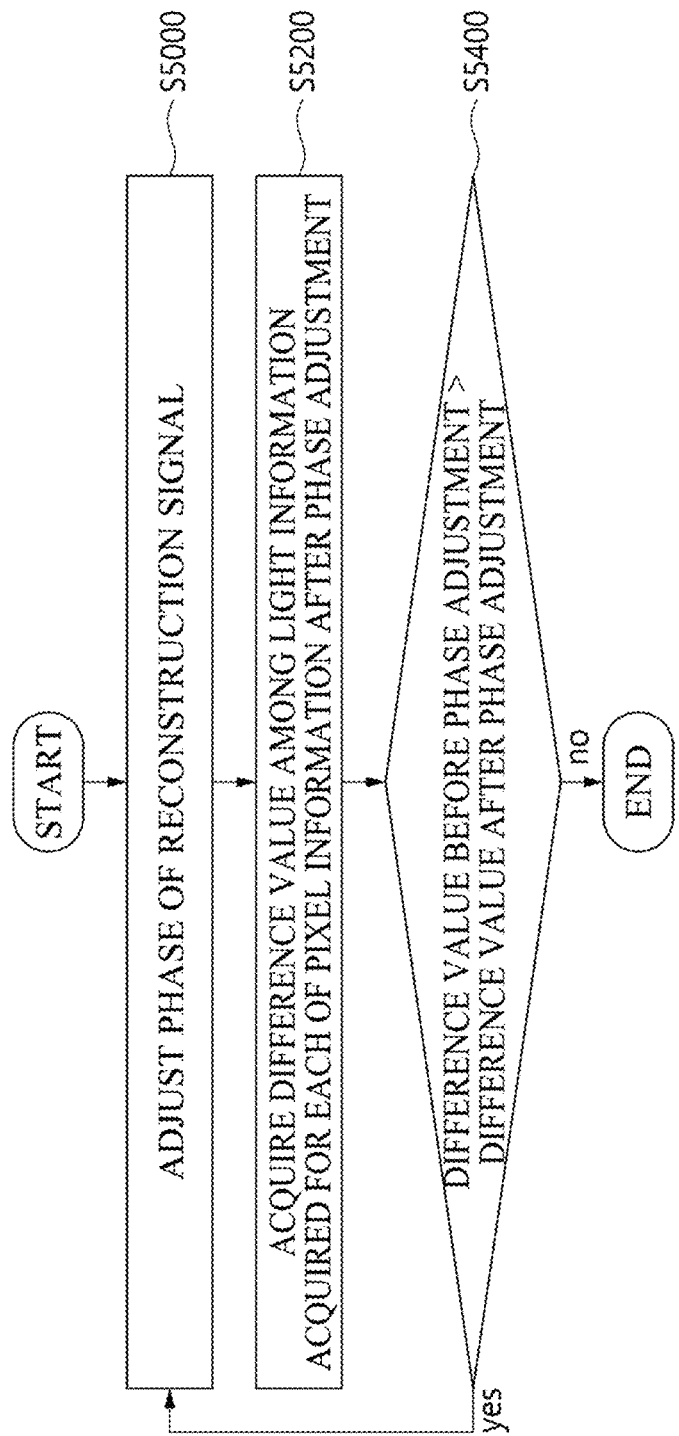
FIG. 25 is a flowchart illustrating a method of the controller 110 additionally adjusting the phase of a reconstruction signal and acquiring a detailed phase correction value according to an embodiment.

FIG. 25 is a flowchart illustrating a method of the controller 110 additionally adjusting the phase of the reconstruction signal and acquiring a detailed phase correction value according to an embodiment.

Referring to FIG. 25, the method of the controller 110 additionally adjusting the phase of a reconstruction signal and acquiring a detailed phase correction value may include an operation of the controller 110 adjusting the phase of the reconstruction signal (S5000), an operation of the controller 110 acquiring a difference value among the light information acquired for each of the pixel information after adjusting the phase of the reconstruction signal (S5200), and an operation of the controller 110 comparing the difference value among the light information before the adjustment of the phase of the reconstruction signal and the difference value among the light information after the adjustment of the phase of the reconstruction signal (S5400).

According to an embodiment, the controller 110 may acquire the phase of the reconstruction signal corresponding to the minimized difference value of the light information after adjusting the phase of the reconstruction signal in predetermined phase adjustment units, adjust the phase of the reconstruction signal in units smaller than the predetermined phase adjustment units to acquire the minimized difference value of the light information, and acquire a phase correction value of the reconstruction signal corresponding to the minimized difference value of the light information.

For example, referring to FIGS. 24 and 25, the method of the controller 110 additionally adjusting the phase of the reconstruction signal and acquiring the detailed phase correction value may be performed by the controller 110 between the operation of the controller 110 comparing the difference value between the pieces of light information before the adjustment of the phase of the reconstruction signal and the difference value between the pieces of light information after the adjustment of the phase of the reconstruction signal and the operation of the controller 110 correcting the phase of the reconstruction signal with a phase value of the reconstruction signal upon the acquirement of the difference value before the adjustment of the phase of the reconstruction signal, which are shown in FIG. 24.

Referring to FIG. 25, the operation of the controller 110 adjusting the phase of the reconstruction signal (S5000) may include the controller 110 adjusting the phase of the reconstruction signal on the basis of a phase adjustment unit smaller than the predetermined phase adjustment unit.

For example, when the controller 110 adjusts the phase of the reconstruction signal by a first phase adjustment unit in the operation of the controller 110 adjusting the phase of the reconstruction signal (S4242), the controller 110 may adjust the phase of the reconstruction signal on the basis of a second phase adjustment unit smaller than the first phase adjustment unit in the operation of the controller 110 adjusting the phase of the reconstruction signal (S5000).

As a specific example, when the first phase adjustment unit is 0.1 seconds, the second phase adjustment unit may be set to 0.05 seconds, which is smaller than the first phase adjustment unit. The controller 110 may adjust the phase of the reconstruction signal on the basis of the first phase adjustment unit to acquire the phase of the reconstruction signal such that the difference value between the pieces of light information for the pixel information is minimized, and then the controller 110 may adjust the phase of the reconstruction signal on the basis of the second phase adjustment unit to acquire the phase of the reconstruction signal such that the difference value between the pieces of light information for the pixel information is minimized.

Referring to FIGS. 24 and 25, the operation of the controller 110 acquiring a difference value among the light information acquired for each of the pixel information after adjusting the phase of the reconstruction signal (S5200) and the operation of the controller 110 comparing the difference value among the light information before the adjustment of the phase of the reconstruction signal and the difference value among the light information after the adjustment of the phase of the reconstruction signal (S5400) may be the same as or similar to the operation of the controller 110 acquiring a difference value among the light information for each of the pixel information after adjusting the phase of the reconstruction signal (S4244) and the operation of the controller 110 comparing the difference value between the pieces of light information before the adjustment of the phase of the reconstruction signal and the difference value between the pieces of light information after the adjustment of the phase of the reconstruction signal (S4246).

In other words, the operation of the controller 110 acquiring a difference value among the light information acquired for pixel information after adjusting the phase of the reconstruction signal (S5200) and the operation of the controller 110 comparing the difference value among the light information before the adjustment of the phase of the reconstruction signal and the difference value among light information after the adjustment of the phase of the reconstruction signal (S5400) may be performed by the controller 110 in the same manner as the method used in the aforementioned operations.

3.3.2. Predetermined Phase Adjustment Unit

The predetermined phase adjustment unit, which is a unit in which the controller 110 adjusts the phase of the reconstruction signal will be described below.

Here, the predetermined phase adjustment unit may be expressed as a dip.

Figure 26:
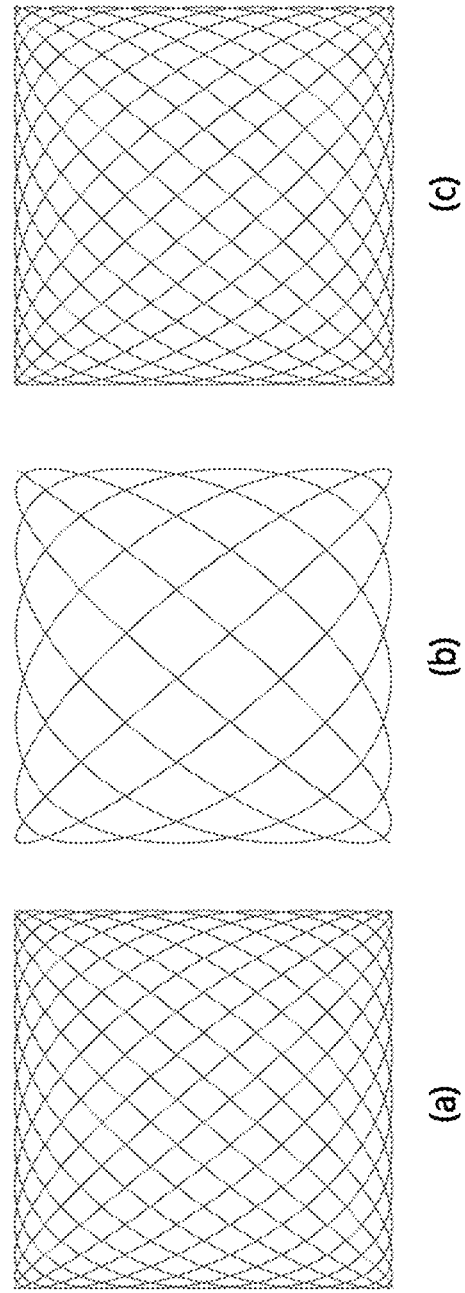
FIG. 26 is a diagram showing that the form of a generated pattern is repeated along with a change in the phase of a driving signal or a reconstruction signal according to an embodiment.

FIG. 26 is a diagram showing that the form of a generated pattern is repeated along with a change in the phase of a driving signal or a reconstruction signal according to an embodiment.

Specifically, FIGS. 26A and 26C show the same form of patterns, but the patterns may have phases of a driving signal or a reconstruction signal different from each other on the basis of the predetermined phase adjustment unit. FIG. 26B shows the form of a pattern different from that of FIG. 26A or FIG. 26C and may be a pattern with a phase different from the phase of the driving signal or the reconstruction signal, which is a basis shown in FIG. 26A or FIG. 26C, by half of the predetermined phase adjustment unit.

According to an embodiment, the form of the pattern of the driving signal or the reconstruction signal may be repeated each time the phase of the first-axis signal or the second-axis signal of the driving signal or the reconstruction signal is adjusted or changed by the predetermined phase adjustment unit. In other words, when the pattern of the driving signal or the reconstruction signal is repeated, the phase of the first-axis signal or the second-axis signal of the driving signal or the reconstruction signal may differ on the basis of the predetermined phase adjustment unit.

For example, referring to FIG. 26, when the phase of the driving signal or the reconstruction signal is adjusted based on the driving signal or the reconstruction signal which is a basis shown in FIG. 26A, the form of the pattern may exhibit the pattern of FIG. 26B and then the pattern of FIG. 26C. Here, the pattern of FIG. 26A and the pattern of FIG. 26C may have the same form. In this case, the phase of the driving signal or the reconstruction signal which is a basis shown in FIG. 26A may differ from the phase of the driving signal or the reconstruction signal which is a basis shown in FIG. 26C by a dip, which is the predetermined phase adjustment unit.

Figure 27:
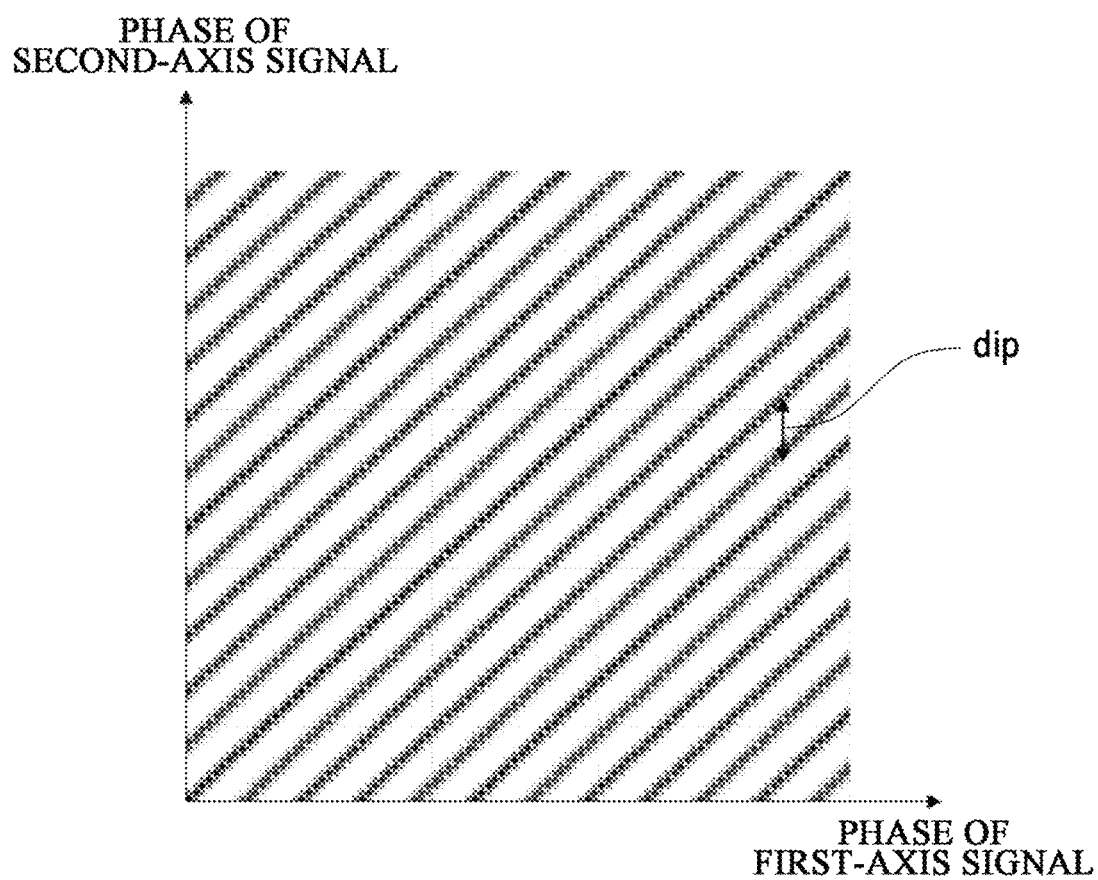
FIG. 27 is a diagram showing that a fill factor (FF) is repeated according to the phases of a first-axis signal and a second-axis signal of a driving signal or a reconstruction signal according to an embodiment.

FIG. 27 is a diagram showing that an FF is repeated according to the phases of a first-axis signal and a second-axis signal of a driving signal or a reconstruction signal according to an embodiment.

In FIG. 27, the x-axis represents the phase of the first-axis signal of the driving signal or the reconstruction signal, and the y-axis represents the phase of the second-axis signal of the driving signal or the reconstruction signal.

Also, in FIG. 27, the same color may mean that patterns exhibited due to the driving signal or the reconstruction signal have the same or similar FFs. Here, the color shown in FIG. 27 may have an increasing FF as the brightness increases, that is, as the color changes from black to white.

In this case, referring to FIG. 27, the color shown in FIG. 27 may refer to a difference value among the light information acquired for each of pixel information of an image in addition to the FF.

According to an embodiment, the FF of the driving signal or the reconstruction signal may be repeated each time the phase of the driving signal or the reconstruction signal is adjusted or changed by the predetermined phase adjustment unit. In other words, the driving signal or the reconstruction signal may have the same FF each time the first-axis signal or the second-axis signal of the driving signal or the reconstruction signal changes by a dip.

Specifically, referring to FIG. 27, the FF may change repeatedly as the phase of the first-axis signal or the second-axis signal of the driving signal or the reconstruction signal changes. In this case, an interval of the phase of the first signal or the second signal in which the FF is repeated may be a dip, which is the predetermined phase adjustment unit.

$$dip = \frac{GCD}{2 f_x f_y} \qquad \text{[Equation 3]}$$

Referring to Equation 3, dip indicates the predetermined phase adjustment unit, GCD indicates the greatest common divisor of the first-axis frequency and the second-axis frequency of the driving signal or the reconstruction signal, $f_x$ indicates the first-axis frequency of the driving signal or the reconstruction signal, and $f_y$ indicates the second-axis frequency of the driving signal or the reconstruction signal.

According to an embodiment, the controller 110 may acquire the predetermined phase adjustment unit for adjusting the phase of the reconstruction signal on the basis of the first-axis frequency and the second-axis frequency of the reconstruction signal. In other words, the controller 110 may acquire the predetermined phase adjustment unit for adjusting the phase of the reconstruction signal on the basis of the first-axis frequency and the second-axis frequency of the reconstruction signal.

According to another embodiment, the controller 110 may acquire the predetermined phase adjustment unit for adjusting the phase of the reconstruction signal on the basis of the first-axis co-prime frequency and the second-axis co-prime frequency of the reconstruction signal. In other words, the controller 110 may acquire the predetermined phase adjustment unit for adjusting the phase of the reconstruction signal on the basis of the first-axis co-prime frequency and the second-axis co-prime frequency of the reconstruction signal.

3.3.3. BPSA

An example in which the controller 110 adjusts the phase of the reconstruction signal using a BPSA method will be described below.

Here, "BPSA" is an abbreviation of "Boundary Phase Search Algorithm," and may refer to a method of the controller 110 acquiring a detailed phase correction value of the reconstruction signal using only some pixel information, and in particular, a method of controller 110 acquiring a detailed phase correction value of the reconstruction signal using light information corresponding to pixel information for pixels in close proximity to a boundary of an image.

In this case, the proximity of the boundary of the image may refer to as many regions as the predetermined number of pixels in a direction from ends of which are located on the top, bottom, left, and right of an image acquired by the controller 110 and from which pixel information is acquired toward the center of the image. In other words, the proximity of the boundary of the image may be an edge in the entire pixel region of the acquired image. Here, the predetermined number of pixels is an arbitrarily set value and may be changed in consideration of the amount of computation of the controller 110.

That is, when using the BPSA method, the controller 110 may compute the minimum value of the light information using light information or coordinate information acquired from some pixel information other than all of the pixel information, and thus it is possible to reduce the time required for the controller 110 to correct the phase of the reconstruction signal. In other words, when the controller 110 uses the BPSA method, it is possible to reduce the amount of computation of the controller 110. That is, it is possible to increase the speed at which the controller 110 corrects the phase of the reconstruction signal.

Here, the acquisition of the coordinate information for the pixel information may mean that a position indicated by the coordinate information in all the pixels is included in a position indicated by specific pixel information. Likewise, the acquisition of light information may mean that the position indicated by coordinate information corresponding to light information in all the pixels is included in the position indicated by the specific pixel information. Hereinafter, for convenience of description, the position indicated by the coordinate information or the position indicated by the coordinate information corresponding to the light information being included in the position indicated by the pixel information is expressed as the coordinate information or the light information being acquired.

Figure 28:
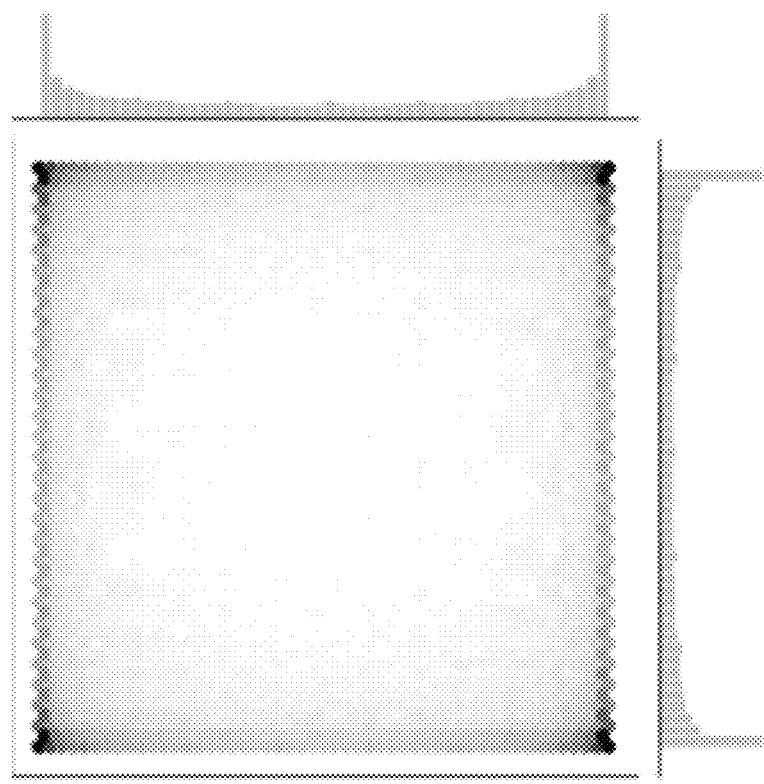
FIG. 28 is a diagram showing the density of light information acquired for pixel information in the entire pixel range according to an embodiment.

FIG. 28 is a diagram showing the density of light information acquired for pixel information in the entire pixel range according to an embodiment.

Referring to FIG. 28, bar graphs on the horizontal axis and the vertical axis are graphs showing the number of pieces of or the density of light information or coordinate information acquired for corresponding pixel information. Specifically, the bar graph shown on the horizontal axis or the vertical axis may indicate the number of pieces of or the density of coordinate information or light information included for pixel information acquired on the entire axis.

Referring to FIG. 28, in the entire pixel range of the acquired image, more coordinate information or light information may be acquired for pixel information having darker color than for pixel information having brighter color. In other words, the coordinate information or light information acquired for darker pixel information may have a higher density than the coordinate information or light information acquired for brighter pixel information.

Here, referring to FIG. 28, the darker color may mean that the color becomes darker from white to black.

Figure 29:
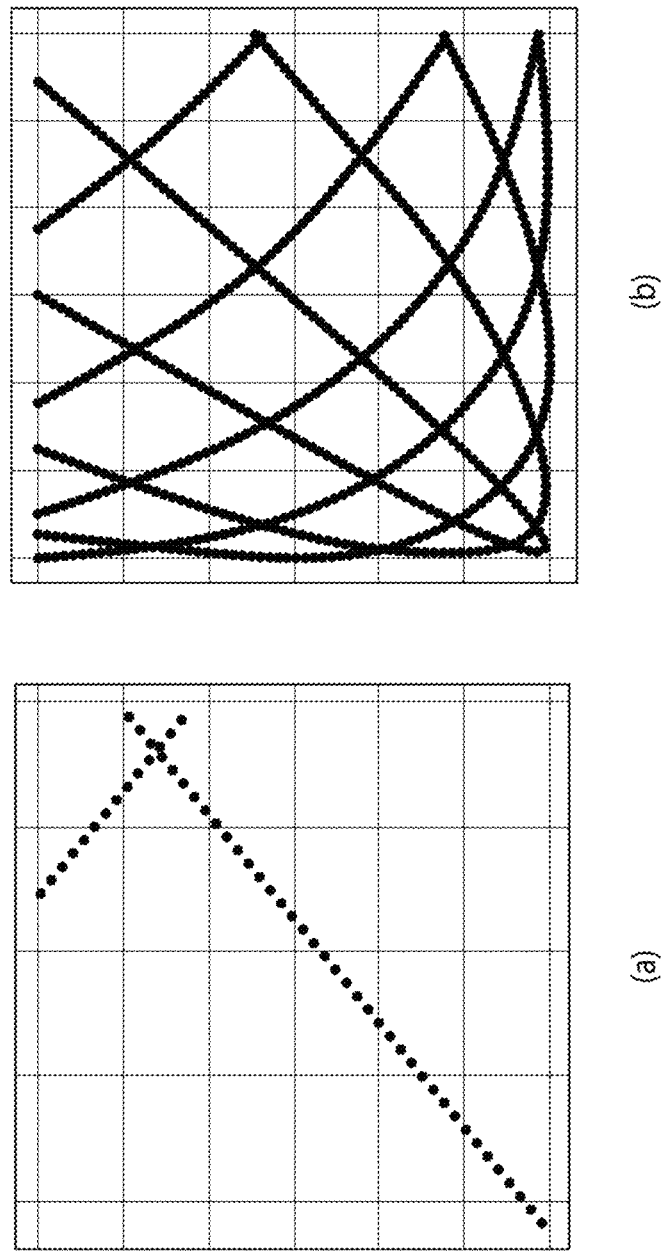
FIG. 29 is a diagram showing light information or coordinate information acquired for pixel information of a partial region of an acquired image according to an embodiment.

FIG. 29 is a diagram showing light information or coordinate information acquired for pixel information of a partial region of an acquired image according to an embodiment.

As a specific example, referring to FIG. 29, FIG. 29A is a diagram showing coordinate information or light information acquired in close proximity to a central region in which the number of pieces of or the density of coordinate information or light information is small in the entire pixel region, and FIG. 29B is a diagram showing coordinate information or light information acquired in close proximity to a boundary region in which the number of pieces of or the density of coordinate information or light information is great in the entire pixel region.

Referring to FIG. 29, the number of pieces of or the density of coordinate information or light information acquired in a specific pixel region may be greater than those in the other pixel regions.

For example, when the driving signal or the reconstruction signal exhibits a Lissajous pattern, in the entire pixel region, the number of pieces of or the density of coordinate information or light information included in a pixel region including pixel information may be greater in the edge region than in the central region.

Here, for example, the number of pieces of coordinate information or light information acquired in an edge pixel region may be at least 50% or more of the total number of pieces of acquired coordinate information or light information.

Figure 30:
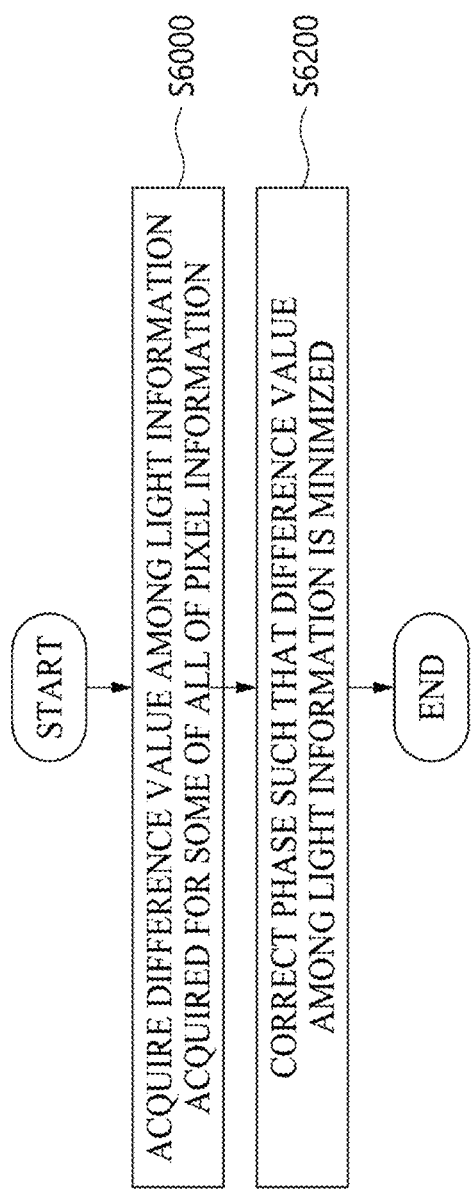
FIG. 30 is a flowchart illustrating a method of performing phase correction on the basis of light information or coordinate information acquired in a partial pixel region according to an embodiment.

FIG. 30 is a flowchart illustrating a method of correcting a phase on the basis of light information or coordinate information acquired in some pixel regions according to an embodiment.

Referring to FIG. 30, the method of correcting a phase on the basis of light information or coordinate information acquired for some pixel regions may include an operation of the controller 110 acquiring a difference value between pieces of light information acquired for some of the whole pixel information (S6000) and an operation of the controller 110 correcting a phase such that the difference value among the light information is minimized (S6200).

Here, the method of correcting the phase on the basis of light information or coordinate information acquired in some pixel regions may be included in the above operation of the controller 110 acquiring the detailed phase correction value (S4200).

Referring to FIG. 30, the operation of the controller 110 acquiring the difference value between the pieces of light information acquired for some of the whole pixel information (S6000) may include the controller 110 acquiring the difference value not using the whole light information corresponding to the whole acquired coordinate information but using light information corresponding to some of the acquired coordinate information.

According to an embodiment, the controller 110 may acquire the difference value using light information or coordinate information acquired in an edge pixel region. Here, the edge pixel region may refer to pixel information for pixels in close proximity to a boundary of an image, as described above.

Specifically, the coordinate information acquired in the edge pixel region may refer to coordinate information acquired for at least one layer of pixel information in an edge of the entire acquired pixel region.

Here, one layer of pixel information may refer to all of the pixel information located in a direction of the selected one of the first axis and the second axis. For example, when there are 256 pieces of pixel information in the first axis, one layer of pixel information may refer to 256 pieces of pixel information.

According to another embodiment, the controller 110 may acquire the difference value using at least one piece of light information corresponding to coordinate information acquired for the edge pixel region. In other words, when there is light information corresponding to one piece of pixel information in the edge pixel region, the controller 110 may acquire the difference value using a portion, but not all, of the corresponding light information.

The controller 110 acquiring the difference value using at least one piece of light information corresponding to coordinate information will be described below in the following related section.

Referring to FIG. 30, the operation of the controller 110 correcting the phase such that the difference value among the light information is minimized (S6200) may be the same as or included in the operation of the controller 110 correcting the phase of the reconstruction signal such that the difference value between among the light information is minimized (S4240).

According to an embodiment, by using light information or coordinate information acquired for some of all of the pixel information, the controller 110 may acquire the difference value between the pieces of light information.

Accordingly, in order to minimize the difference value between the pieces of light information, the controller 110 may change the phase of the reconstruction signal and determine whether the difference value between the pieces of light information acquired for the pixel information is minimized as in the above operation of the controller 110 correcting the phase of the reconstruction signal such that the difference value between among the light information is minimized (S4240).

3.3.4. GPSA

An example in which the controller 110 adjusts the phase of the reconstruction signal using a GPSA method will be described below.

Here, "GPSA" is an abbreviation of "Global Phase Search Algorithm" and may refer to a method of the controller 110 acquiring a detailed phase correction value of the reconstruction signal using at least one piece of light information corresponding to coordinate information acquired for some pixel information. In particular, the coordinate information corresponding to the used light information may be light information indicating the same or a similar position.

When the controller 110 uses the GPSA method, similar to the controller 110 using the BPSA method, some of all of the light information acquired for all of the pixel information is used. Thus, it is possible to reduce the amount of computation of the controller 110, and accordingly, it is possible to increase the speed at which the controller 110 corrects the phase of the reconstruction signal.

Figure 31:
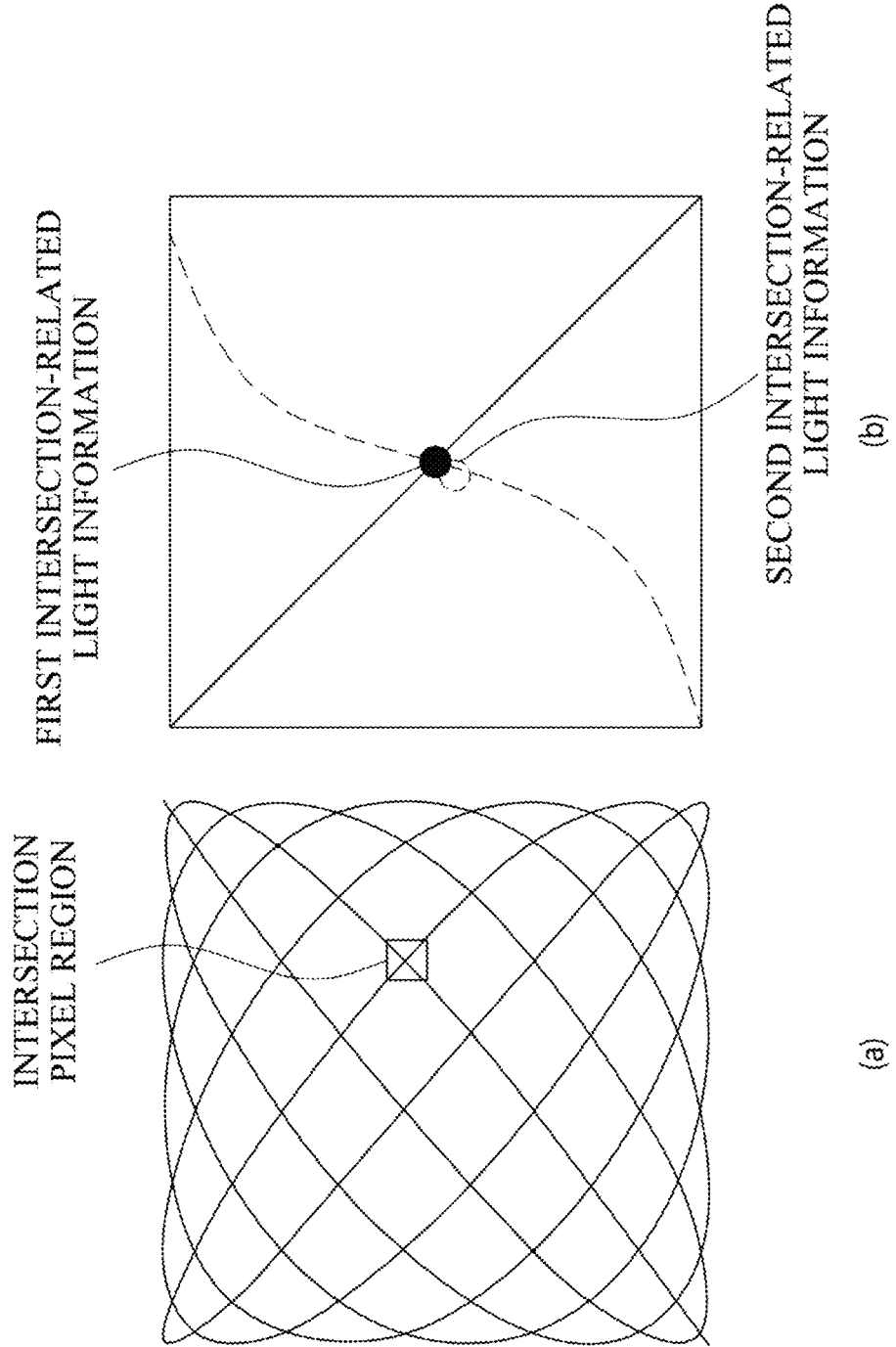
FIG. 31 is a schematic diagram showing an intersection of a pattern exhibited according to a driving signal or a reconstruction signal according to an embodiment.

FIG. 31 is a schematic diagram showing an intersection of a pattern exhibited according to a driving signal or a reconstruction signal according to an embodiment.

As a specific example, referring to FIG. 31, FIG. 31A is a diagram showing intersections of a pattern exhibited according to a driving signal or a reconstruction signal in an intersection pixel region, and FIG. 31B is a diagram showing first intersection-related light information and second intersection-related light information acquired for coordinate information in which intersections of the pattern in the intersection pixel region are identical or similar.

According to an embodiment, the difference value between the pieces of light information acquired by the controller 110 may be a difference value between pieces of light information acquired for coordinate information in which intersections of the pattern exhibited by the driving signal or the reconstruction signal are identical or similar.

Here, an intersection of the pattern may mean that the pattern forms an intersection when the same coordinate information corresponding to different time points is present, and a crossing of the pattern or an edge of a region where the pattern is generated may also refer to an intersection of the pattern.

For example, referring to FIGS. 5, 6, and 31 above, the difference value between the pieces of light information acquired by the controller 110 may be a difference value between first intersection-related light information and second intersection-related light information.

Here, time information acquired to correspond to the first intersection-related light information may be different from time information acquired to correspond to the second intersection-related light information, but coordinate information corresponding to the first intersection-related light information may be identical to or similar to coordinate information corresponding to the second intersection-related light information.

As a specific example, referring to FIGS. 5 and 6 above, i1, which is acquired according to t1, may be the first intersection-related light information, and t2, which is acquired according to t2, may be the second intersection-related light information. Here, the coordinate information corresponding to t1 may be x1 and y1, and the coordinate information corresponding to t2 may be x2 and y2. In this case, the position of the coordinate information indicated by x1 and y1 may be identical to or similar to the position of the coordinate information indicated by x2 and y2. That is, the time information acquired to correspond to i1 may be different from the time information acquired to correspond to i2, but the position represented by the coordinate information corresponding to i1 may be identical to or similar to the position represented by the coordinate information corresponding to i2.

According to an embodiment, the controller 110 may correct the phase of the reconstruction signal using only light information corresponding to coordinate information of an intersection of the pattern exhibited by the driving signal or the reconstruction signal.

A method of the controller 110 correcting the phase of the reconstruction signal using only the light information corresponding to the coordinate information of the intersection of the pattern exhibited by the driving signal or the reconstruction signal will be described below.

For convenience of the following description, when positions indicated by pieces of coordinate information are identical or similar to each other, the pieces of coordinate information may be expressed as being identical to or similar to each other. Also, the controller 110 acquiring coordinate information may mean that the controller 110 also acquires a position indicated by the coordinate information.

Figure 32:
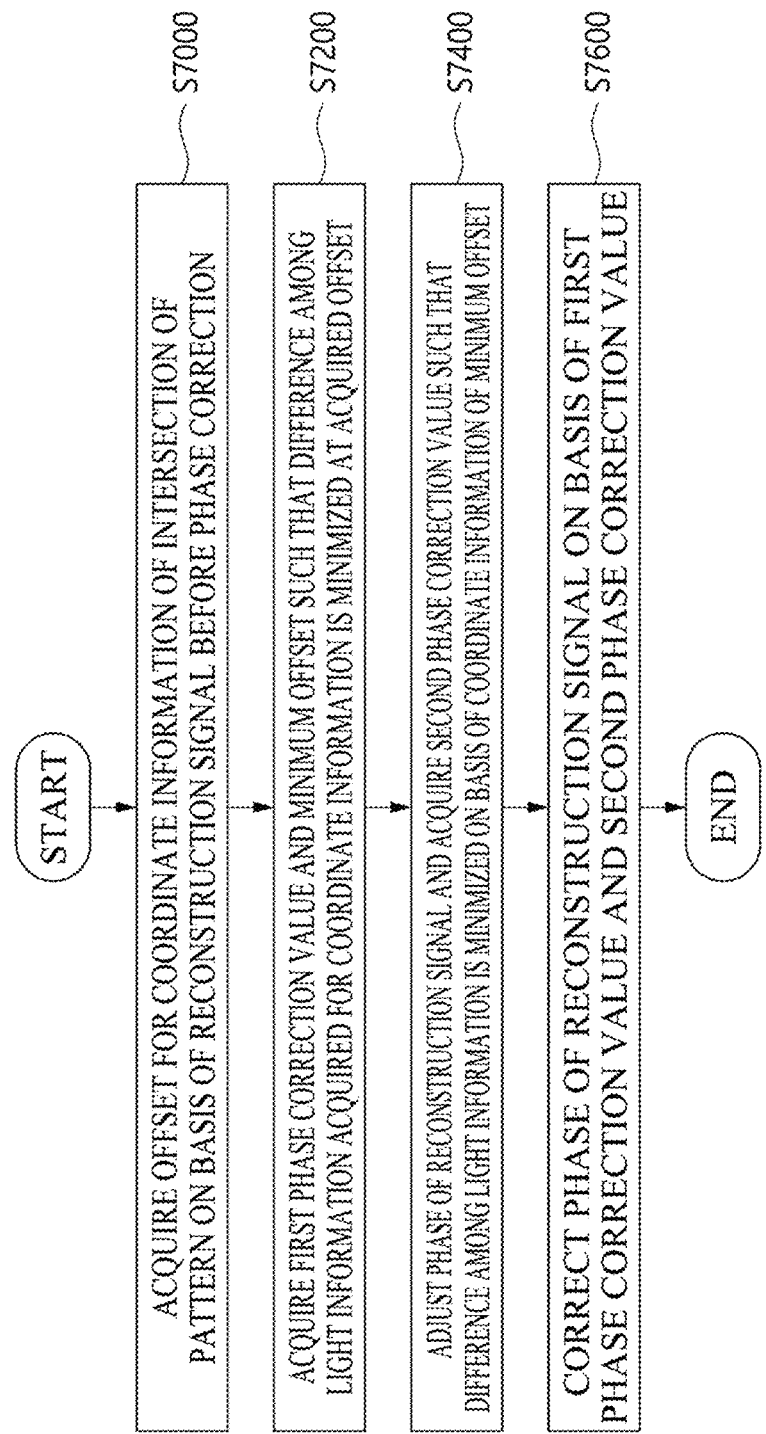
FIG. 32 is a flowchart illustrating a method of the controller 110 correcting the phase of a reconstruction signal by using light information acquired for coordinate information of an intersection of a pattern exhibited by a driving signal or a reconstruction signal according to an embodiment.

FIG. 32 is a flowchart illustrating a method of the controller 110 correcting the phase of the reconstruction signal by using light information acquired for coordinate information of an intersection of the pattern exhibited by the driving signal or the reconstruction signal according to an embodiment.

Referring to FIG. 32, the method of the controller 110 correcting the phase of the reconstruction signal using the light information acquired for the coordinate information of the intersection of the pattern exhibited by the driving signal or the reconstruction signal may include an operation of the controller 110 acquiring an offset for the coordinate information of the intersection of the pattern on the basis of the reconstruction signal before correcting the phase (S7000), an operation of the controller 110 acquiring a first phase correction value and a minimum offset from the acquired offset such that a difference among the light information acquired for the coordinate information is minimized (S7200), an operation of the controller 110 changing the phase of the reconstruction signal and acquiring a second phase correction value at which the difference between the pieces of the light information is minimized on the basis of coordinate information of the minimum offset (S7400), and an operation of the controller 110 correcting the phase of the reconstruction signal on the basis of the first phase correction value and the second phase correction value (S7600).

Here, the method of the controller 110 correcting the phase of the reconstruction signal using light information acquired to correspond to coordinate information of an intersection of the pattern exhibited by the driving signal or the reconstruction signal may be included in the above operation of the controller 110 acquiring the detailed phase correction value (S4200).

$$x = A_x \sin(2\pi f_x(t_d)), \ y = A_y \sin(2\pi f_y(t_d + c)) \quad \text{[Equation 4]}$$

Equation 4 is an equation representing a reconstruction signal that can be used to convert time information into coordinate information and a driving signal that is for determining a pattern in which light is emitted to an object according to an embodiment.

Equation 4 is an equation representing the initial time of Equation 1 above, that is, t=0. Here, $\varphi_x$ may be acquired based on a first frequency and $t_d$. More specifically, $t_d$ may represent the phase of a first-axis driving signal or a first-axis reconstruction signal which is a driving signal or a reconstruction signal when t=0. Also, here, c may be an element for determining the shape of the pattern. Here, $\varphi_y$ may be acquired based on a second frequency and $t_d$+c. That is, the phase of the first-axis driving signal or the first-axis reconstruction signal may be different from the phase of a second-axis driving signal or a second-axis reconstruction signal by c. Also, a start point of the pattern exhibited by the driving signal or the reconstruction signal may be determined by $t_d$ and c. In other words, the start point of the pattern may be coordinate information that is represented based on Equation 4 when t=0.

In this case, $t_d$ and $\varphi_x$ may refer to the phase of the first-axis driving signal or the first-axis reconstruction signal, and $t_d$+c and $\varphi_y$ may refer to the phase of the second-axis driving signal or the second-axis reconstruction signal. That is, $t_d$ and $t_d$+c may refer to the phase of a driving signal or a reconstruction signal that is substantially proportional to $\varphi_x$ and $\varphi_y$ when the first frequency and the second frequency are fixed.

Referring to FIGS. 32 and 7, the operation of the controller 110 acquiring an offset for coordinate information of an intersection of the pattern on the basis of the reconstruction signal before the phase correction (S7000) may include an operation of the controller 110 acquiring coordinate information or time information identical to or similar to the coordinate information on the basis of the reconstruction signal before the correction of the phase. Here, the offset may refer to a plurality of pieces of coordinate information corresponding to a plurality of intersections of the pattern exhibited by the driving signal or the reconstruction signal. Alternatively, the offset may refer to at least one piece of time information corresponding to at least one intersection of the pattern exhibited by the driving signal or the reconstruction signal.

According to an embodiment, the controller 110 acquiring an offset for coordinate information of the intersection of the pattern may mean that when there are a plurality of intersections of the pattern exhibited by the driving signal or the reconstruction signal, the controller 110 acquires a plurality of pieces of coordinate information corresponding to the plurality of intersections.

For example, referring to FIGS. 5 and 6 above, the controller 110 may acquire i1 to i4, which are pieces of light information, corresponding to t1 to t4, which are pieces of time information. Here, t1 to t4, which are pieces of time information, may correspond to x1 to x4, which are pieces of first-axis coordinate information of the driving signal or the reconstruction signal, and may correspond to y1 to y4, which are pieces of second-axis coordinate information of the driving signal or the reconstruction signal. That is, i1 to i4, which are pieces of light information acquired by the controller 110, may correspond to x1 to x4, which are pieces of first-axis coordinate information of the driving signal or the reconstruction signal, respectively, and may correspond to y1 to y4, which are pieces of second-axis coordinate information of the driving signal or the reconstruction signal, respectively.

Here, for example, the position indicated by x1 and y1, which are pieces of coordinate information corresponding to the time information t1, may be identical to or similar to the position indicated by x3 and y3, which are pieces of coordinate information corresponding to the time information t3. Likewise, the position indicated by x2 and y2, which are pieces of coordinate information corresponding to the time information t2, may be identical to or similar to the position indicated by x4 and y4, which are pieces of coordinate information corresponding to the time information t4.

In this case, offsets acquired by the controller 110 may be (t1, t3) and (t2, t4) on the basis of the time information. Alternatively, offsets acquired by the controller 110 may be (x1, y1), (x3, y3), (x2, y2), and (x4, y4) on the basis of the coordinate information. In other words, in the case of the offsets acquired by the controller 110, when pieces of coordinate information indicated by at least two pieces of time information are identical to or similar to each other, the two pieces of time information may constitute one offset. The offsets may be a plurality of offsets configured based on time information corresponding to a plurality of intersections of the pattern. Also, in the case of the offsets acquired by the controller 110, at least two pieces of coordinate information of the intersections of the pattern may constitute one offset, and at least two pieces of coordinate information for a plurality of intersections of the pattern may be a plurality of acquired offsets.

For convenience of the following description, the controller 110 acquiring at least one offset will be described as the controller 110 acquiring an offset.

Also, according to an embodiment, the controller 110 may acquire an offset on the basis of a reconstruction signal before phase correction. Here, the reconstruction signal before the phase correction may mean that there are no phase-related elements in the reconstruction signal.

For example, referring to Equations 1 and 4 above, the reconstruction signal from which the controller 110 acquires the offset may be a signal with $t_d$ and c of zero. In other words, the reconstruction signal from which the controller 110 acquires the offset may be a signal with $\varphi_x$ and $\varphi_y$ and of zero.

That is, the controller 110 may change the time information and may acquire coordinate information of an intersection of the pattern indicated by the reconstruction signal or time information corresponding to the coordinate information of the intersection of the pattern indicated by the reconstruction signal.

As a result, the controller 110 may acquire an offset on the basis of a reconstruction signal with a phase of zero.

Figure 33:
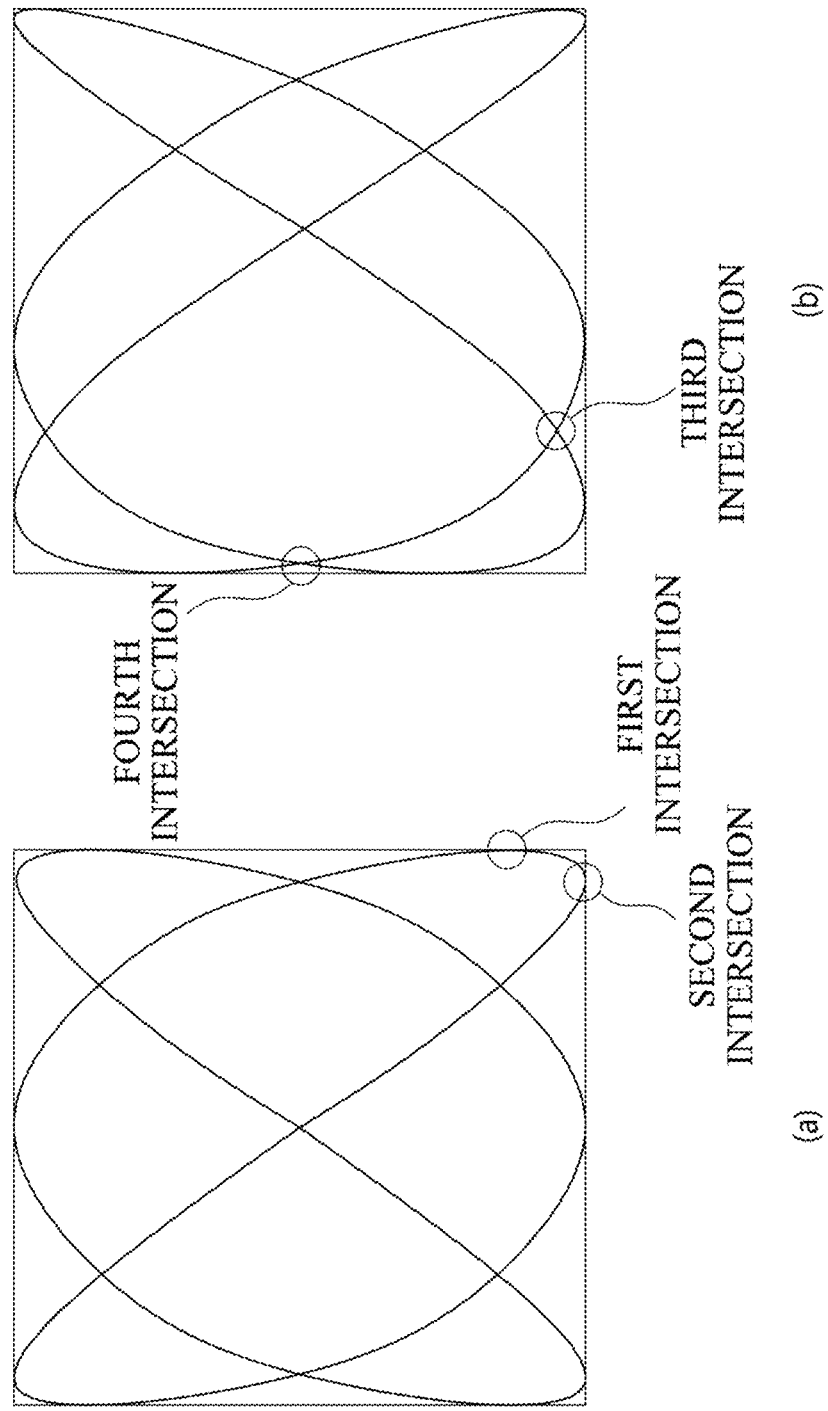
FIG. 33 is a schematic diagram showing intersections acquired from different patterns according to an embodiment.

FIG. 33 is a schematic diagram showing intersections acquired from different patterns according to an embodiment.

Specifically, referring to Equation 1, Equation 4, and FIG. 33 above, FIG. 33A and FIG. 33B show patterns exhibited by the same driving signal or reconstruction signal except for c, which is an element for determining a pattern shape. In other words, FIGS. 33A and 33B may show patterns that are exhibited by a first-axis signal and a second-axis signal which have the same frequency and amplitude and that have different values of c when the phase of the first-axis signal is different from the phase of the second-axis signal by c.

According to an embodiment, even if the phase difference between the first-axis signal and the second-axis signal of the driving signal or the reconstruction signal exhibiting the pattern is changed, intersections may be reached at the same time interval in a direction in which the pattern proceeds.

For example, referring to Equation 1, Equation 4, and FIG. 33 above, a time interval between time information corresponding to coordinate information of a first intersection and time information corresponding to coordinate information of a second intersection when the pattern proceeds from the first intersection to the second intersection as shown in FIG. 33A may be identical to a time interval between time information corresponding to coordinate information of a third intersection and time information corresponding to coordinate information of a fourth intersection when the pattern proceeds from the third intersection to the fourth intersection as shown in FIG. 33B.

That is, pieces of time information corresponding to offsets acquired from driving signals or reconstruction signals exhibiting two patterns with different phase differences between the first-axis signal and the second-axis signal may be different from each other by the same time interval. In other words, even if the phases of the first-axis signal and the second-axis signal of the driving signal and the reconstruction signal are different from each other, the pieces of time information which correspond to the acquired offsets may have the same time interval as time information from which the offsets are acquired.

Referring to FIGS. 32 and 33, the operation of the controller 110 acquiring a first phase correction value and a minimum offset such that a difference among the light information acquired for coordinate information in the acquired offset is minimized (S7200) may include the controller 110 changing time information corresponding to the acquired offset to several time intervals, acquiring time information such that a difference value between pieces of light information in the offsets is minimized, and acquiring a minimum offset corresponding to the time information.

Here, referring to Equation 1 and Equation 4 above, the controller 110 changing the time information of the offset may mean that the controller 110 changes $t_d$ of the driving signal or the reconstruction signal and acquires a changed offset.

Also, referring to Equation 1 and Equation 4 above, the first phase correction value at which the difference between the pieces of light information is minimized may be $t_d$ at which the difference between the pieces of light information of the coordinate information corresponding to the changed offset is minimized when the controller 110 changes $t_d$. In this case, when $t_d$ of the driving signal or the reconstruction signal is the first phase correction value, the offset acquired by the controller 110 may be the minimum offset.

According to an embodiment, the controller 110 may change $t_d$ of the reconstruction signal and acquire the first phase correction value and the minimum offset.

According to another embodiment, the controller 110 may acquire a first phase correction value at which the difference between the pieces of light information is minimized and a minimum offset corresponding to the first phase correction value among a plurality of offsets that change $t_d$ of the reconstruction signal to a plurality of values.

In this case, in the above embodiments, a unit in which the controller 110 changes $t_d$ or an interval which is between a plurality of $t_d$'s acquired by the controller 110 may be predetermined. That is, the controller 110 may change $t_d$ at predetermined intervals, acquire a first phase correction value such that a difference between pieces of light information is minimized, and acquire a minimum offset corresponding to the first phase correction value, and the controller 110 may also acquire a plurality of $t_d$'s at predetermined time intervals, acquire $t_d$ in which the difference between the pieces of light information is minimized among a plurality of corresponding offsets, and acquire a minimum offset corresponding the first phase correction value.

Here, the interval between the plurality of $t_d$'s acquired by the controller 110 may refer to a difference between $t_d$'s which are continuously changed. For example, when $t_{d1}$, $t_{d2}$, and $t_{d3}$ included in the plurality of $t_d$'s are continuous, the interval between the plurality of $t_d$'s may refer to a difference between $t_{d1}$ and $t_{d2}$.

Here, the plurality of offsets may be acquired by the controller 110 in the form of a lookup table (LUT). That is, when the controller 110 outputs a plurality of offsets, time information or coordinate information corresponding to the plurality of offsets may be output all at once.

Here, for example, a unit in which the controller 110 changes $t_d$ or a predetermined interval which is between a plurality of $t_d$'s acquired by the controller 110 may be a dip. However, the present invention is not limited thereto, and the unit in which the controller 110 changes $t_d$ or the predetermined interval which is between a plurality of $t_d$'s acquired by the controller 110 may be a minimum unit in which the controller 110 can change the phase. Here, the minimum unit in which the controller 110 can change the phase may be a unit in which coordinate information acquired based on the driving signal or the reconstruction signal is substantially changed.

Referring to FIG. 32, the operation of the controller 110 changing the phase of the reconstruction signal and acquiring a second phase correction value at which a difference between pieces of light information is minimized on the basis of coordinate information of a minimum offset (S7400) may include the controller 110 changing the phase difference between a first-axis signal and a second-axis signal of the reconstruction signal and acquiring a phase difference in which the difference between the pieces of light information is minimized in coordinate information corresponding to the acquired minimum offset.

Here, referring to Equation 1 and Equation 4 above, the phase difference between the first-axis signal and the second-axis signal of the reconstruction signal may be c.

In this case, referring to FIG. 33 above, when the phase difference between the first-axis signal and the second-axis signal of the reconstruction signal varies, the shape of the pattern exhibited by the reconstruction signal may also vary. Accordingly, the difference between the pieces of light information in the coordinate information corresponding to the acquired minimum offset may vary along with a change in the phase difference between the first-axis signal and the second-axis signal of the reconstruction signal.

In other words, when the controller 110 changes the phase difference between the first-axis signal and the second-axis signal of the reconstruction signal, the controller 110 may acquire a phase difference value at which a difference between the pieces of light information in time information corresponding to a minimize offset and coordinate information acquired based on the corresponding reconstruction signal is minimized. That is, the second phase correction value may refer to a phase difference value at which the difference between the pieces of light information in the time information corresponding to the minimum offset and the coordinate information acquired based on the corresponding reconstruction signal is minimized. Also, here, the second phase correction value may refer to c, which is a value at which the difference between the pieces of light information in the time information corresponding to the minimum offset and the coordinate information acquired based on the corresponding reconstruction signal is minimized.

According to an embodiment, the controller 110 may change c of the reconstruction signal and acquire the second phase correction value.

According to another embodiment, the controller 110 may acquire the second phase correction value at which the difference between the pieces of light information is minimized on the basis of a plurality of pieces of coordinate information acquired based on time information corresponding to the minimum offset and reconstruction signals obtained by changing c of the reconstruction signal to a plurality of values.

In this case, in the above embodiments, a unit in which the controller 110 changes c or an interval which is between a plurality of c's acquired by the controller 110 may be predetermined.

Here, for example, a predetermined interval which is between the plurality of c's or a predetermined unit in which c is changed may be a dip described above. Here, the predetermined interval between the plurality of c's may refer to the difference between c's which are continuously changed. For example, when c1, c2, and c3 included in the plurality of c's are continuous, the interval between the plurality of c's may refer to a difference between c1 and c2.

Alternatively, as another example, a predetermined interval which is between a plurality of c's or a unit in which c is changed may be based on the number of images the controller 110 acquires for one second. Specifically, the number of images the controller 110 acquires for one second may be a sampling rate, and the predetermined interval of the plurality of c's or a unit in which c is changed may be an inverse number of the sampling rate.

Alternatively, as another example, the predetermined interval which is between the plurality of c's or the unit in which c is changed may be a minimum unit in which the controller 110 can change the phase. Here, the minimum unit in which the controller 110 can change the phase may be a unit in which coordinate information acquired based on the driving signal or the reconstruction signal is substantially changed.

Here, the controller 110 may acquire, in the form of a lookup table, a plurality of pieces of coordinate information acquired based on time information corresponding to the minimum offset and reconstruction signals obtained by changing c of the reconstruction signal to a plurality of values, and light information corresponding to the plurality of pieces of coordinate information. That is, when the controller 110 outputs a plurality of pieces of coordinate information acquired based on time information corresponding to the minimum offset and the reconstruction signals acquired by changing c of the reconstruction signal to a plurality of values, the controller 110 may output coordinate information corresponding to the plurality of pieces of coordinate information acquired based on the time information corresponding to the minimum offset and the reconstruction signals acquired by changing c of the reconstruction signal to the plurality of values all at once.

Referring to FIG. 32, the operation of the controller 110 correcting the phase of the reconstruction signal on the basis of the first phase correction value and the second phase correction value (S7600) may include the controller 110 setting the phases of the first-axis signal and the second-axis signal of the reconstruction signal as the first phase correction value and the second phase correction value.

Specifically, referring to Equation 1 and 4 above, the controller 110 may set $t_d$ or $\varphi_x$, which is the phase of the first-axis signal, as the first phase correction value and may set $t_d+c$ or $\varphi_y$, which is the phase of the second-axis signal, as the sum of the first phase correction value and the second phase correction value.

Here, the controller 110 correcting the phase of the reconstruction signal may mean that the controller 110 sets the phase of the reconstruction signal to a specific phase.

3.3.5. SRSA

An example in which the controller 110 adjusts the phase of the reconstruction signal using an SRSA method will be described below.

Here, "SRSA" is an abbreviation of "Sequential Region Phase Search Algorithm" and may refer to a method of the controller 110 acquiring a detailed phase correction value of the reconstruction signal on the basis of the tendency of the difference value between the pieces of light information acquired for at least one piece of pixel information to decrease as the phase of the reconstruction signal approaches a final phase correction value.

Here, the final phase correction value may be the phase of the delayed reconstruction signal. Alternatively, the final phase correction value may be the phase of the reconstruction signal acquired by the controller 110 through the detailed phase correction method.

Also, here, the tendency may mean that there is a slope at which the difference value between the pieces of light information acquired for at least one piece of pixel information decreases in proportion to a change in phase as the phase of the reconstruction signal approaches the final phase correction value. Alternatively, the tendency may refer to convexity in which there is a slope at which the difference value between the pieces of light information acquired for at least one piece of pixel information decreases in proportion to a change in phase as the phase of the reconstruction signal approaches the final phase correction value. That is, accordingly, when the phase of the reconstruction signal approaches the final phase correction value, the difference value between the pieces of light information acquired for at least one piece of pixel information exhibits convexity in a region in close proximity to the final phase correction value.

Figure 34:
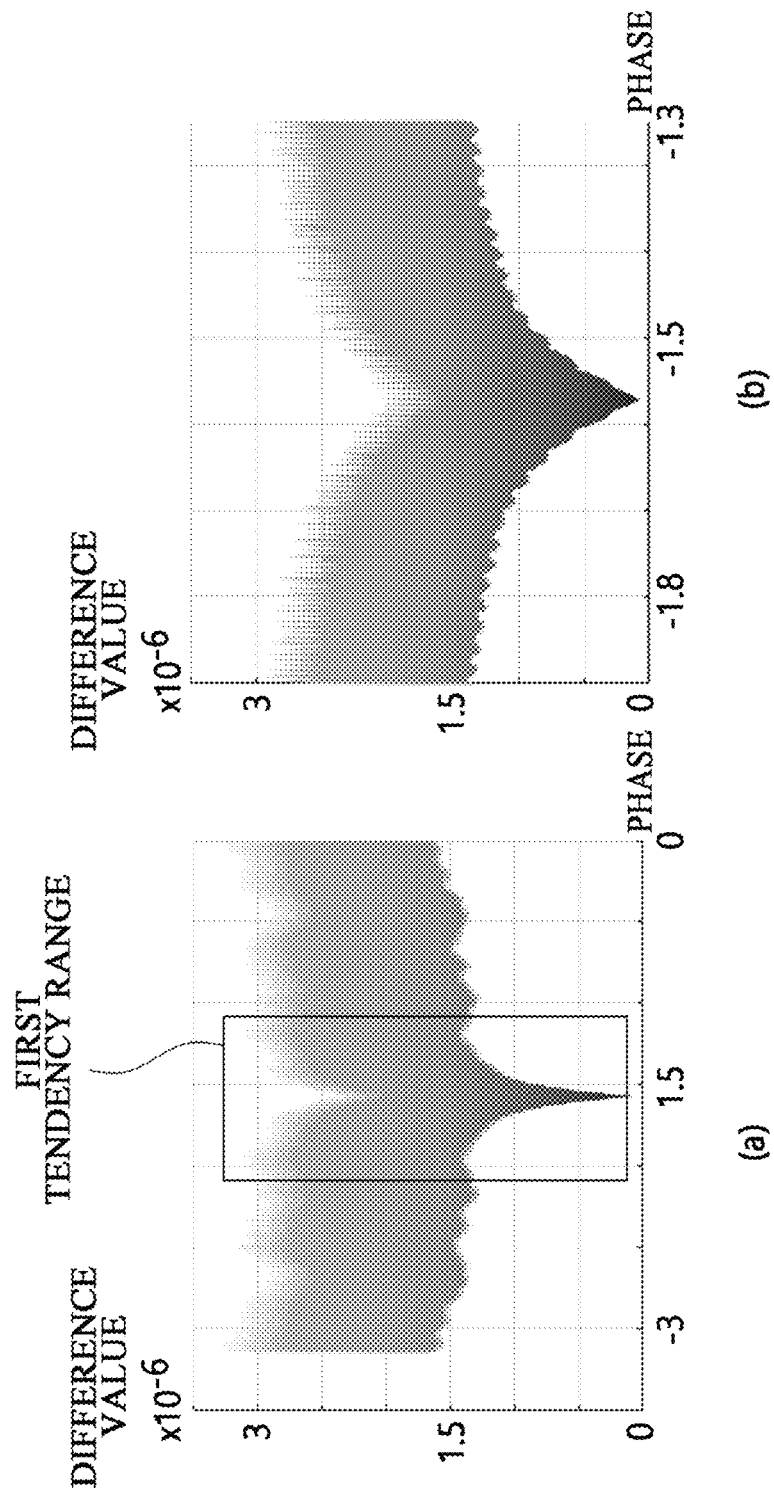
FIG. 34 includes graphs showing a difference value between pieces of light information acquired for at least one piece of pixel information exhibited when the phase of a reconstruction signal is changed according to an embodiment.

FIG. 34 includes graphs showing a difference value between pieces of light information acquired for at least one piece of pixel information exhibited when the phase of a reconstruction signal is changed according to an embodiment.

Here, in FIG. 34, the x-axis represents the phase of a first-axis signal or a second-axis signal of the reconstruction signal, and the y-axis represents a difference value among the light information acquired for each of pixel information, and in particular, the variance of pieces of light information. In this case, the negative sign of the phase of the first-axis signal or the second-axis signal of the reconstruction signal may mean that the last value in the phase range in which the first-axis signal or the second-axis signal is repeated is used as a reference value.

Specifically, referring to FIG. 34, FIG. 34A is a graph showing a difference value among the light information acquired for each of pixel information acquired in the entire phase range of the first-axis signal or the second-axis signal of the reconstruction signal, and FIG. 34B is a graph showing a difference value among the light information acquired for each of pixel information acquired in a partial phase rage of the first-axis signal or the second-axis signal of the reconstruction signal, which is in a first tendency range of FIG. 34A.

Here, the difference value between the pieces of light information acquired for the pixel information may be, for example, the sum of difference values between the pieces of the light information acquired for the pixel information. However, the present invention is not limited thereto, and the difference value between the pieces of light information acquired for the pixel information may be the aforementioned difference value.

Here, the entire phase range may mean that the phase range of the reconstruction signal is from 0 to $2\pi$ in the radian range. Here, the radian range may be changed to a time range. The radian range may be changed to the time range by the frequency of the first-axis signal or the second-axis signal of the reconstruction signal.

According to an embodiment, the difference value between the pieces of light information acquired for the pixel information according to the phase of the first-axis signal or the second-axis signal of the reconstruction signal may exhibit a phase change-caused tendency.

For example, referring to FIG. 34, in the range other than the first tendency range of the entire phase range of the reconstruction signal, the difference value between the pieces of light information acquired for the pixel information may not exhibit a phase change-caused tendency.

However, in the first tendency range of the entire phase range of the reconstruction signal, a difference value among the light information acquired for each of pixel information at a specific phase may exhibit a phase change-caused tendency.

According to an embodiment, the controller 110 may acquire the phase of the reconstruction signal belonging to the first tendency region using an initial phase correction method.

That is, an initial phase correction value of the reconstruction signal acquired by the controller 110 using the initial phase correction method may be a phase in the first tendency range.

Figure 35:
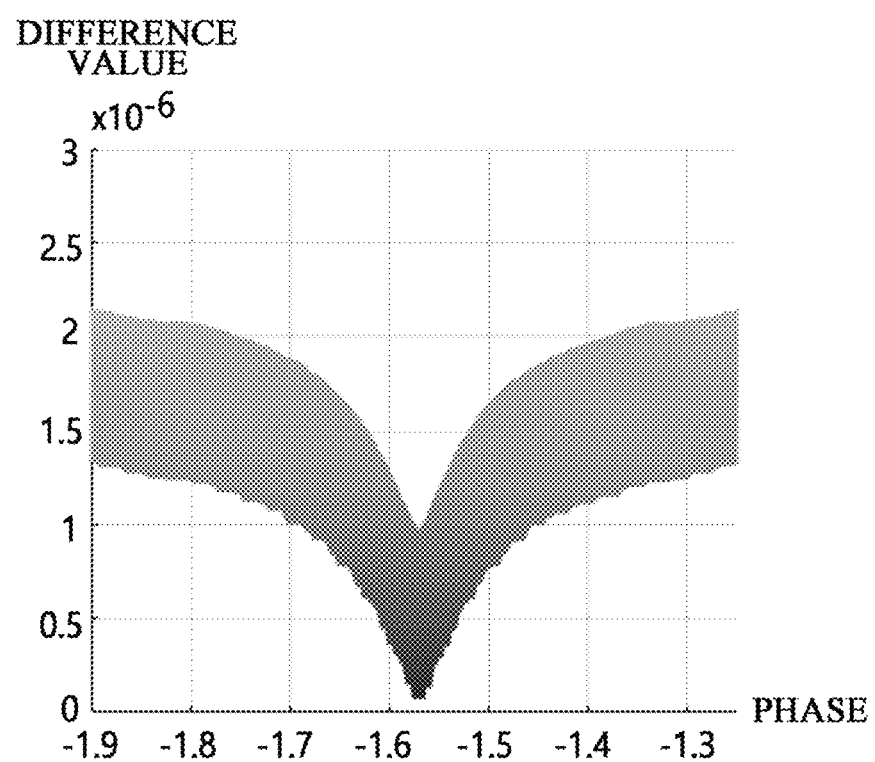
FIG. 35 is a graph showing a difference value between pieces of light information acquired for at least one piece of pixel information according to the phase of a reconstruction signal when the controller 110 changes the phase of the reconstruction signal to a phase indicating a specific FF according to an embodiment.

FIG. 35 is a graph showing a difference value between pieces of light information acquired in at least one piece of pixel information according to the phase of a reconstruction signal when the controller 110 changes the phase of the reconstruction signal to a phase indicating a specific FF according to an embodiment.

Here, in FIG. 35, the x-axis represents the phase of a first-axis signal or a second-axis signal of the reconstruction signal, and the y-axis represents a difference value among the light information acquired for each of pixel information, and in particular, the variance of pieces of light information.

Referring to FIG. 35, when the controller 110 acquires the difference value between the pieces of light information acquired for the pixel information by changing the phase of the reconstruction signal to the phase indicating the specific FF, a difference value caused by the phase of the reconstruction signal may exhibit no peaks and exhibit a certain tendency caused by the change of the phase.

Here, the difference value caused by the phase of the reconstruction signal exhibiting a peak may indicate that the FF caused by the phase of the reconstruction signal vary.

In this case, when the difference value caused by the phase of the reconstruction signal exhibits a peak, the controller 110 may acquire a value other than the final phase correction value as the detailed phase correction value of the reconstruction signal. Here, the controller 110 acquiring the other phase correction value as the detailed phase correction value of the reconstruction signal may mean that the difference value between the pieces of light information acquired for the pixel information is acquired when the difference value is a local minimum value. Also, the controller 110 acquiring the detailed phase correction value of the reconstruction signal may mean that the difference value between the pieces of light information acquired for the pixel information is acquired when the difference value is a local minimum value.

According to an embodiment, referring to FIG. 35, when the difference value between the pieces of light information acquired for the pixel information has the tendency, the controller 110 may correct the phase of the reconstruction signal on the basis of the tendency.

A method of the controller 110 correcting the phase of the reconstruction signal on the basis of a certain tendency when the difference value between the pieces of light information acquired for the pixel information has the tendency will be described below.

Figure 36:
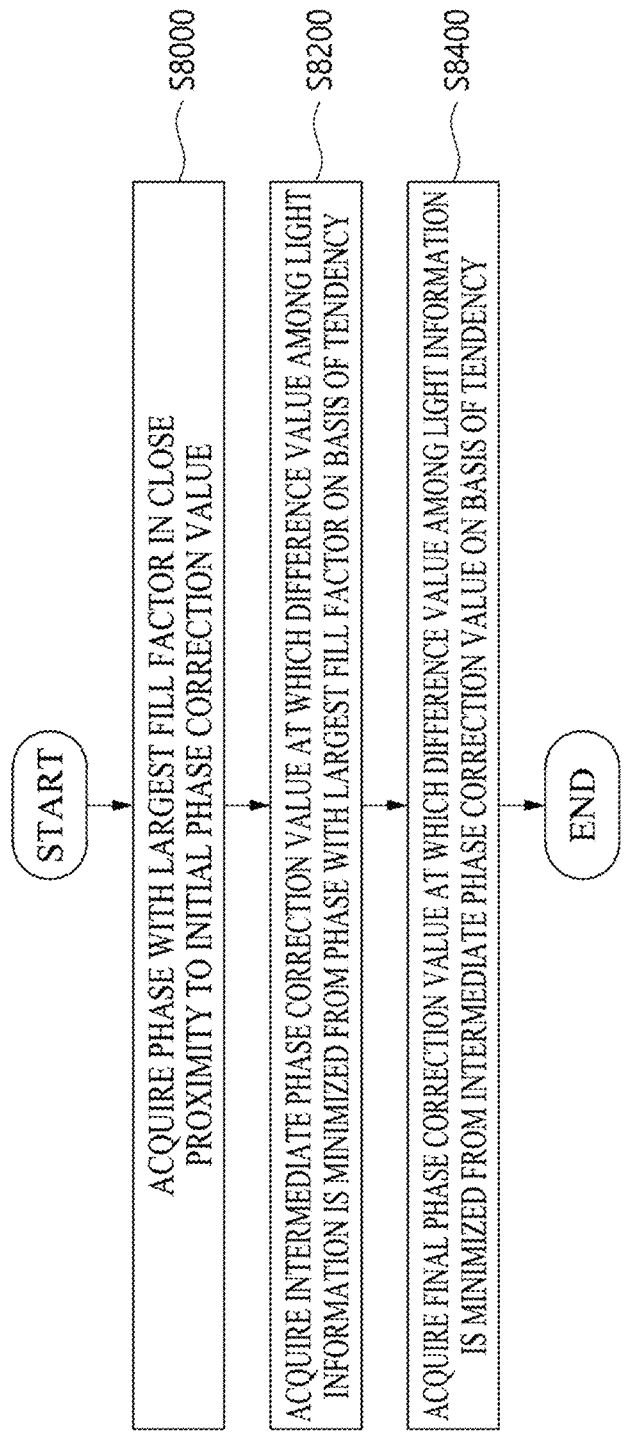
FIG. 36 is a flowchart illustrating a method of the controller 110 acquiring a final phase correction value of a reconstruction signal using a tendency according to an embodiment.

FIG. 36 is a flowchart illustrating a method of the controller 110 acquiring a final phase correction value of a reconstruction signal using a tendency according to an embodiment.

Referring to FIG. 36, the method of the controller 110 acquiring the final phase correction value of the reconstruction signal using the tendency may include an operation of the controller 110 acquiring the phase of a reconstruction signal with the largest FF in close proximity to an initial phase correction value (S8000), an operation of the controller 110 acquiring an intermediate phase correction value at which a difference value among the light information acquired for at least one piece of pixel information is minimized from the phase of the reconstruction signal with the largest FF on the basis of a tendency (S8200), and an operation of the controller 110 acquiring a final phase correction value at which the difference value between the pieces of light information acquired for the at least one piece of pixel information from the intermediate phase correction value on the basis of the tendency (S8400).

Here, the method of the controller 110 acquiring the final phase correction value of the reconstruction signal using the tendency may be included in the operation of the controller 110 acquiring the detailed phase correction value (S4200).

Referring to FIG. 36, the operation of the controller 110 acquiring the phase of the reconstruction signal with the largest FF in close proximity to the first phase correction value (S8000) may include the controller 110 performing detailed phase correction on the basis of the initial phase correction value, which is a phase in the first tendency range.

Here, the proximity to the initial phase correction value may mean that a dip-based range is set with respect to the initial phase correction value. Specifically, the proximity to the initial phase correction value may mean that the controller 110 has a phase range equal to half of the dip with respect to the initial phase correction value.

Also, here, the acquisition of the phase of the reconstruction signal with the largest FF may mean that the density of pixel information for which light information is acquired is high.

Referring to FIG. 36, the operation of the controller 110 acquiring the intermediate phase correction value at which the difference value among the light information acquired for the at least piece of pixel information is minimized from the phase of the reconstruction signal with the largest FF on the basis of the tendency (S8200) may include the controller 110 acquiring the intermediate phase correction value on the basis of a tendency-based minimum search method.

Here, the tendency-based minimum search method may be a slope-based search algorithm including the Nelder-Mead method, momentum method, AdaDrad method, Adam method, steepest gradient method, or gradient descent method.

For example, the tendency-based minimum search method may mean that the controller 110 changes the phase of the reconstruction signal by as much as the dip and uses a difference value between pieces of light information acquired for at least one piece of pixel information using coordinate information acquired based on a reconstruction signal corresponding to the phase changed by as much as the dip.

Alternatively, the tendency-based minimum search method may mean that the controller 110 changes the phase of the reconstruction signal by an integer multiple of the dip and uses a difference value between pieces of light information acquired for at least one piece of pixel information using coordinate information acquired based on a reconstruction signal corresponding to the phase changed by the integer multiple of the dip. Here, the integer multiple of the dip, which is a unit for the change, may be a different integer multiple each time the phase of the reconstruction signal is changed.

Alternatively, the tendency-based minimum search method may mean that the controller 110 changes the phase of the reconstruction signal in a predetermined phase correction unit other than the dip and uses a difference value between pieces of light information acquired for at least one piece of pixel information using coordinate information acquired based on a reconstruction signal corresponding to the phase changed by the predetermined phase correction unit.

In this case, the controller 110 may acquire an intermediate phase correction value at which the difference value between the pieces of light information acquired for the pixel information is minimized using the phase of the reconstruction signal changed based on the tendency.

Figure 37:
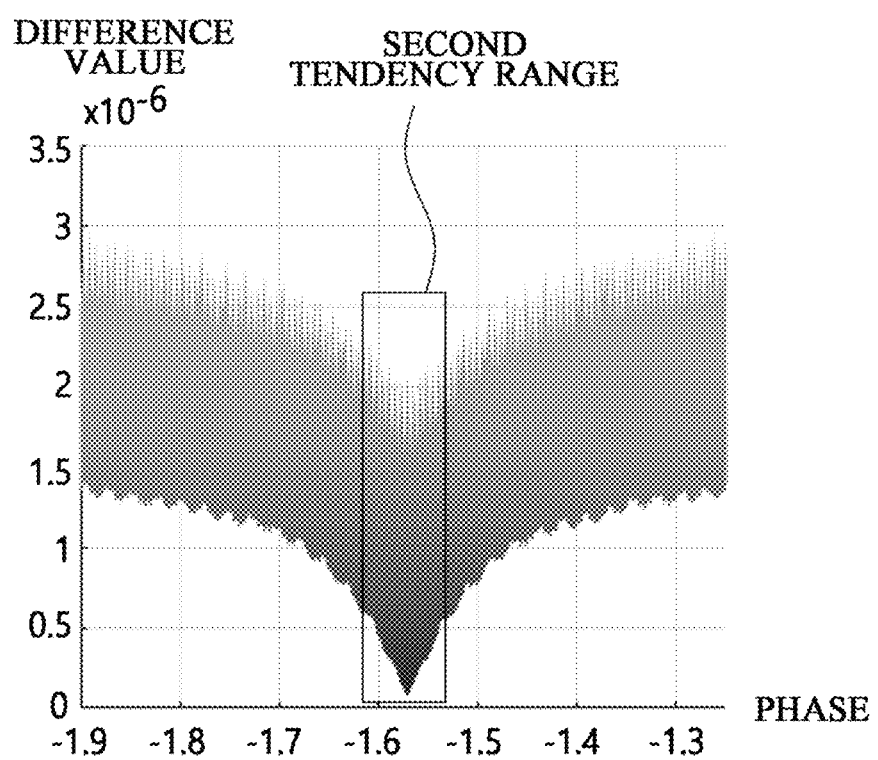
FIG. 37 is a graph showing a difference value between pieces of light information acquired for at least one piece of pixel information exhibited when the phase of a reconstruction signal is changed in a partial phase domain of the reconstruction signal according to an embodiment.

FIG. 37 is a graph showing a difference between pieces of light information acquired for at least one piece of pixel information exhibited when the phase of a reconstruction signal is changed in a partial phase domain of the reconstruction signal according to an embodiment.

Here, in FIG. 37, the x-axis represents the phase of a first-axis signal or a second-axis signal of the reconstruction signal, and the y-axis represents a difference value among the light information acquired for each of pixel information, and in particular, the variance of pieces of light information.

In this case, referring to FIG. 37, even in a second tendency range, a change in the difference value between the pieces of light information acquired for the pixel information according to a change in the phase of the reconstruction signal may exhibit a tendency.

Also, referring to FIG. 37, the range of an x-axis region of FIG. 37 may be a dip.

Referring to FIGS. 36 and 37, the operation of the controller 110 acquiring the final phase correction value at which the difference value between the pieces of light information acquired for the at least one piece of pixel information from the intermediate phase correction value on the basis of the tendency (S8400) may include the controller 110 acquiring the final phase correction value in the second tendency range, which is a portion of the phase range of the acquired reconstruction signal, on the basis of the tendency.

Here, the intermediate phase correction value acquired by the controller 110 may be in the second tendency range.

According to an embodiment, even in the second tendency range, the controller 110 may acquire the final phase correction value on the basis of the tendency.

In this case, the controller 110 may acquire the final phase correction value at which the difference value between the pieces of light information acquired for the pixel information acquired based on the changed phase of the reconstruction signal is minimized.

Here, the controller 110 may set a unit for changing the phase in the second tendency range to a predetermined unit smaller than the dip.

Accordingly, in order to search for the minimum based on the tendency, the controller 110 may change the phase in a predetermined unit smaller than the dip and acquire the final phase correction value at which the difference value between the pieces of light information acquired for the at least one piece of pixel information is minimized.

Alternatively, the controller 110 may set a unit for changing the phase in the second tendency range to an integer multiple of the predetermined unit less than the dip.

Accordingly, in order to search for the minimum based on the tendency, the controller 110 may change the phase in an integer multiple of the predetermined unit smaller than the dip and acquire the final phase correction value at which the difference value between the pieces of light information acquired for the at least one piece of pixel information is minimized.

FIG. 38 is a flowchart illustrating a method of the controller 110 acquiring a final phase correction value of a reconstruction signal using a slope-based minimum search technique according to an embodiment.

Here, the method of the controller 110 acquiring the final phase correction value of the reconstruction signal using the slope-based minimum search technique may be included in the operation of the controller 110 acquiring the detailed phase correction value (S4200).

Referring to FIG. 38, the method of the controller 110 acquiring the final phase correction value of the reconstruction signal using the slope-based minimum search technique may include an operation of the controller 110 searching for a first phase correction value using a first slope-based search technique (S9000), an operation of the controller 110 comparing the difference value among the light information acquired for the at least one piece of pixel information to a predetermined difference value or comparing a phase unit variation changed in the first slope-based search technique to a predetermined phase variation when correcting the reconstruction signal with the first phase correction value (S9200), an operation of the controller 110 searching for a second phase correction value using a second slope-based search technique (S9400), and an operation of the controller 110 comparing the difference value between the pieces of light information acquired for the at least one piece of pixel information to a predetermined difference value or comparing a phase unit variation changed in the second slope-based search technique to a predetermined phase variation when correcting the reconstruction signal with the second phase correction value (S9600).

Referring to FIG. 38, the operation of the controller 110 searching for the first phase correction value using the first slope-based search technique (S9000) may include the controller 110 using the first slope-based search technique to acquire a phase correction value of the reconstruction signal.

Here, the first slope-based search technique may refer to the above-described tendency-based search method or slope-based minimum search algorithm.

In this case, the first slope-based search technique may include changing the phase of the reconstruction signal to a different value each time a search is made and searching for a phase value of the reconstruction signal at which the difference value between the pieces of light information acquired for the at least one piece of pixel information is minimized.

Also, the first phase correction value may be acquired as a result of the first slope-based search technique, but the controller 110 may acquire the first phase correction value on the basis of the result of the first slope-based search technique.

Specifically, a phase correction value of the reconstruction signal acquired by the result of the first slope-based search technique may be a first intermediate phase correction value. In this case, the first phase correction value may be a phase value indicating the maximum FF among phases adjacent to the first intermediate phase correction value.

Referring to FIG. 38, the operation of the controller 110 comparing the difference value among the light information acquired for the at least one piece of pixel information to the predetermined difference value or comparing the phase unit variation changed in the first slope-based search technique to the predetermined phase variation when correcting the reconstruction signal with the first phase correction value (S9200) may include the controller 110 additionally correcting the first phase correction value on the basis of the predetermined difference value or the predetermined phase variation.

Specifically, when the difference value between the pieces of light information acquired for the at least one piece of pixel information is greater than the predetermined difference value while the controller 110 corrects the reconstruction signal on the basis of the first phase correction value acquired in the previous operation, the operation of the controller 110 searching for the first phase correction value using the first slope-based search technique (S9000) may be performed again based on the first phase correction value acquired in the previous operation. Here, a first phase correction value acquired in this operation may be different from the first phase correction value acquired in the previous operation.

Likewise, when a variation of the phase changed to acquire the first phase correction value in the first slope-based search technique is greater than a predetermined phase variation while the controller 110 corrects the reconstruction signal on the basis of the first phase correction value acquired in the previous operation, the operation of the controller 110 searching for the first phase correction value using the first slope-based search technique (S9000) may be performed again on the basis of the first phase correction value acquired in the previous operation.

Also, when the difference value between the pieces of light information acquired for the at least one piece of pixel information is smaller than the predetermined difference value while the controller 110 corrects the reconstruction signal on the basis of the first phase correction value acquired in the previous operation, the operation of the controller 110 searching for the second phase correction value using the second slope-based search technique (S9400) may be performed based on the first phase correction value acquired in the previous operation.

Likewise, when a variation of the phase changed to acquire the first phase correction value in the first slope-based search technique is smaller than the predetermined phase variation while the controller 110 corrects the reconstruction signal on the basis of the first phase correction value acquired in the previous operation, the operation of the controller 110 searching for the second phase correction value using the second slope-based search technique (S9400) may be performed based on the first phase correction value acquired in the previous operation.

Here, the predetermined phase variation or the predetermined difference value may be a value that is arbitrarily set by a user in consideration of the amount of computation of the controller 110.

Referring to FIG. 38, the operation of the controller 110 searching for the second phase correction value using the second slope-based search technique (S9400) may include the controller 110 using the second slope-based search technique to acquire a phase correction value of the reconstruction signal.

Here, the second slope-based search technique may use the same method as the first slope-based search technique, but the first slope-based search technique and the second slope-based search technique may search for a minimum on the basis of different phase variations.

As a specific example, the first slope-based search technique and the second slope-based search technique may search for the minimum while changing the phase of the reconstruction signal such that the phase is an integer multiple of a specific phase variation.

However, the present invention is not limited thereto, and the first slope-based search technique and the second slope-based search technique may search for the minimum on the basis of a constant multiple of a specific phase variation, wherein the multiple may refer to a multiple of a number including integers, rational numbers, and irrational numbers.

Referring to FIG. 38, the operation of the controller 110 comparing the difference value between the pieces of light information acquired for the at least one piece of pixel information to the predetermined difference value or comparing the phase unit variation changed in the second slope-based search technique to the predetermined phase variation when correcting the reconstruction signal with the second phase correction value (S9600) may include the controller 110 additionally correcting the second phase correction value on the basis of the predetermined difference value or the predetermined phase variation.

Specifically, the operation of the controller 110 comparing the difference value between the pieces of light information acquired for the at least one piece of pixel information to the predetermined difference value or comparing the phase unit variation changed in the second slope-based search technique to the predetermined phase variation when correcting the reconstruction signal with the second phase correction value (S9600) may be similar to the above operation of the controller 110 comparing the difference value among the light information acquired for the at least one piece of pixel information to the predetermined difference value or comparing the phase unit variation changed in the first slope-based search technique to the predetermined phase variation when correcting the reconstruction signal with the first phase correction value (S9200).

That is, when the difference value between the pieces of light information acquired for the at least one piece of pixel information is greater than the predetermined difference value while the controller 110 corrects the reconstruction signal on the basis of the second phase correction value acquired in the previous operation, the operation of the controller 110 searching for the second phase correction value using the second slope-based search technique (S9400) may be performed again based on the second phase correction value acquired in the previous operation. Here, a second phase correction value acquired in this operation may be different from the second phase correction value acquired in the previous operation.

Likewise, when a variation of the phase changed to acquire the second phase correction value in the second slope-based search technique is greater than a predetermined phase variation while the controller 110 corrects the reconstruction signal on the basis of the second phase correction value acquired in the previous operation, the operation of the controller 110 searching for the second phase correction value using the second slope-based search technique (S9400) may be performed again on the basis of the second phase correction value acquired in the previous operation.

Also, when the difference value between the pieces of light information acquired for the at least one piece of pixel information is smaller than the predetermined difference value while the controller 110 corrects the reconstruction signal on the basis of the second phase correction value acquired in the previous operation, the controller 110 may set the second phase correction value acquired in the previous operation as the final phase correction value of the reconstruction signal.

Likewise, when a variation of the phase changed to acquire the second phase correction value in the second slope-based search technique is smaller than the predetermined phase variation while the controller 110 corrects the reconstruction signal on the basis of the second phase correction value acquired in the previous operation, the controller 110 may set the second phase correction value acquired in the previous operation as the final phase correction value of the reconstruction signal.

Likewise, the predetermined phase variation or the predetermined difference value may be a value that is arbitrarily set by a user in consideration of the amount of computation of the controller 110. The predetermined difference value or the predetermined phase variation in the operation of the controller 110 comparing the difference value between the pieces of light information acquired for the at least one piece of pixel information to the predetermined difference value or comparing the phase unit variation changed in the second slope-based search technique to the predetermined phase variation when correcting the reconstruction signal with the second phase correction value (S9600) may be different from the predetermined difference value or the predetermined phase variation in the above operation of the controller 110 comparing the difference value among the light information acquired for the at least one piece of pixel information to the predetermined difference value or comparing the phase unit variation changed in the first slope-based search technique to the predetermined phase variation when correcting the reconstruction signal with the first phase correction value (S9200).

According to an embodiment, the above method of the controller 110 searching for a phase correction value for correcting the phase of the reconstruction signal may be interchangeably used.

Also, according to an embodiment, the controller 110 may simultaneously correct the phases of the first-axis signal and the second-axis signal of the reconstruction signal. Here, the controller 110 simultaneously correcting the phases may mean that the controller 110 corrects the phases of the first-axis signal and the second-axis signal of the reconstruction signal using the methods of the above-described embodiments.

Also, according to an embodiment, the controller 110 may sequentially correct the phases of the first-axis signal and the second-axis signal of the reconstruction signal. In other words, the controller 110 may correct the phase of the first-axis signal of the reconstruction signal first and then correct the phase of the second-axis signal or may correct the phase of the second-axis signal of the reconstruction signal first and then correct the phase of the first-axis signal. Here, the controller 110 simultaneously correcting the phases may mean that the controller 110 corrects the phases of the first-axis signal and the second-axis signal of the reconstruction signal using the methods of the above-described embodiments.

According to an embodiment of the present invention, it is possible to acquire a clear image in real time by correcting an image using a tendency.

According to an embodiment of the present invention, it is also possible to acquire a high-resolution image by adjusting the frequency of an image reconstruction signal.

According to an embodiment of the present invention, it is also possible to correct an image at high speed by transforming the domain of an image reconstruction signal to correct the phase of the reconstruction signal.

Although the present invention has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. An image generating device for obtaining an image of an object, comprising:
    a control module configured to generate a first signal having a first frequency component and a first phase component for a first axis direction, and a second signal having a second frequency component and a second phase component for a second axis direction;
    an emitting unit configured to emit light to the object using the first signal and the second signal; and
    a light receiving unit configured to obtain light receiving signal based on returned light from the object;
    wherein the control module configured to obtain a first data set based on the first signal, the second signal and the light receiving signal, wherein the first signal and the second signal correspond to a first domain, wherein the control module is configured to obtain a third signal and a fourth signal, wherein the third signal and the fourth signal correspond to a second domain, wherein the control module configured to obtain a second data set based on the third signal and the fourth signal, wherein the first data set and the second data set are different from each other, wherein the control module is configured to obtain an adjusting value of the first data set based on the second data set, wherein the control module is configured to obtain a third data set based on adjusting the first data set using the adjusting value, and wherein the control module is configured to obtain the image of the object base on the third data set.

2. The image generating device of claim 1, wherein the adjusting value is obtained based on a symmetricity of the second data set.

3. The image generating device of claim 2, wherein the symmetricity is obtained based on a difference value of the light receiving signal obtained on at least one of a second domain pixel position, which the second domain pixel position is determined based on the third signal and the fourth signal.

4. The image generating device of claim 3, wherein the difference value is obtained based on a summation of at least one of the light receiving signal.

5. The image generating device of claim 4, wherein the difference value is obtained based on a fixed phase delayed component which corresponds to a phase delayed component of at least one of the third signal or the fourth signal.

6. The image generating device of claim 5, wherein the fixed phase delayed component is plural, wherein the adjusting value corresponds to a minimum difference value which is obtained among the difference value obtained based on the fixed phase delayed component.

7. The image generating device of claim 6, wherein a first phase adjusting value corresponds to the fixed phase delayed component of the third signal, wherein a second phase adjusting value corresponds to the fixed phase delayed component of the fourth signal, and wherein the adjusting value includes the first phase adjusting value and the second adjusting value.

8. The image generating device of claim 7, wherein the third data set is obtained based on adjusting the first signal by the first phase adjusting value and adjusting the second signal by the second phase adjusting value.

9. The image generating device of claim 7, wherein a third phase adjusting value is obtained based on the first phase adjusting value on the second domain, and wherein a fourth phase adjusting value is obtained based on the second phase adjusting value on the second domain.

10. The image generating device of claim 3, wherein the difference value is obtained based on integration of at least one of the light receiving signal which is obtained at a second domain image corresponding to a phase delayed component of the third signal and the fourth signal at the second domain.

11. The image generating device of claim 1, wherein the first domain corresponds to a sinusoidal function domain, and wherein the second domain corresponds to a domain which is homeomorphic transformation of the first domain.

12. The image generating device of claim 11, wherein the second domain corresponds to a domain which is homeomorphic transformation of the first domain by a phase domain.

13. The image generating device of claim 1, wherein the image which is obtained by the image generating device is obtained on the first domain.

14. The image generating device of claim 1, wherein a position on the second domain which is based on the third signal and the fourth signal is repeated by a predetermined period.

15. An image generating method for obtaining an image of an object, comprising:

generating a first signal having a first frequency component and a first phase component for a first axis direction, and a second signal having a second frequency component and a second phase component for a second axis direction through a control module;

obtaining light receiving signal based on returned light from the object through a light receiving unit;

obtaining a first data set based on the first signal, the second signal and the light receiving signal;

wherein the first signal and the second signal correspond to a first domain, obtaining a third signal and a fourth signal, such that the third signal and the fourth signal correspond to a second domain;

obtaining a second data set based on the third signal and the fourth signal;

wherein the first data set and the second data set are different from each other, wherein the control module is configured to obtain an adjusting value of the first data set based on the second data set, wherein the control module is configured to obtain a third data set based on adjusting the first data set using the adjusting value, and wherein the control module is configured to obtain the image of the object base on the third data set.

16. A non-transitory computer-readable recording medium having recorded thereon a program for performing the method of claim 15.

* * * * *